(12) United States Patent
Datwani et al.

(10) Patent No.: US 11,890,870 B2
(45) Date of Patent: Feb. 6, 2024

(54) ACOUSTIC DROPLET EJECTION OF NON-NEWTONIAN FLUIDS

(71) Applicant: Labcyte Inc., San Jose, CA (US)

(72) Inventors: Sammy S. Datwani, Pleasanton, CA (US); Carson Riche, Fremont, CA (US); Marsha N. Blauwkamp, Palo Alto, CA (US); Justin Blonigan, Pleasanton, CA (US)

(73) Assignee: Labcyte, Inc., San Jose, CA (US)

( * ) Notice: Subject to any disclaimer, the term of this patent is extended or adjusted under 35 U.S.C. 154(b) by 392 days.

(21) Appl. No.: 17/289,552

(22) PCT Filed: Oct. 29, 2019

(86) PCT No.: PCT/US2019/058620
§ 371 (c)(1),
(2) Date: Apr. 28, 2021

(87) PCT Pub. No.: WO2020/092407
PCT Pub. Date: May 7, 2020

(65) Prior Publication Data
US 2021/0394171 A1    Dec. 23, 2021

Related U.S. Application Data

(60) Provisional application No. 62/752,261, filed on Oct. 29, 2018.

(51) Int. Cl.
B41J 2/045     (2006.01)
B01L 3/02      (2006.01)
(Continued)

(52) U.S. Cl.
CPC ....... B41J 2/04575 (2013.01); B01J 19/0046 (2013.01); B01J 19/26 (2013.01);
(Continued)

(58) Field of Classification Search
CPC .................................................. B41J 2/04575
See application file for complete search history.

(56) References Cited

U.S. PATENT DOCUMENTS

| 4,308,547 A | 12/1981 | Lovelady et al. |
| 5,520,715 A | 5/1996 | Oeftering |

(Continued)

FOREIGN PATENT DOCUMENTS

| CN | 101954788 | 1/2011 |
| CN | 105842130 | 8/2016 |

(Continued)

OTHER PUBLICATIONS

Gan et al., "Reduction of droplet volume by controlling actuating waveforms in inkjet printing for micro-pattern formation,"; published in the Journal of Micromechanics and Microengineering on Apr. 28, 2009; 8pp. (Year: 2009).*

(Continued)

*Primary Examiner* — Shelby L Fidler
(74) *Attorney, Agent, or Firm* — Kilpatrick Townsend & Stockton LLP

(57) ABSTRACT

Methods of ejecting droplets containing a non-Newtonian fluid by an acoustic droplet ejector can include applying a tone burst of focused acoustic energy to a fluid reservoir containing a non-Newtonian fluid at sufficient amplitude to effect droplet ejection according to a tone burst pattern. The tone burst pattern may include three discrete tone burst segments, the first tone burst segment having greater duration than the second and third segments, and third segment having greater duration than the second segment. The exact durations and amplitudes of the tone burst segments can be tuned to influence the ejection properties.

17 Claims, 36 Drawing Sheets

(51) Int. Cl.
B01J 19/00 (2006.01)
B01J 19/26 (2006.01)
(52) U.S. Cl.
CPC ......... *B01L 3/0268* (2013.01); *B41J 2/04516* (2013.01); *B41J 2/04588* (2013.01); *B01J 2219/00362* (2013.01); *B01L 2200/0647* (2013.01); *B01L 2200/148* (2013.01); *B01L 2400/0436* (2013.01); *B01L 2400/0439* (2013.01)

(56) References Cited

U.S. PATENT DOCUMENTS

| | | | |
|---|---|---|---|
| 6,029,896 | A | 2/2000 | Self et al. |
| 6,155,671 | A | 12/2000 | Fukumoto et al. |
| 6,416,164 | B1 | 7/2002 | Stearns et al. |
| 9,908,133 | B2 | 3/2018 | St |
| 10,112,212 | B1 | 10/2018 | Stearns et al. |
| 10,156,499 | B1 | 12/2018 | Stearns |
| 10,325,768 | B1 | 6/2019 | Stearns |
| 11,040,341 | B2 | 6/2021 | Forbush |
| 2002/0094582 | A1 | 7/2002 | Williams et al. |
| 2003/0081040 | A1 | 5/2003 | Therien et al. |
| 2004/0056931 | A1 | 3/2004 | Hadimioglu et al. |
| 2004/0118953 | A1 | 6/2004 | Elrod et al. |
| 2005/0130257 | A1 | 6/2005 | Mutz et al. |
| 2005/0212869 | A1 | 9/2005 | Ellson et al. |
| 2006/0144871 | A1 | 7/2006 | Van Tuyl et al. |
| 2007/0057979 | A1* | 3/2007 | Gardner ............... B41J 2/04561 347/5 |
| 2007/0153049 | A1 | 7/2007 | Mutz et al. |
| 2011/0121021 | A1 | 5/2011 | Dudenhoefer et al. |
| 2011/0134723 | A1 | 6/2011 | Stearns et al. |
| 2012/0006106 | A1 | 1/2012 | Ellson et al. |
| 2013/0235101 | A1* | 9/2013 | Grace ....................... B41J 2/03 347/10 |
| 2013/0273591 | A1 | 10/2013 | Attinger et al. |
| 2016/0243569 | A1 | 8/2016 | Stearns et al. |
| 2017/0216856 | A1 | 8/2017 | Stearns et al. |
| 2018/0073029 | A1 | 3/2018 | Hardee et al. |
| 2018/0282781 | A1 | 10/2018 | Mutz et al. |
| 2018/0327618 | A1* | 11/2018 | McManus ............... C09D 11/30 |
| 2019/0232275 | A1 | 8/2019 | Forbush |

FOREIGN PATENT DOCUMENTS

| | | |
|---|---|---|
| JP | 61272635 A | 12/1986 |
| JP | 0614956 U | 2/1994 |
| JP | H08-290587 A | 11/1996 |
| JP | 2004205510 A | 7/2004 |
| JP | 2004530863 A | 10/2004 |
| JP | 2018510360 A | 4/2018 |
| KR | 20100092378 | 8/2010 |
| WO | 2006105251 A2 | 10/2006 |
| WO | 2020160501 A1 | 8/2020 |

OTHER PUBLICATIONS

Application No. AU2020215595, "Second Examination Report", dated Dec. 12, 2022, 2 pages.
Application No. CA3,117,800, Office Action, dated Nov. 9, 2022, 3 pages.
Application No. CA3,127,492, Office Action, dated Nov. 16, 2022, 4 pages.
Application No. JP2021-544349, Notice of Allowance, dated Dec. 27, 2022, 3 pages.
Application No. JP2021-548537, Final Office Action, dated Dec. 5, 2022, 11 pages.
Application No. SG11202107268W, Written Opinion, dated Nov. 18, 2022, 5 pages.
Suzuki, "Fundamentals of Rheology on Visco-Elastic Fluids", Journal of the Japan Society of Colour Material, vol. 84, No. 2, 2011, pp. 47-51.
Yokoyama et al., "Effect of Process Characters of Nozzle-Free Ink-jet Forming on its Printed Body Properties", Journal of the Society of Powder Technology, vol. 46, No. 1, Jan. 2009, pp. 13-19.
Application No. PCT/US2019/058620, International Preliminary Report on Patentability, dated May 14, 2021, 7 pages.
Application No. PCT/US2020/016259, International Preliminary Report on Patentability, dated Aug. 12, 2021, 9 pages.
Tang et al., "On-Demand, Heatless Ejection Of Sub-Mm-Sized Liquid Droplets", IEEE 30th International Conference on Micro Electro Mechanical Systems (MEMS), Jan. 22, 2017, pp. 1196-1199.
AU2020215595, "Third Examination Report", dated Feb. 28, 2023, 3 pages.
CN201980083114.8, Office Action, dated Mar. 1, 2023, 8 pages.
AU2019370221, "Notice of Acceptance", dated Apr. 28, 2023, 3 pages.
AU2020215595, "Notice of Acceptance", dated May 2, 2023, 3 pages.
AU2019370221, "Third Examination Report", dated Aug. 18, 2022, 2 pages.
AU2020215595, "First Examination Report", dated Aug. 5, 2022, 3 pages.
Application No. JP2021-544349, Office Action, dated Jul. 29, 2022, 5 pages.
Application No. JP2021-548537, Office Action, dated May 10, 2022, 11 pages.
AU2019370221, "First Examination Report", dated May 5, 2022, 3 pages.
Application No. CA3, 117,800, Office Action, dated Feb. 28, 2022, 3 pages.
Application No. CN201980083114.8, Office Action, dated Apr. 18, 2022, 22 pages.
IN202147020619, "First Examination Report", dated Oct. 2, 2021, 6 pages.
IN202147030408, "First Examination Report", dated Mar. 15, 2022, 8 pages.
"Acoustic Droplet Ejection", Available Online at: https://www.revolvy.com/main/index.phps=Acoustic+droplet+ejection, Publisher: Revolvy, Jun. 18, 2018, 1 page.
U.S. Appl. No. 10/821,311, "Final Office Action", dated Aug. 28, 2017, 7 pages.
U.S. Appl. No. 10/821,311, "Final Office Action", dated Sep. 25, 2014, 7 pages.
U.S. Appl. No. 10/821,311, "Non-Final Office Action", dated Dec. 18, 2015, 13 pages.
U.S. Appl. No. 10/821,311, "Non-Final Office Action", dated Oct. 18, 2016, 9 pages.
U.S. Appl. No. 10/821,311, "Notice of Allowance", dated Jun. 11, 2018, 10 Pages.
U.S. Appl. No. 14/041,156, "Final Office Action", dated Nov. 12, 2015, 8 pages.
U.S. Appl. No. 14/041,156, "Notice of Allowance", dated Aug. 1, 2018, 5 pages.
U.S. Appl. No. 15/256,417, "Non-Final Office Action", dated Jun. 28, 2018, 23 pages.
U.S. Appl. No. 15/256,417, "Notice of Allowance", dated Jan. 28, 2019, 5 pages.
U.S. Appl. No. 15/886,744, "Non-Final Office Action", dated Sep. 18, 2020, 7 pages.
U.S. Appl. No. 15/886,744, "Notice of Allowance", dated Feb. 23, 2021, 9 pages.
Hadimioglu et al., "Moving Liquids with Sound: The Physics of Acoustic Droplet Ejection for Robust Laboratory Automation in Life Sciences", Journal of Laboratory Automation, vol. 21, No. 1, 2016, pp. 4-18.
Luong et al., "Surface Acoustic Wave Driven Microfluidics—A Review", Bentham Science Publishers, Micro and Nanosystems, vol. 2, No. 3, Sep. 2010, 21 pages.
PCT/US2020/016259, "International Search Report and Written Opinion", dated Apr. 28, 2020, 10 pages.
Simon et al., "Ultrasonic Atomization of Liquids in Drop-Chain Acoustic Fountains", Journal of Fluid Mechanics, vol. 766, Mar. 2015, pp. 129-146.

(56) References Cited

OTHER PUBLICATIONS

Yongkui, et al., "On-demand, heatless ejection of sub-MM-sized liquid droplets", 2017 IEEE 30th International Conference on Micro Electro Mechanical Systems (MEMS), Jan. 22, 2017, pp. 1196-1199.
International Search Report and Written Opinion, PCT/US2019/058620, Labcyte Inc., 9 pages (dated Feb. 5, 2020).
CA3,117,800 , "Office Action", dated Jul. 13, 2023, 3 pages.
CA3,127,492 , "Notice of Allowance", dated Jul. 6, 2023, 1 page.
CN201980083114.8 , "Notice of Decision to Grant", dated Jun. 20, 2023, 6 pages.
Hadimioglu et al., "Moving Liquids With Sound, the Physics of Acoustic Droplet Ejection for Robust Laboratory Automation in Life Sciences", Journal of Laboratory Automation, vol. 21, No. 4, Feb. 2016, pp. 4-18.
KR10-2021-7013959 , "Office Action", dated May 25, 2023, 8 pages.

\* cited by examiner

FIG. 25

| | | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| A | UNDILUTED | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| B | MAN. POS. CTRL | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| C | 2 FOLD | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| D | MAN. POS. CTRL | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| E | 4 FOLD | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| F | MAN. POS. CTRL | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| G | 8 FOLD | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| H | MAN. POS. CTRL | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| I | 16 FOLD | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| J | MAN. POS. CTRL | 8 | 8 | 8 | 8 | 8 | 8 | 8 | 8 | 8 | 8 | 8 | 8 | 8 | 8 | 8 | 8 | 8 | 8 | 8 | 8 | 8 | 8 |
| K | 32 FOLD | 8 | 8 | 8 | 8 | 8 | 8 | 8 | 8 | 8 | 8 | 8 | 8 | 8 | 8 | 8 | 8 | 8 | 8 | 8 | 8 | 8 | 8 |
| L | MAN. POS. CTRL | 8 | 8 | 8 | 8 | 8 | 8 | 8 | 8 | 8 | 8 | 8 | 8 | 8 | 8 | 8 | 8 | 8 | 8 | 8 | 8 | 8 | 8 |
| M | 64 FOLD | 16 | 16 | 16 | 16 | 16 | 16 | 16 | 16 | 16 | 16 | 16 | 16 | 16 | 16 | 16 | 16 | 16 | 16 | 16 | 16 | 16 | 16 |
| N | MAN. POS. CTRL | 16 | 16 | 16 | 16 | 16 | 16 | 16 | 16 | 16 | 16 | 16 | 16 | 16 | 16 | 16 | 16 | 16 | 16 | 16 | 16 | 16 | 16 |
| O | 128 FOLD | 16 | 16 | 16 | 16 | 16 | 16 | 16 | 16 | 16 | 16 | 16 | 16 | 16 | 16 | 16 | 16 | 16 | 16 | 16 | 16 | 16 | 16 |
| P | MAN. POS. CTRL | 6 | | 6.5 | | 7 | | 7.5 | | 8 | | 8.5 | | 9 | | 9.5 | | 10 | | 10.5 | | 11 | | (dB) |

NOVAGEN-SMALL DROP — 2802

| POWER (dB) | SLOPE | EFFICIENCY | R² | Y INTERCEPT |
|---|---|---|---|---|
| 6 | -3.5015 | 93% | 0.7695 | 33.694 |
| 6.5 | -2.8403 | 119% | 0.9789 | 31.883 |
| 7 | -3.0422 | 113% | 0.9833 | 31.794 |
| 7.5 | -2.9888 | 116% | 0.9983 | 31.413 |
| 8 | -3.3362 | 99% | 0.9993 | 31.842 |
| 8.5 | -3.2559 | 103% | 0.9992 | 31.55 |
| 9 | -3.2615 | 103% | 0.9989 | 31.471 |
| 9.5 | -3.3268 | 100% | 0.9983 | 31.482 |
| 10 | -3.4434 | 95% | 0.9995 | 31.658 |
| 10.5 | -3.3727 | 98% | 0.9988 | 31.475 |
| 11 | -3.2542 | 103% | 0.9982 | 31.204 |

IDEAL SLOPE -3.322    100%    1

NOVAGEN-LARGE DROP — 2804

| POWER (dB) | SLOPE | EFFICIENCY | R² | Y INTERCEPT |
|---|---|---|---|---|
| 6 | -2.4918 | 152.0% | 0.9426 | 26.748 |
| 6.5 | -2.6002 | 142.4% | 0.9927 | 26.057 |
| 7 | -3.4795 | 93.8% | 0.9904 | 26.388 |
| 7.5 | -3.5788 | 90.3% | 0.9938 | 26.223 |
| 8 | -3.5257 | 92.1% | 0.9976 | 25.905 |
| 8.5 | -3.7707 | 84.2% | 0.9936 | 25.981 |
| 9 | -3.5238 | 92.2% | 0.9945 | 25.519 |
| 9.5 | -3.4502 | 94.9% | 0.9975 | 25.37 |
| 10 | -3.4038 | 96.7% | 0.9948 | 25.236 |
| 10.5 | -3.2539 | 102.9% | 0.9906 | 24.963 |
| 11 | -3.2221 | 104.3% | 0.9977 | 34.816 |

IDEAL SLOPE -3.322    100%    1

FIG. 28

ACOUSTIC DROPLET EJECTION OF NON-NEWTONIAN FLUIDS

CROSS-REFERENCE TO RELATED APPLICATIONS

This application is a U.S. national stage application of PCT/US2019/058620, filed Oct. 29, 2019, which claims the benefits of and priority to U.S. Provisional Patent Application No. 62/752,261, filed Oct. 29, 2018, the entire contents of both of which are incorporated herein by reference.

BACKGROUND

Many biological solutions, polymeric solutions and polymer melts are non-Newtonian fluids in nature, as are many commonly found substances such as ketchup, starch suspensions, paint, honey, blood, custard and shampoo. For a Newtonian fluid, the relationship between the shear stress and the strain rate is linear, the constant of proportionality being the coefficient of viscosity. The example for Newton's law of viscosity (1-D momentum transport) is shown below in equation [1]:

$$\tau_{yx} = -\mu \frac{dv_x}{dy} \quad [1]$$

For the case of a non-Newtonian fluid, the relationship between the shear stress and the strain rate is nonlinear and can even be time-dependent. Thus, a constant coefficient of viscosity cannot be defined. Therefore, non-Newtonian fluids are defined as fluids which have a non-linear response in the shear stress profile (or the derivative in the velocity with respect to the direction of fluid transport). Non-Newtonian fluids are also termed viscoelastic fluids as they possess both a viscous component and an elastic component with respect to the shear stress profile attained when the fluid is sheared in the direction of fluid flow. These fluids are characterized with the following equation [2], where the apparent viscosity is not a constant for non-Newtonian fluids.

$$\tau_{yx} = -\eta \frac{dv_x}{dy} \quad [2]$$

There are various types of non-Newtonian fluids, such as Power Law fluids which could be either pseudoplastic where η (the apparent viscosity) decreases as shear rate increases (shear rate thinning), or dilatant where η increases as shear rate increases (shear rate thickening). Non-Newtonian fluids are best studied through several other rheological properties (besides measuring viscosity) that relate stress and strain rate tensors under many different flow conditions-such as oscillatory shear or extensional flow-which are measured using different devices or rheometers. The properties are better studied using tensor-valued constitutive equations, which are common in the field of continuum mechanics.

Rapid transfer of Newtonian fluids can be achieved using a variety of techniques including rapid transfer by acoustic droplet ejection (ADE), which is described, for example, in R. G. Steams and S. A. Qureshi, "Method for Acoustically Ejecting a Droplet of Fluid from a Reservoir by an Acoustic Fluid Ejection Apparatus" U.S. Pat. No. 9,908,133 Mar. 6, 2018. However, problems arise in attempting to transfer non-Newtonian fluids such as polymeric solutions utilizing ADE. For example, problems including apparent alignment of the polymeric chains which creates a stiffening effect of the polymer solution in an extensional flow.

The problem can be sub-characterized into governing regimes where one can investigate "relaxation times" defined by viscoelastic parameters based on the concentration of the polymer in solution as well as the size (chain length) of the polymer itself. In the theory of polymer solutions these regimes have different dominating chemical interactions that occur and can manifest in different physics (that can be viewed on a high-speed camera for example), and these regimes are characterized by the range from dilute polymer solutions to concentrated polymer solutions to polymer melts. Also, the solvent system has a large driving force when it comes to governing the interactions and solution chemistry between the polymer chains and the solvent type (good, bad, theta) etc.

In specific applications, DNA solutions can be considered non-Newtonian fluids. For example, one laboratory approach to studying DNA is to provide genomic DNA, (gDNA) in a buffered system (typically TE, PBS, water etc.) and without attempting to "condense" the polymer, which forms a polymer-solvent system that is non-Newtonian. Adding additional complexity, the characteristics of the fluid can change depending on the concentration of the solution. For a dilute polymer solution (native gDNA, as an example) in a solvent system, there is little interaction between the native gDNA chains, resulting in a simplified system that can be modeled and characterized by a relaxation time, maximal extension and a zero-shear viscosity. At higher native gDNA concentrations modeling such a polymer-solvent system becomes more complicated. The relaxation time now becomes dependent on the concentration, as well as the chain length, and grows exponentially. The maximal extension is also associated with the gDNA concentration although limited in growth.

In summary, although additional processing methods for DNA analysis are needed, the problems of characterizing the fluid properties of non-Newtonian DNA-containing solutions have heretofore been too complex to allow general DNA-containing fluid transfer by known techniques in ADE. Therefore, there is a need for novel ADE processes that can reproducibly, accurately and precisely transfer native gDNA and other viscoelastic non-Newtonian fluids.

BRIEF DESCRIPTION OF THE DRAWINGS

Various embodiments in accordance with the present disclosure will be described with reference to the drawings, in which:

FIG. 25 is a schematic showing a layout map for a test plate used to quantitatively assess the robustness of DNA transfer by ADE.

FIG. 28 is a chart showing the power levels that successfully achieved linearity at the expected slope for each given starting concentration and drop count.

DETAILED DESCRIPTION OF THE INVENTION

Figure 1:
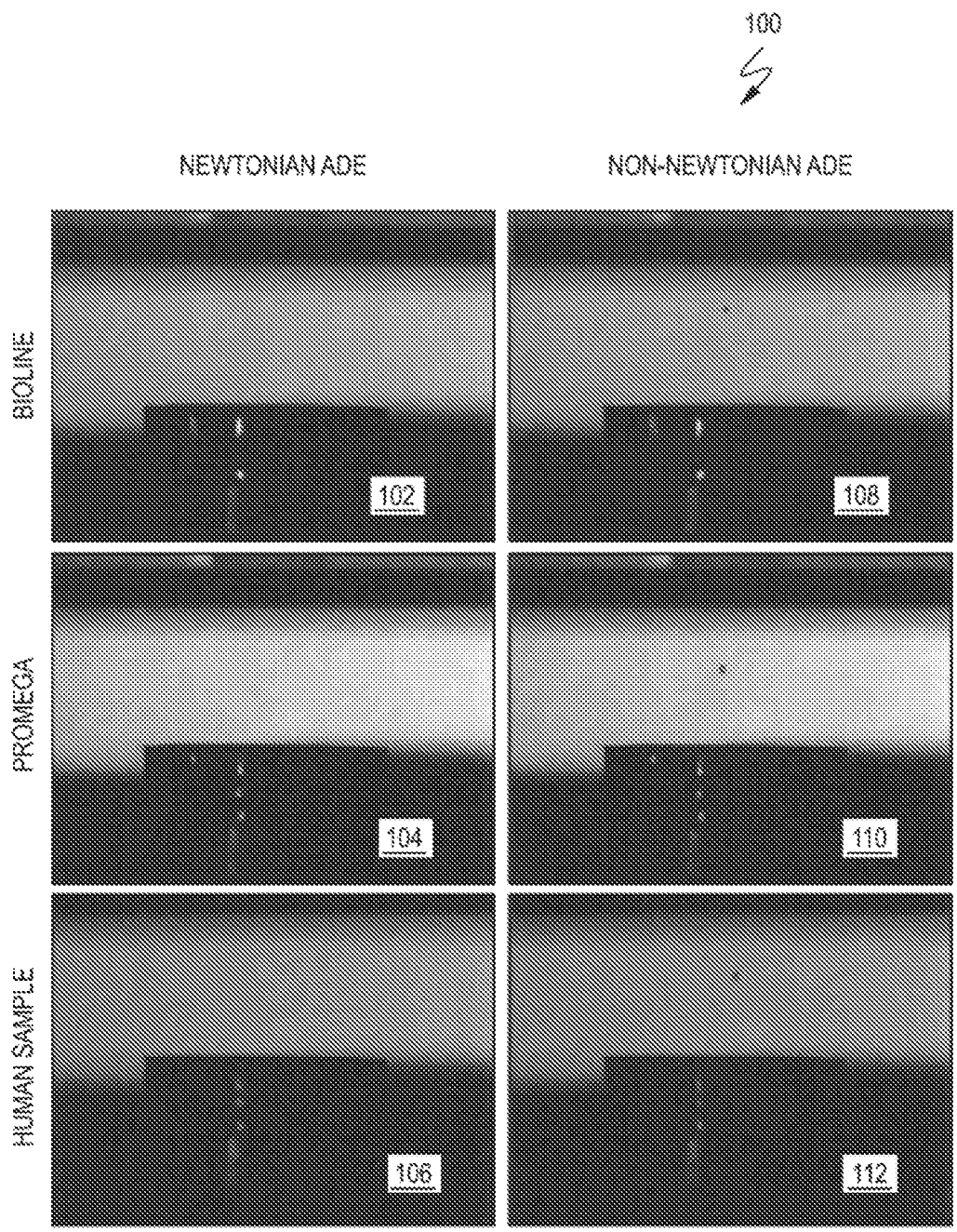
FIG. 1 shows a set of high-speed images of a droplet ejection apparatus performing ejections in underpowered and high-powered conditions.

In the following description, various embodiments will be described. For purposes of explanation, specific configurations and details are set forth in order to provide a thorough understanding of the embodiments. However, it will also be apparent to one skilled in the art that the embodiments may be practiced in other configurations, or without the specific details. Furthermore, well-known features may be omitted or simplified in order not to obscure the embodiment being described.

The techniques described herein enable the capability to transfer samples of Non-Newtonian fluids (such as intact, native genomic DNA or viscoelastic polymers in solution) utilizing acoustic droplet ejection (ADE) technology in a highly reproducible, highly accurate and highly precise manner.

More specifically, the techniques described herein enable the transfer of untreated, unfragmented, intact, native genomic DNA, (referred to as native gDNA throughout), using acoustic droplet ejection (ADE) technology from wells in a microplate or tubes that are acoustically qualified. Currently, many biological assay workflows utilize more traditional methods of transferring untreated, unfragmented, intact gDNA, such as using tip-based systems. This methodology provides a truly unadulterated, non-contact, touchless liquid transfer process for the future laboratory setting for research use only or clinical diagnostic applications.

Specific improvements to ADE technology described herein enable transfer of native gDNA samples that have both large fragments (>20 Kb) and/or high concentration (>100 ng/μL). Previous ADE capabilities have limitations and how much deviation from Newtonian behavior a fluid can have before the transfer process fails to be sufficiently accurate and precise for the intended application. For example, when forming nanoliter-scale drops, as gDNA size exceeds 20 Kb in length and the concentration exceeds 100 ng/μL, the process of acoustic drop formation becomes impeded by the non-Newtonian nature of the fluid. The ability to transfer native gDNA without any manipulations to reduce fragment size or physical size or concentration such as dilution (e.g. with buffer (Tris-EDTA), water, other diluents), additives (such as salts, surfactants), heating, shearing, fragmentation (enzymes, kits), condensation reagents (e.g. ionic liquids, spermidine, spermine) or other forms is thus highly desirable for transferring native gDNA samples that are unadulterated and as stored in repositories. This capability would enable researchers and clinicians to truly miniaturize sample handling (including at the nanoliter scale) of limited (and often precious) native gDNA samples or other problematic biological or polymeric materials for life science and clinical diagnostic applications. Furthermore, this new capability allows for fewer steps in an automated platform workflow and even reduces the need for the utilization of multiple different automated liquid handling platforms or devices to perform upstream steps.

The techniques described herein enable a user to work from a "pure" unadulterated form of extracted native gDNA and acoustically transfer small volumes (a few or tens of nanoliters) to enable the downstream biological assay desired. Larger volumes can also be transferred utilizing the fact that the novel acoustic droplet transfer process remains reproducible, accurate and precise over the range of volumes transferred as it is achieved due to a plurality of many small volume sample transfers all that are highly reproducible, highly accurate and highly precise. In this document, experimental results obtained from a high-speed camera (VISION RESEARCH INC., PHANTOM), water absorbent paper (SYNGENTA) as well as quantitative PCR (qPCR) (ROCHE and THERMOFISHER) experimental results demonstrate the capability, the quality and the quantity of native gDNA transferred per the techniques described herein. The reproducibility, accuracy and precision of all samples transferred is high and is demonstrated quantitatively by low coefficient of variation (CVs) of the Cp or Ct for a described qPCR assay utilizing a housekeeping gene. The Cp or Ct represents the crossing point threshold whereby the DNA is amplified and represents the value where the "knee" is in the uptake of the amplification curve. This is the valued metric of interest for a molecular biologist investigating quantitatively the amount of DNA present in an assay.

Furthermore, due to the low shear rate of the non-Newtonian acoustic transfer process, the gDNA remains intact after transfer to a target container such as a well or tube where the gDNA be further exploited in downstream processes such as NGS.

Specific embodiments are described in detail below, with reference to the figures.

Figure 2:
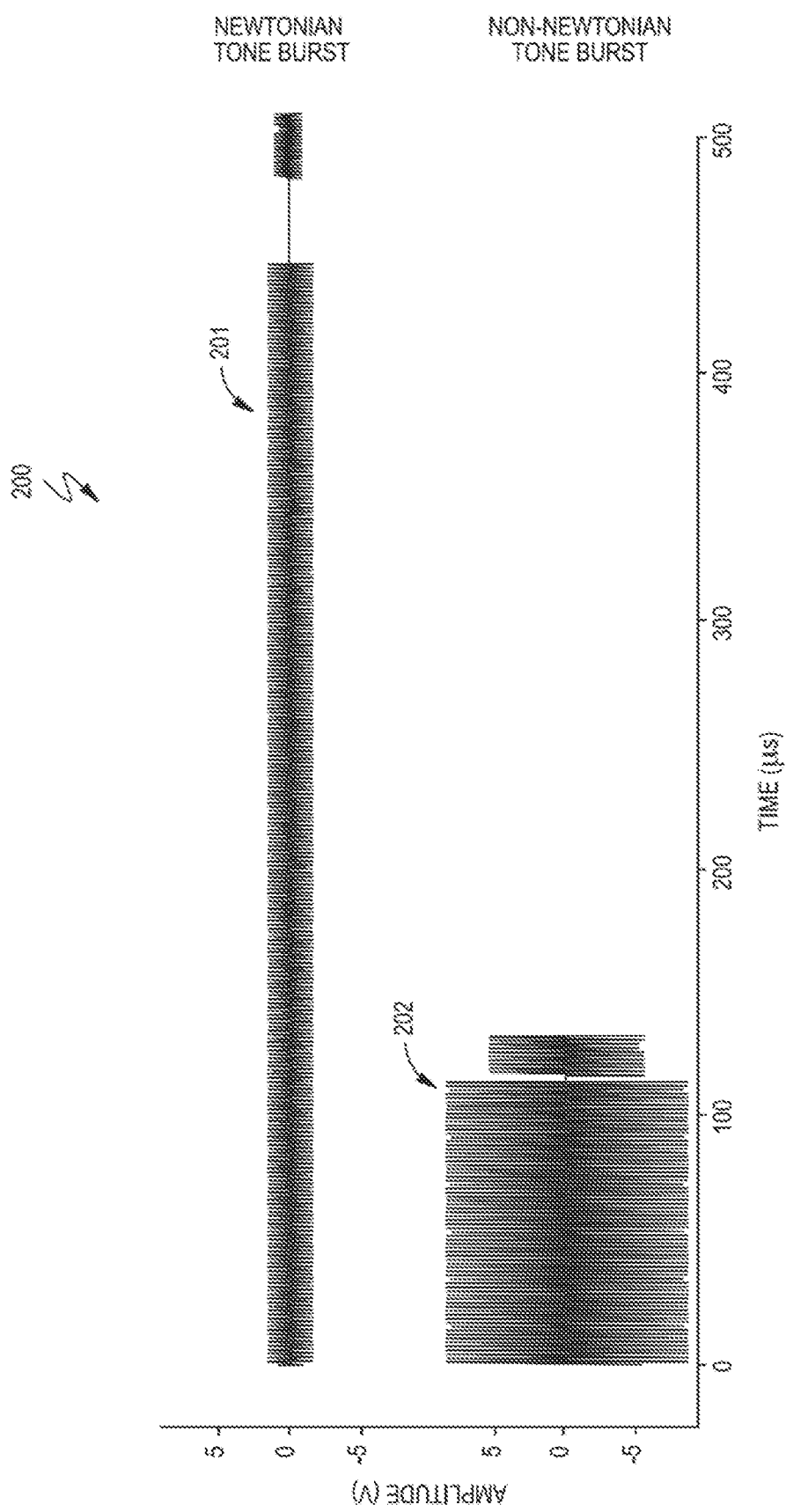
FIG. 2 is an amplitude plot showing the acoustic waveforms for Newtonian and non-Newtonian tone bursts.
Figure 3A:
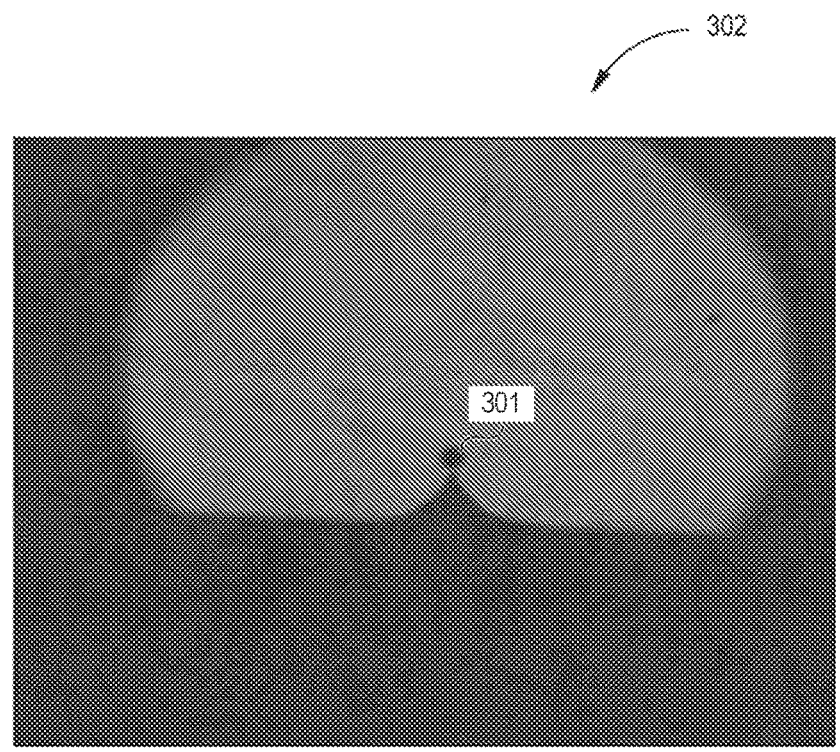
FIG. 3A shows an ejection process using water utilizing a first acoustic tone burst.
Figure 3B:
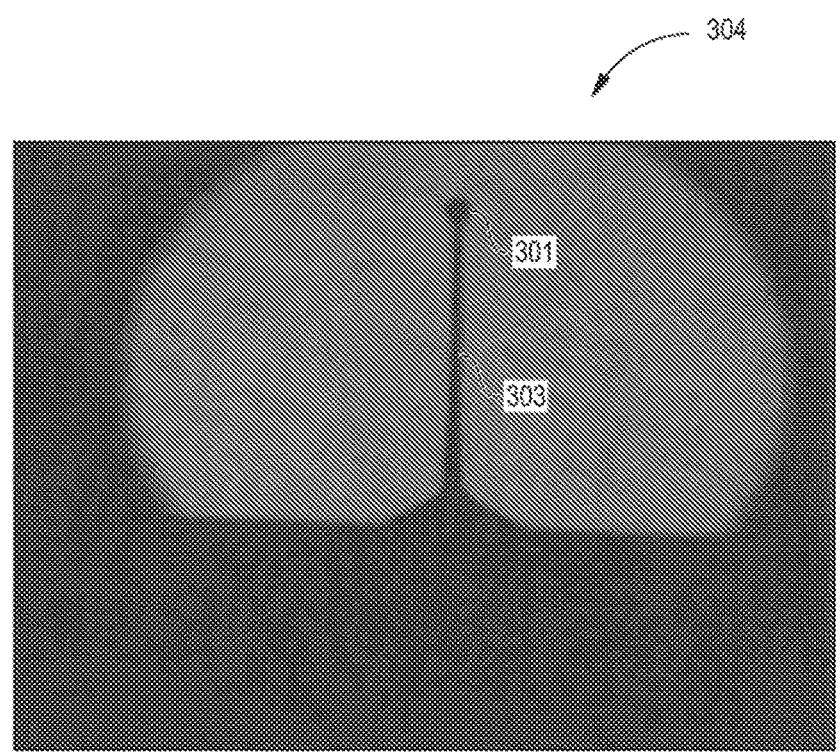
FIG. 3B shows an ejection process of a solution containing human native gDNA with a second tone burst.
Figure 4A:
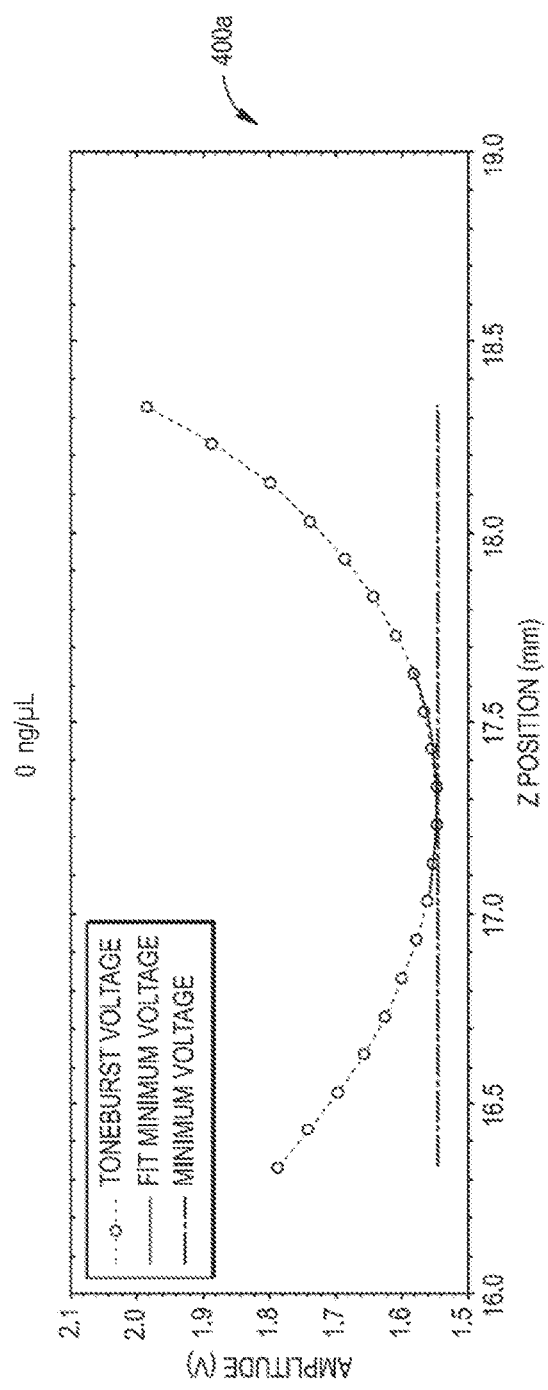
FIGS. 4A-4D show a set of acoustic signal waveform patterns from a mixture of water and human native gDNA at increasing gDNA concentrations.
Figure 4B:
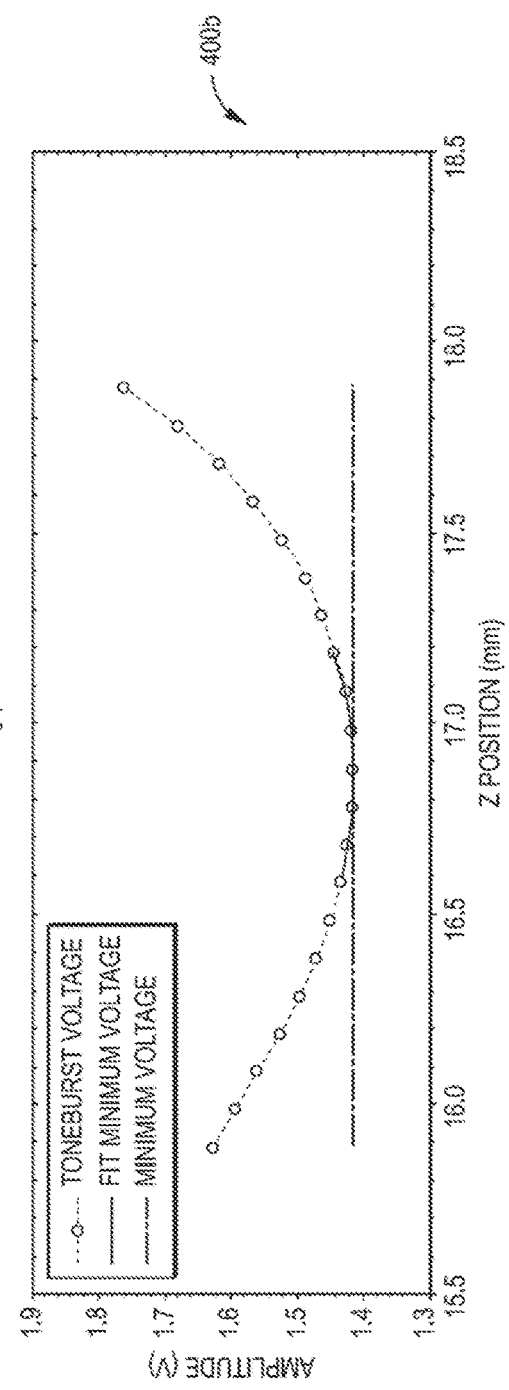
Figure 4C:
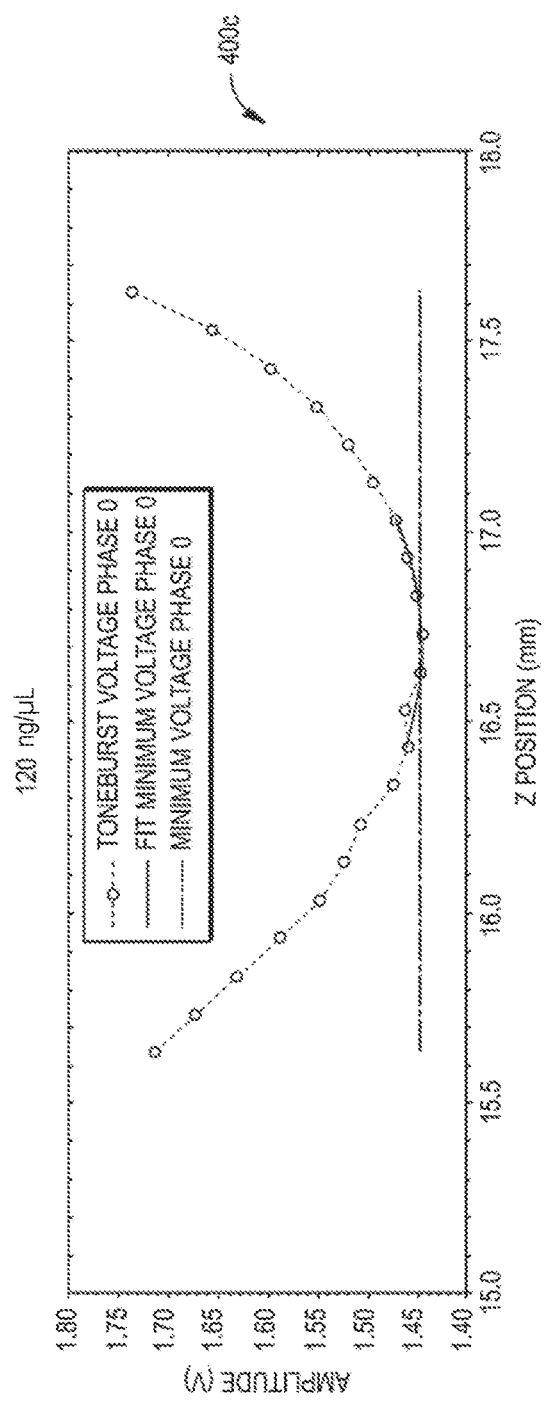
Figure 4D:
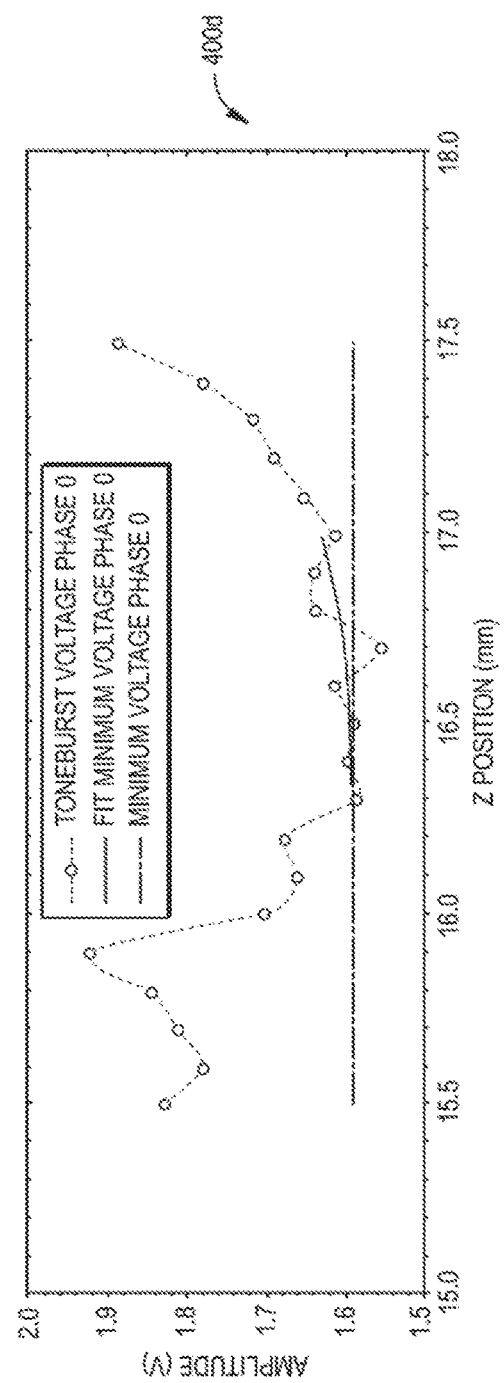

According to at least one embodiment of the present invention, a novel ejection tone burst is disclosed (see Table 1 and FIG. 1) operating in concert with a non-obvious ejection power range (see FIG. 2). Typically, as with Newtonian fluids, the determination of the correct ejection power (in combination with a standard aqueous buffer Newtonian tone burst) is determined by a signature (a characteristic acoustic reflection) produced and correlated with mound image signal processing (determining the null space) produced which has been described in, e.g., U.S. Pat. No. 9,908,133 which is hereby incorporated by reference for all purposes. Mound Image Print (MIP) results for Newtonian fluids produce highly reproducible, highly accurate, and highly precise sample transfer for acoustic droplet ejection with a 1-3 dB ejection energy as the defined relative to ejection threshold to transfer. This process is used to determine the power requirement to eject a droplet from a fluid reservoir such as a well or tube of a Newtonian fluid. In the case of non-Newtonian fluids there are markedly different physicochemical properties when the fluid is subjected to an extensional flow (as in the ADE process). Further, the MIP results cannot distinguish these differences as the perturbations related to signal processing occur at low shear values. Thus, the reliance on MIP during this step of signal processing to indicate the correct ejection to transfer energy as it exhibits insufficient differences to a Newtonian fluid, in some cases, it suggests a 1 dB ejection power for acoustic droplet ejection that is not effective for drop formation to compensate for the stronger deviation from Newtonian behavior that occurs at increased shear rate due to the elevated acoustic power.

ADE-based transfer for non-Newtonian fluids can be achieved using a new tone burst in conjunction with a new ejection energy regime (typically on the order of ~6-11 dB above the ejection threshold). The results for 3 types of intact gDNA samples are shown below for the 1 dB (Newtonian ADE case) to the 6-11 dB (correct or Non-Newtonian ADE case) in concert with the new tone burst.

FIG. 1 shows a set of high-speed images 100 of a droplet ejection apparatus in an underpowered condition (left—102, 104, 106) and a high-powered condition (right—108, 110, 112) resulting in successful ADE. This figure illustrates the shortfall of treating a non-Newtonian fluid as a Newtonian fluid for purposes of ADE. According to embodiments of the present invention, in response to detecting that the fluid to be transferred by way of ADE is a non-Newtonian fluid, the ADE system employs an increased power condition to compensate for the non-Newtonian nature of the solution in the test reservoir. In the case of FIG. 1, non-Newtonian gDNA solutions were used. Images were captured at 20,000 frames per second with a 49 μs exposure time. 3 different samples of native gDNA were ejected from an acoustic tube. From top to bottom the samples were obtained commercially from BIOLINE® (102, 108), and PROMEGA® (104, 110) whereas Human samples were extracted using Roche MagNA Pure® (106, 112). All samples were >20 Kb and/or high concentration >100 ng/4.

TABLE 1

Tone burst Characterization for Fluid Ejection

| | Tone burst Segment Length | | |
|---|---|---|---|
| | 1 | 2 | 3 |
| Newtonian | 275 μs | 130 μs | 100 μs |
| Non-Newtonian | 120 μs | 8 μs | 18 μs |

Table 1 shows a comparison of the tone burst segment lengths for the Newtonian and non-Newtonian fluid calibration used for successful ADE. Successful ADE on non-Newtonian samples as described herein was performed by modifying a Labcyte® Echo acoustic droplet ejector. This Newtonian tone burst robustly transfers 25 nL of Newtonian fluids (typical for buffers or aqueous solutions) on a Labcyte Echo 525 liquid handler. The non-Newtonian tone burst was used for transferring long (>20 Kb) native gDNA at concentrations >100 ng/μL on Labcyte Echo 550/555. FIG. 2 shows an acoustic amplitude plot 200 showing the acoustic waveforms for the Newtonian 201 and non-Newtonian 202 tone bursts.

Biological fluids, including intact, native gDNA or viscoelastic polymeric solutions and melts will commonly display non-linear response to the shear stress profile as a function of the strain rate and are well known examples of non-Newtonian fluids that are desired for operation with ADE. These fluid samples are complex macromolecular solutions whose properties are frequently difficult to characterize a priori with MIP. In fact, both Newtonian and non-Newtonian fluids within a reservoir, such as an acoustically qualified microplate or acoustically qualified tube, when interrogated using the standard acoustic echoing show little to no differences in the signal processing and perceived energy required for the ADE process. The viscoelastic properties are manifested at ejection energy whereby droplets (created from a mound with the suitable energy) do not pinch off. The result is that the droplet returns to the mound and "snaps back" to the reservoir of the sample in the well or tube. In the case of native gDNA the solution can in some cases "stretch" up to 1 cm (or greater) in length without droplet breakoff. The higher the energy applied results in more tightly aligning the polymeric gDNA chains, making it even more difficult for droplet breakoff. An analogy would be the stretching of a rubber band as you stretch a rubber band, the polymeric chains align further, and it becomes even harder to stretch. Further, increased viscoelasticity of non-Newtonian fluids adversely affects the balance of forces during droplet breakoff, and a new methodology described herein has been shown to enable highly reproducible, highly accurate and highly precise acoustic droplet ejection for non-Newtonian fluids.

FIG. 3A shows an ejection process using water utilizing an acoustic tone burst voltage of 650 mV, and optically strobing at a time of 1400 us after the tone burst. FIG. 3B is a stroboscopic image of an ejection process of native gDNA with the following tone burst characteristics: tone burst segment 1 length=275 μs, segment 2 length=130 μs, segment 3 length=100 μs, segment 1 CF=5.85 MHz, segment 3 CF=5.15 MHz. The acoustic tone burst voltage is 1100 mV with the same Newtonian tone burst segment lengths. The image was captured at a time of ~5000 μs after the tone burst was applied. The ejection tone burst produces a leading lobe 301 (FIGS. 3A, 3B) that extends away from the reservoir, connected with a remainder of the fluid by a filament 303. It is useful to note that in the case of the native gDNA, the DNA polymer chains align in such a way that the extensional flow places the DNA in a "stretched" configuration and continues to stretch as more power is applied (see FIG. 3B). Furthermore, as more energy is applied, a longer native gDNA thread is created (many mm), with no separated drop. With an acoustic power of 1400 mV (which is about 6 dB above that for ejection of water) there is still no droplet separation. It should also be noted that with these viscoelastic fluids, the usual MIP measurement yields a predicted ejection power that would be appropriate if there was no viscoelasticity present in the native gDNA and the chains do not align significantly until one is close to drop break-off. Thus, an MIP-based result fails to capture the full impact of the viscoelastic phenomena.

In normal acoustic auditing of a fluid-filled well or tube, the acoustic transducer is positioned below the well of interest. Water, or another coupling fluid, bridges the gap between the transducer and the bottom of the reservoir such as the underside of the microplate well or a tube bottom. The acoustic signal propagates from the transducer, through the coupling fluid, through the well or tube plastic bottom membrane, into the fluid, and finally into the air above. The acoustic signal is reflected at each of these interfaces and is collected by the same transducer that emitted the original signal. The initial waveform does not overlap with the reflected signal. In a process termed Mound Image Print (MIP), information about the fluid properties is extracted from the reflected signals. In the case of increasing gDNA concentration (as depicted in FIGS. 4A-4D), the MIP result shows no differences between the pure buffer condition (lx PBS) up to a native gDNA concentration of 100 ng/4. Specifically, FIG. 4A contains a chart 400*a* illustrating an acoustic signal waveform pattern from water without native gDNA; and FIGS. 4B, 4C and 4D, respectively, contain charts show acoustic signal waveform patterns from water containing native gDNA at 50 ng/4 (400*b*), 120 ng/4 (400*c*), and 160 ng/4 (400*d*). Above a native gDNA concentration of 100 ng/4 there is the presence of a capillary wave which manifests in a surface perturbation resonance which would actually suggest that a lower energy is required for droplet breakoff.

According to the current disclosure, an alternative ejection tone burst or acoustic waveform is applied for non-Newtonian fluids such as native gDNA contained within a reservoir such as well or tube (see FIG. 2). An acoustic transducer is positioned beneath the reservoir and focused at the surface of fluid contained within a well or tube. The amplitude of the tone burst required to reach the surface of the fluid, perturb the surface, and break-off a droplet is determined to be significantly different than a Newtonian fluid (water or 1×PBS, for example). When an ejection tone burst with an amplitude in the range of 1-3 V is applied to a well filled with water or 1×PBS, fluid breakup occurs at the surface and a droplet is ejected. This is the expected and normal behavior for the ADE process in operation with the Newtonian class of fluids.

The efficacy of acoustic ejection can be experimentally demonstrated using the Echo 550/555 liquid handlers by conducting sample droplet tests at varying power, as shown in FIGS. 5 and 6. FIG. 5 shows a visual/qualitative single 2.5 nL sample droplet test for transfer of 150 Kb native gDNA at 100 ng/μL, transferred using increased power, +0 dB (left) and nominal power +2.0 dB (right). FIG. 6 shows a visual test for ADE transfer of Human sample of 40 Kb native gDNA. The power on the left half of water sensitive paper was +0.0 dB and the power on the right half of water sensitive paper was +8.0 dB. At each of the 384 locations, one transfer of 2.5 nL was attempted. The presence or absence of a dot indicates a successful or failed drop breakoff event, respectively as the water sensitive paper changes color from yellow to blue when aqueous fluid is brought into contact with the paper.

A highly viscoelastic native gDNA solution (human sample in FIG. 5 and a commercially available native gDNA sample in FIG. 6) was attempted in two modes. First, we used the Newtonian tone burst and energy transfer profile (502, 602—left hand side of figures) and next the non-Newtonian tone burst and energy profile (504, 604—right hand side of figures). Clearly using the Newtonian profile, droplets of native gDNA were not transferred and in the case of the non-Newtonian profile successful transfers are indicated by the water sensitive paper exhibiting a blue dot. This is a qualitative measure and unsuccessful transfers have a blank area where a blue dot is expected. FIG. 5 showcases the human sample of native gDNA and FIG. 6 showcases the BIOLINE® commercially available sample.

Next, as the power is then increased, the number of successful transfers also increases (see FIG. 7) indicating that the "normal" parameter space does not incorporate success or reproducible success (to be demonstrated later with qPCR results). The increase in successful transfers plateaus at ~6-11 dB above the standard ejection threshold highlighting a new operating regime suited for non-Newtonian viscoelastic fluids in concert with a novel non-Newtonian tone burst. The normal parameters utilized for Newtonian fluids is not adequate as highlighted in FIG. 7. This is the setting that would represent the minimum energy required to have successful droplet ejection for non-Newtonian fluids. Transfer success rates are shown as a percentage of transfers for BIOLINE® samples (702), human gDNA samples (704), and PROMEGA® samples (706).

Figure 5:
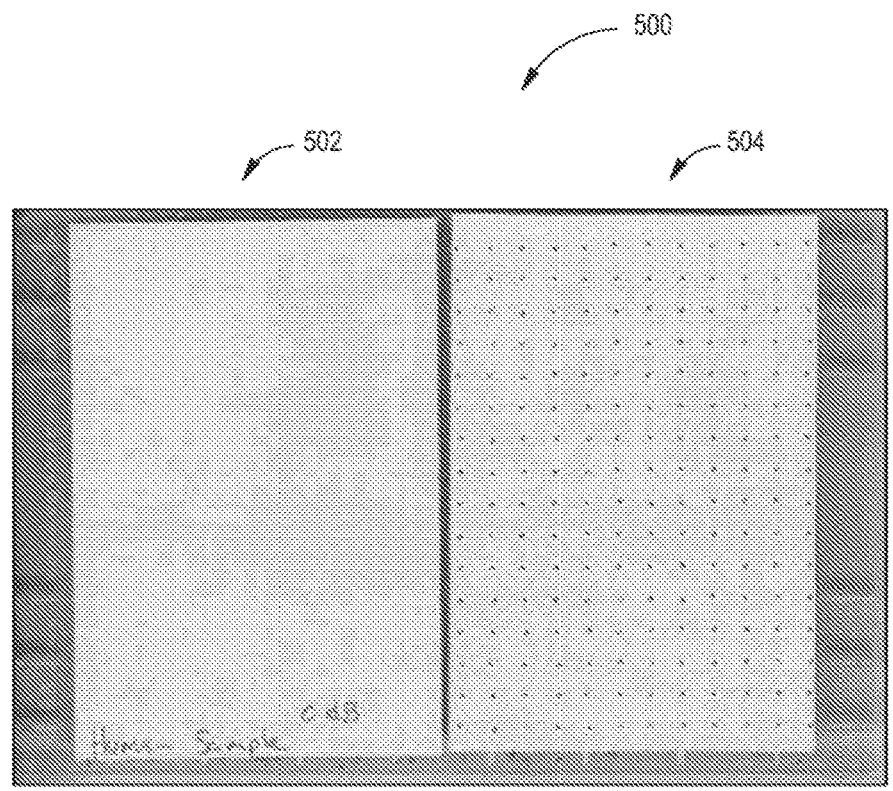
FIG. 5 is an image showing the sample transfer efficacy of human native gDNA in a Newtonian ejection power regime and in an increased power regime.
Figure 6:
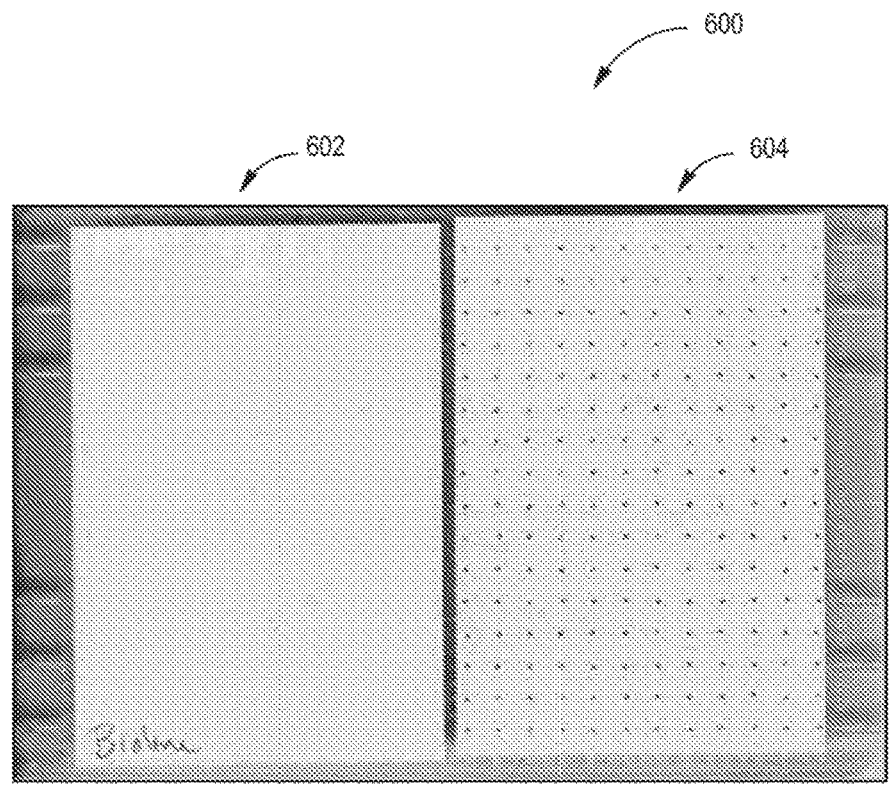
FIG. 6 is an image showing the sample transfer efficacy of human native gDNA in a Newtonian ejection power regime and in an increased power regime.
Figure 7:
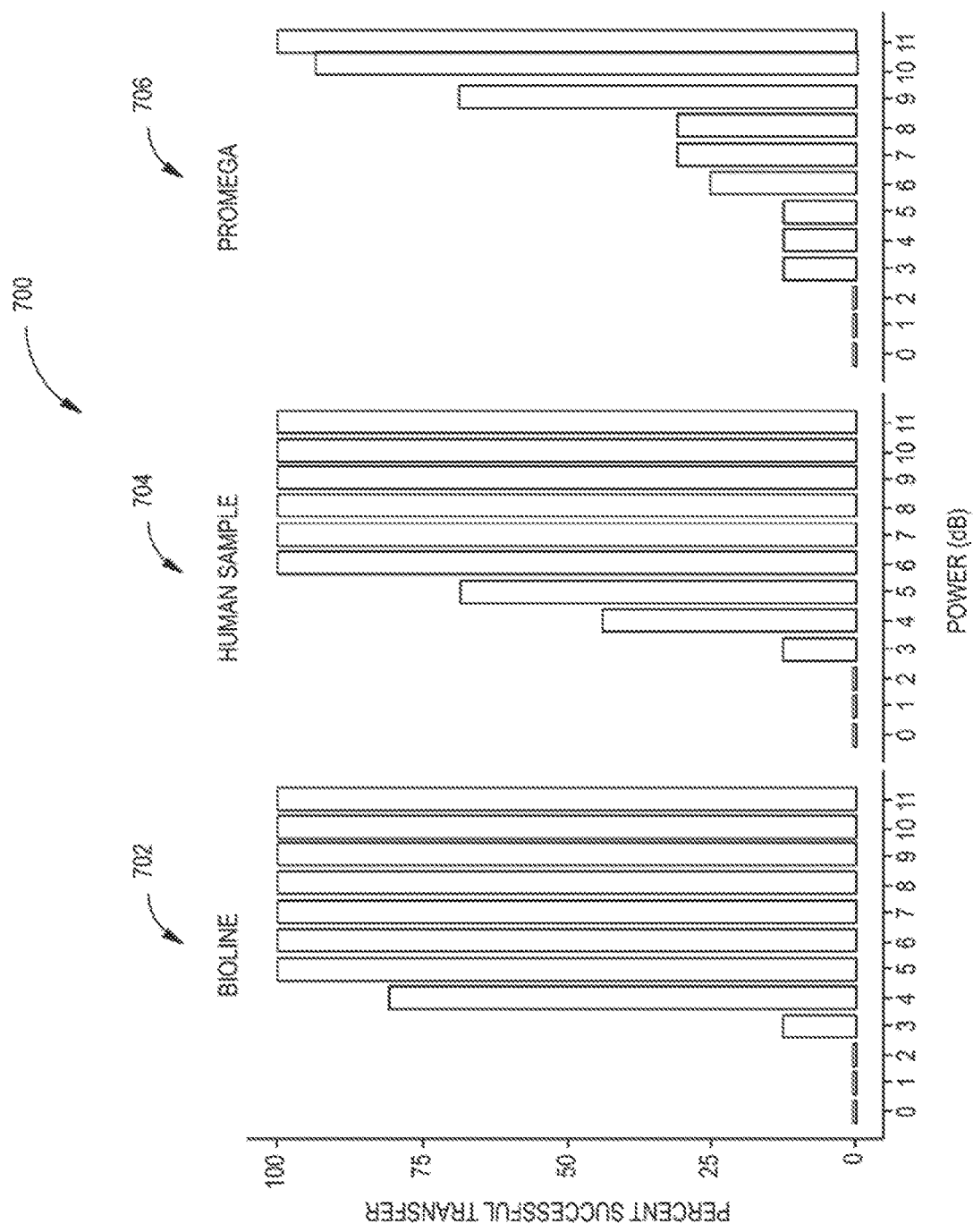
FIG. 7 is a chart showing transfer success rate for various human native DNA solutions based on ejection power.

FIG. 7 shows an empirical approach to determining transfer success rate for various DNA solutions based on ejection power. A successful transfer is defined as when a drop is acoustically ejected and reaches the destination plate (or water sensitive paper attached to a destination plate as in FIG. 5 and FIG. 6). Successful transfers are plotted as a function of the power added to the MIP solution. The MIP feature is turned on and is used in this embodiment to account for changes in the sample fill height. All transfers are performed using a fixed signature or impedance value of 1.48 MRayls.

Figure 8:
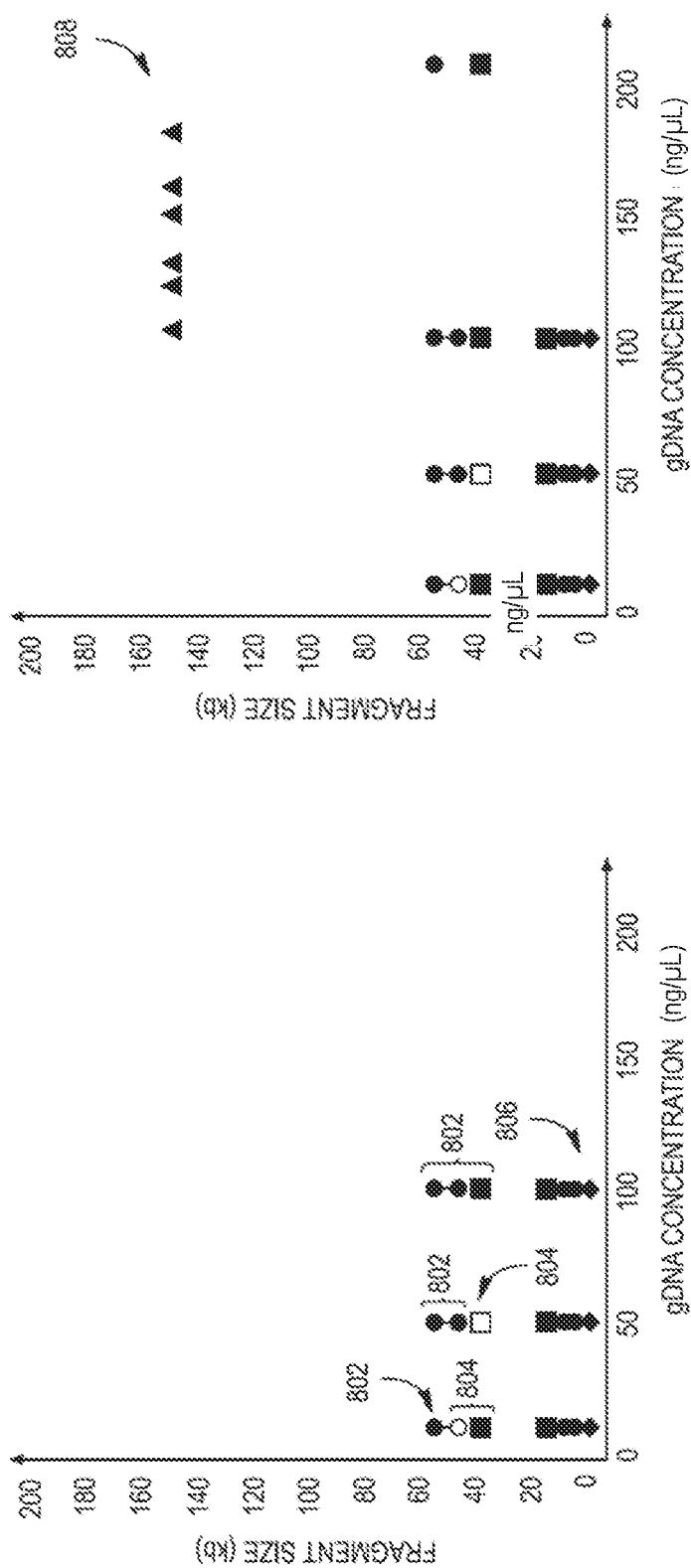
FIG. 8A shows the human native gDNA fragment size and gDNA concentrations obtained from an ADE transferred gDNA solution using a Newtonian ejection power regime.
FIG. 8B shows the human native gDNA fragment size and gDNA concentrations obtained from an ADE transferred gDNA solution using a non-Newtonian ejection power regime.

Ideally, in biological assays and workflows, native gDNA is used as the starting input material. Typically, the native gDNA is then manipulated or prepared for downstream applications. For example, native gDNA can be fragmented into short segments for next generation sequencing (NGS) applications. Current state of the art ADE technology can reproducibly, accurately and precisely transfer native gDNA fragments that are 20 kilobases (Kb) or shorter at concentrations up to 100 ng/4 as the deviation from Newtonian behavior is low enough to enable accurate prediction of ejection power from merely forming the mound that will result in robust droplet breakoff from the reservoir when the predicted higher power is applied. Both size (as measured as the average length of the native gDNA fragments) and concentration of the native gDNA are known parameters that have the ability to impact reproducible ADE, as both contribute to the deviation from Newtonian behavior individually and in combination. The results of studies on a variety of native gDNA samples is highlighted in FIG. 8. FIG. 8A showcases the native gDNA that is less than 20 Kb can be reproducibly, accurately and precisely transferred acoustically (utilizing the Newtonian parameters for tone bust and ejection energy). Furthermore, lower concentrations up to 100 ng/4 have been successfully transferred with the Newtonian parameters. FIG. 8B showcases that with the non-Newtonian parameters, both larger size (up to 150 Kb) native gDNA and higher concentration (up to 200 ng/4) native gDNA can be reproducibly, accurately and precisely transferred, essentially broadening the envelope in the 2-dimensional space of native gDNA size and gDNA concentration that can be accessed acoustically through ADE.

FIGS. 8A and 8B are scatter plots showing gDNA concentration vs. fragment length. Failed (802), partial (804), and successful (806) transfers were obtained in the underpowered condition and Newtonian tone burst power. Successful transfers (808) were obtained uniformly in the high-powered condition and using the non-Newtonian tone burst. Acoustic transfers are measured by qPCR (with further analysis to follow). This figure serves to showcase the larger envelope in the 2-dimensional space of fragment size and native gDNA concentration.

The methods described herein enable the highly reproducible, highly accurate and highly precise transfer of native gDNA with fragment sizes larger than 20 Kb and a bulk concentration larger than 100 ng/4 from an acoustically qualified tube (but can also be carried out from an acoustically qualified well in a microplate, reservoir or the like). The transfer of long fragments of highly concentrated native gDNA at such small volumes (2.5 nL) without physical contact from one container to another enables groundbreaking capabilities for clinical applications (diagnostics) to miniaturize processes, enabling users to do more with less without fear of cross-contamination or binding or reagents to the transfer device. These methods can facilitate workflows for new assay development and miniaturization, opening the opportunities to research and clinical laboratories. By utilizing the acoustic tubes and other reservoirs to transfer gDNA, the working range can be increased substantially to 150 Kb and beyond and up to 750 ng/µL and beyond.

To quantitatively assess gDNA transfer, quantitative polymerase chain reaction (qPCR) was then utilized to confirm and detect the expression of the house keeping gene beta actin β-actin). The qPCR assays were carried out using β-actin forward primer: AGC CAT GTA CGT TGC TAT CC; β-actin reverse primer: CGT AGC ACA GCT TCT CCT TAA T, (IDT). Assays were carried out using either the Roche LightCycler® System or the THERMOFISHER QuantStudio 6 Flex Real-Time PCR System. Roche LightCycler® System utilized LightCycler® 480 SYBR Green I Master (Roche), LightCycler® 480 Multiwell Plate 384 (Roche), LightCycler® 48011 Instrument (Roche). The qPCR program was used as follows: step 1, 95° C. for 60 seconds; step 2, 95° C. for 15 seconds; 60° C. for 30 seconds; 72° C. for 60 seconds, single acquisition (45 cycles); step 3, 95° C. for 10 seconds; 60° C. for 60 seconds and 97° C. continuous. The THERMOFISHER QuantStudio 6 Flex Real-Time PCR System utilized PowerUp™ SYBR® Master Mix, THERMOFISHER 384-Well Clear Optical Plate. The qPCR program was used as follows: step 1, 50° C. for 2 minutes; 95° C. for 2 minutes; step 2, 95° C. for 15 seconds, 60° C. for 1 minute, acquisition (40 cycles); step 3, 95° C. for 15 seconds, 60° C. for 1 minute and 95° C. for 15 seconds.

Control Data Using the Newtonian Calibration for ADE of Fragmented gDNA and Compared to Hand Pipetted Fragmented gDNA.

Human native gDNA (56 Kb) obtained commercially from PROMEGA® was fragmented by shearing (to 8 Kb) using an ultrasonicator (Covaris Ultrasonicator Technology) and manually pipetted into an acoustic qualified tube. An eight-point two-fold standard curve was created using the 8 Kb fragment starting with 100 ng/µL as the highest concentration. For each standard curve point, 32 technical replicates were transferred and assayed by qPCR as described below:

TABLE 2 qPCR Cp results for the fragmented 8 Kb gDNA PROMEGA commercially available sample.

| Transfer Vol (nL) | 200 | 200 | 200 | 200 | 200 | 200 | 200 | 200 |
|---|---|---|---|---|---|---|---|---|
| Final [DNA](ng/µL) | 100 | 50 | 25 | 12.5 | 6.25 | 3.13 | 1.56 | 0.78 |
| Log Final [DNA] (ng/µL) | 2.00 | 1.70 | 1.40 | 1.10 | 0.80 | 0.50 | 0.19 | −0.11 |

TABLE 2-continued qPCR Cp results for the fragmented 8 Kb gDNA PROMEGA commercially available sample.

| | | | | | | | | |
|---|---|---|---|---|---|---|---|---|
| Average Cp | 22.92 | 23.52 | 24.47 | 25.31 | 26.36 | 27.40 | 28.32 | 29.58 |
| Stdev Cp | 0.41 | 0.16 | 0.34 | 0.20 | 0.26 | 0.34 | 0.33 | 0.25 |
| % CV of Cp | 1.8% | 0.7% | 1.4% | 0.8% | 1.0% | 1.2% | 1.2% | 0.8% |
| Min Cp | 22.35 | 22.97 | 23.91 | 24.98 | 25.81 | 26.76 | 27.41 | 28.95 |
| Max Cp | 24.17 | 23.91 | 25.52 | 25.82 | 26.87 | 28.51 | 28.72 | 30.46 |
| Number of Replicates | 32 | 32 | 32 | 32 | 32 | 32 | 32 | 32 |

For each standard curve point, all 32 replicates were transferred. The experimental results are tabulated and constitute the valued depicted in table 2. For each concentration of DNA, the average crossing point (Cp) value was determined as well as the standard deviation in the Cp, the % CV of the Cp, min and max Cp as well as the number of replicates. These results serve as a control set of experiments that showcase the expected variation of the acoustic transfer process (for small size fragmented gDNA) with Newtonian parameters and the comparison to the hand pipetted control experiment capability.

Figure 9:
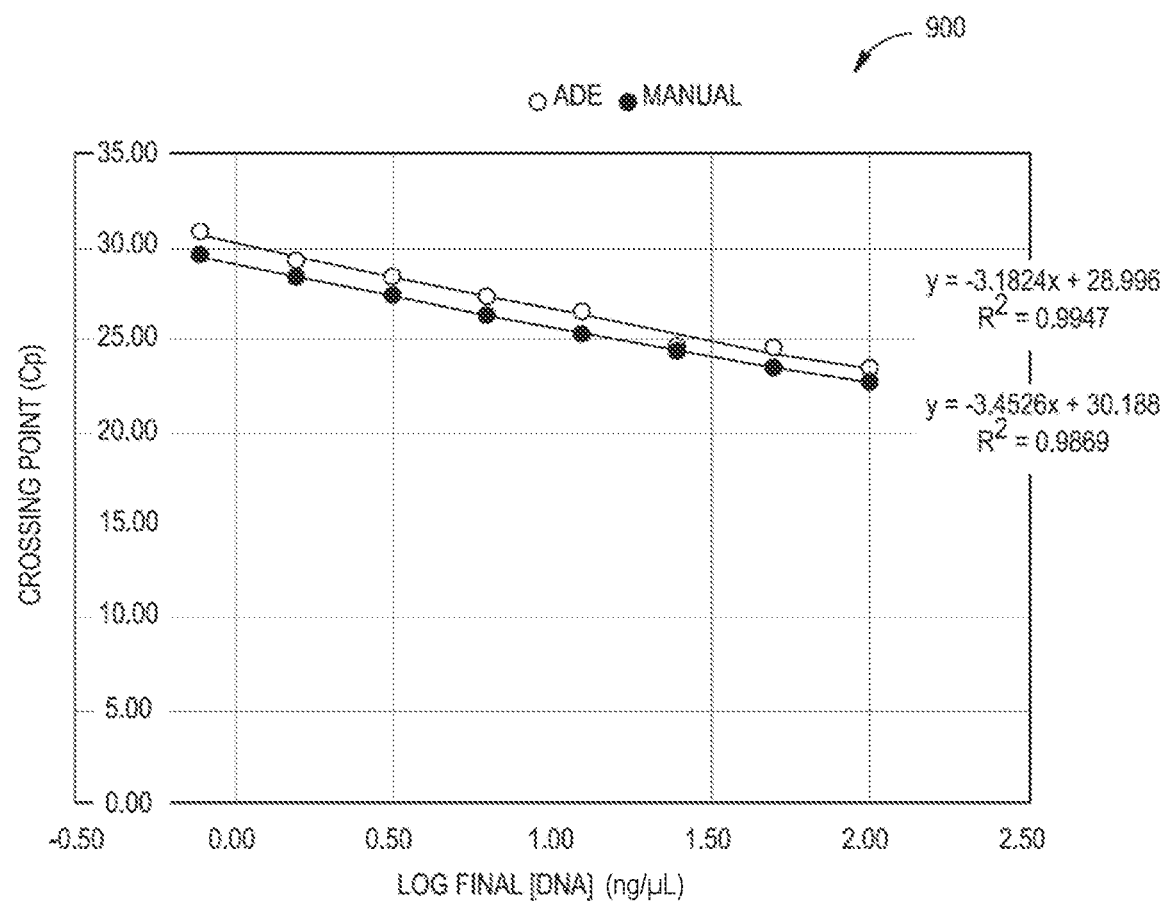
FIG. 9 is a graphical illustration showing the crossing point (Cp) for a series of DNA concentrations showing the relative success of transfer by ADE (Echo) compared with manual pipetting.

FIG. 9 is a plot of the standard curve generated using the transfer indicating a high degree of linearity highlighted by an $R^2$ value of ≥0.99 for the transfer utilizing standard ADE technology and an $R^2$ value of ~0.98 for the manual pipette transfer of the same fragmented gDNA sample. Specifically, FIG. 9 shows Cp versus log [DNA] for all technical replicates of sheared 8 Kb PROMEGA® sample (N=32). The ADE transfer precision shown as a percent CV was less than 2%. This set of experiments serves as a baseline for the "expected" result quality. Note that the hand pipetted control results have a lower linearity than the ADE results, albeit still acceptable.

Experimental Data Using Untreated, Unfragmented, Intact, Native gDNA from Commercially Available Sources and Utilizing the Non-Newtonian Calibration.

Figure 11:
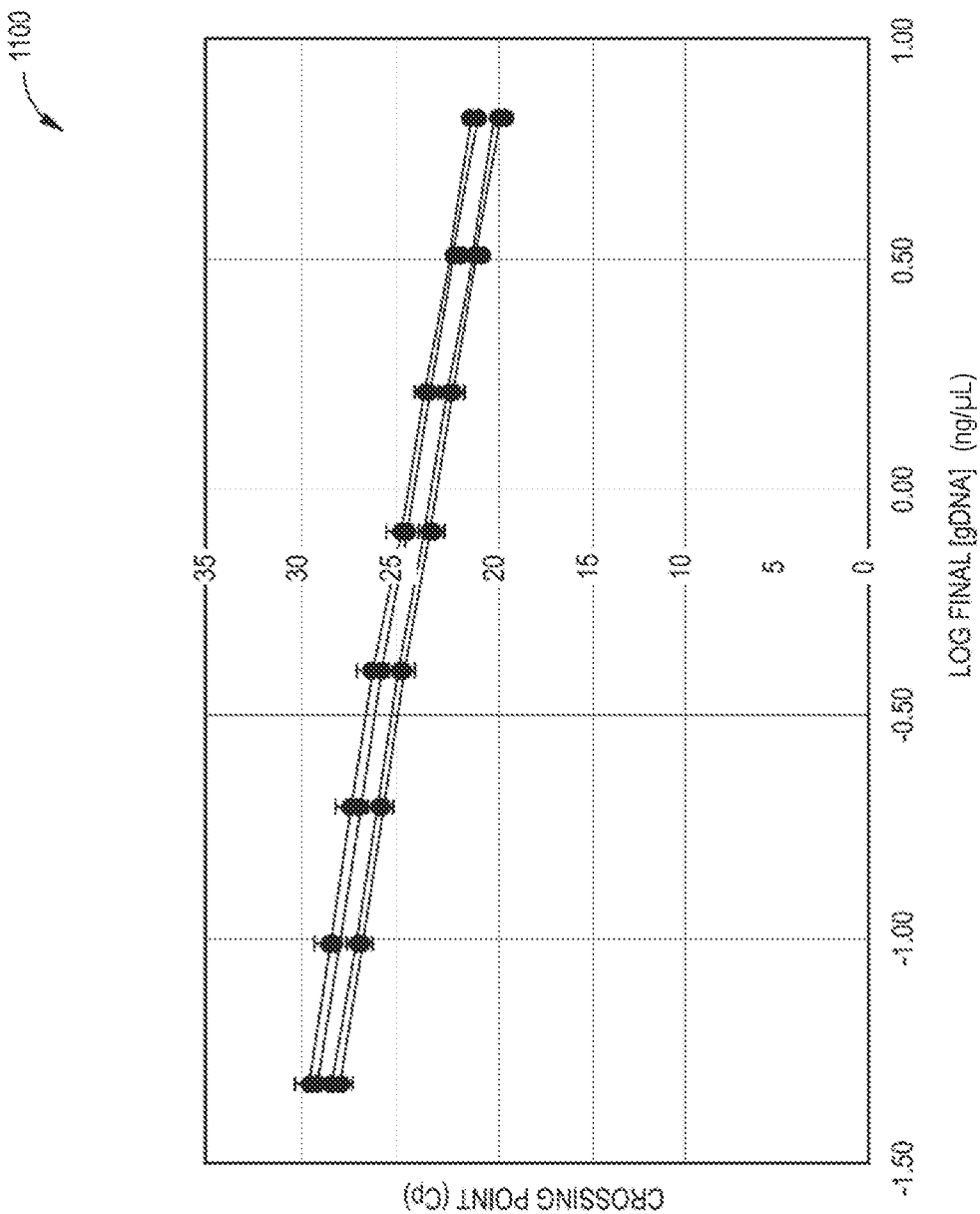
FIG. 11 is a plot showing Cp versus log [DNA] for biological and technical replicates of native gDNA.
Figure 12:
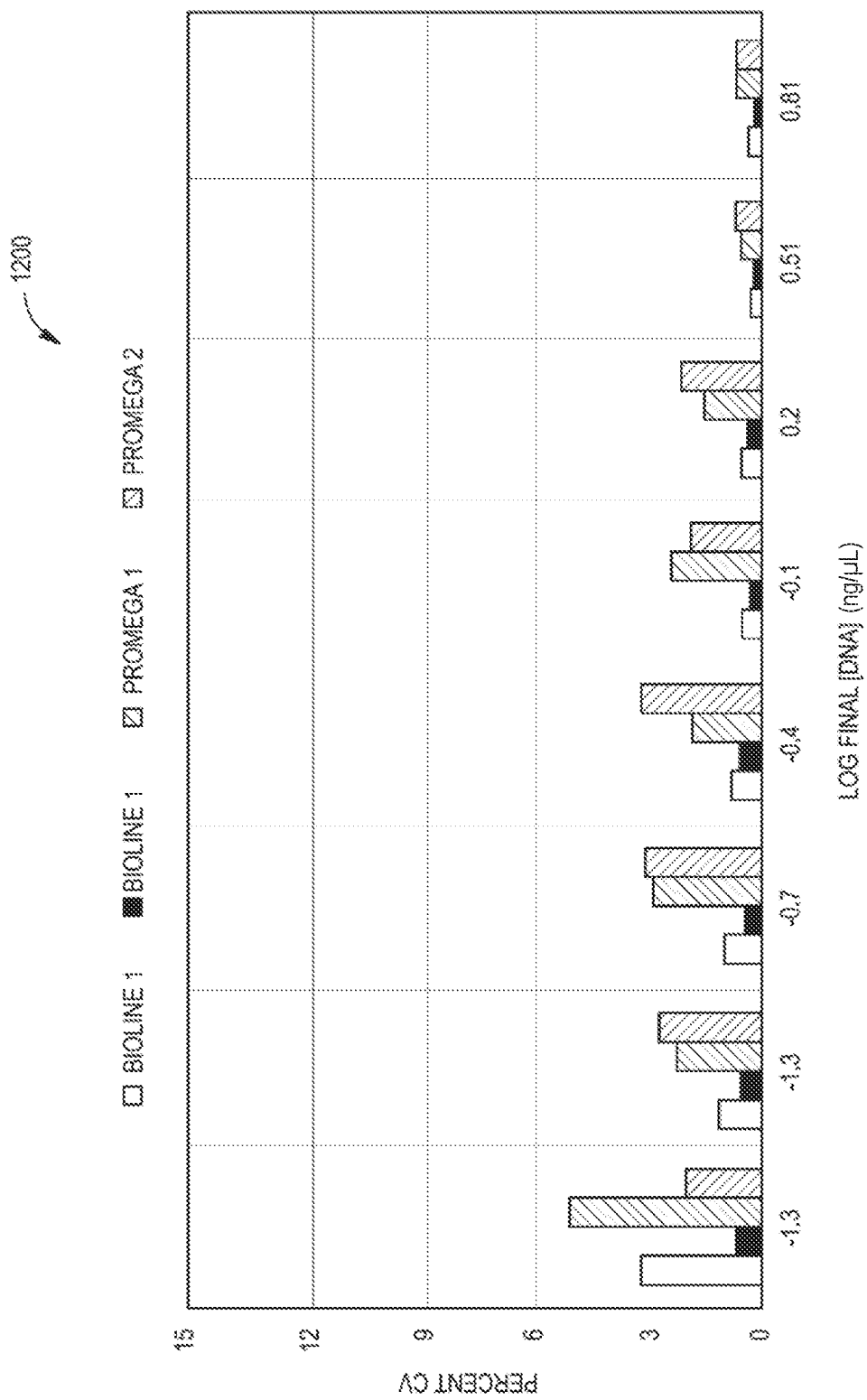
FIG. 12 is a plot showing the percent CV of the Cp curves shown in FIG. 11.

Next steps were to test the newly determined parameter space (tone burst and ejection energy regime) for non-Newtonian viscoelastic fluids utilizing native gDNA from two commercial sources, BIOLINE® and PROMEGA®, with fragment sizes of 40 Kb and 56 Kb respectively. These samples were manually pipetted into an acoustically qualified tube for preparation for transfer according to the techniques described herein. These samples were analyzed to determine and confirm the fragment size using the AATI Fragment Analyzer (AATI, Ames, IA). The experimental results are shown in FIG. 10 highlighting that the samples are indeed 41 Kb and 56 Kb in length. Next the non-Newtonian tone burst and higher energy calibration was applied to ADE transfers with an Echo 550 liquid handler on native gDNA (unadulterated). The concentration of each native gDNA sample in the source tube was 200 ng/µL (also confirmed with the NanoDrop instrument (THERMOFISHER), results not shown). Transfer volumes ranged from 2.5 nL to 320 nL (1 droplet up to 128 droplets) into a destination plate that served also as a source plate for the qPCR assay. To address reproducibility, accuracy and precision for each biological sample, 32 technical replicates were transferred at each experimental condition (to exemplify statistical significance). Furthermore, to confirm validity of the results these experiments were repeated on multiple days. Table 3, FIGS. 11 and 12 show the Cp values and highlight the validity of the highly reproducibility, highly accurate and highly precise transfer capability using this new calibration for non-Newtonian fluids. For all transfers, the number of replicates transferred were 32 except for the PROMEGA day 1 and 2 where the transfer volume was 5 nL and PROMEGA Day 2 the transfer volume was 2.5 nL. For all other samples, all 32 replicates were transferred. The linearity of the standard curves generated using the transfers all have $R^2$ values of ≥0.99. The percent CV for all transfer was less than 5% (and <3% in most cases).

Figure 10A:
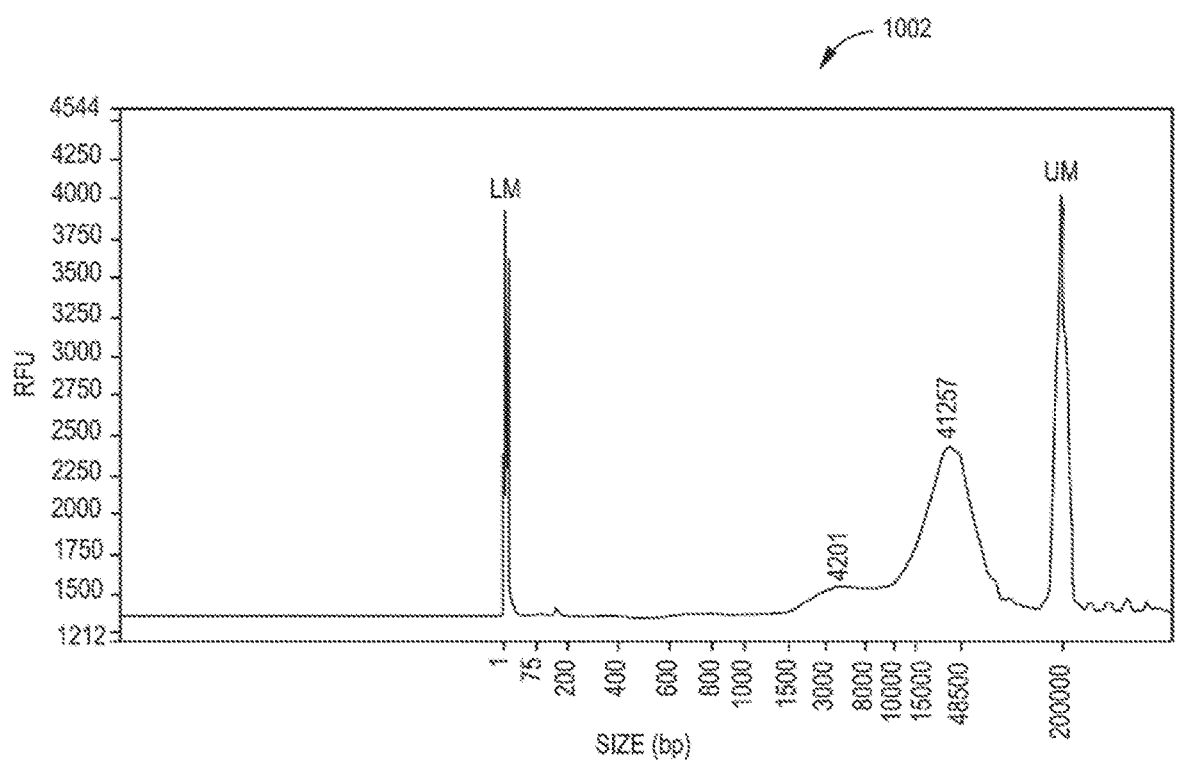
FIG. 10A is an analytical trace for the BIOLINE® gDNA sample.
Figure 10B:
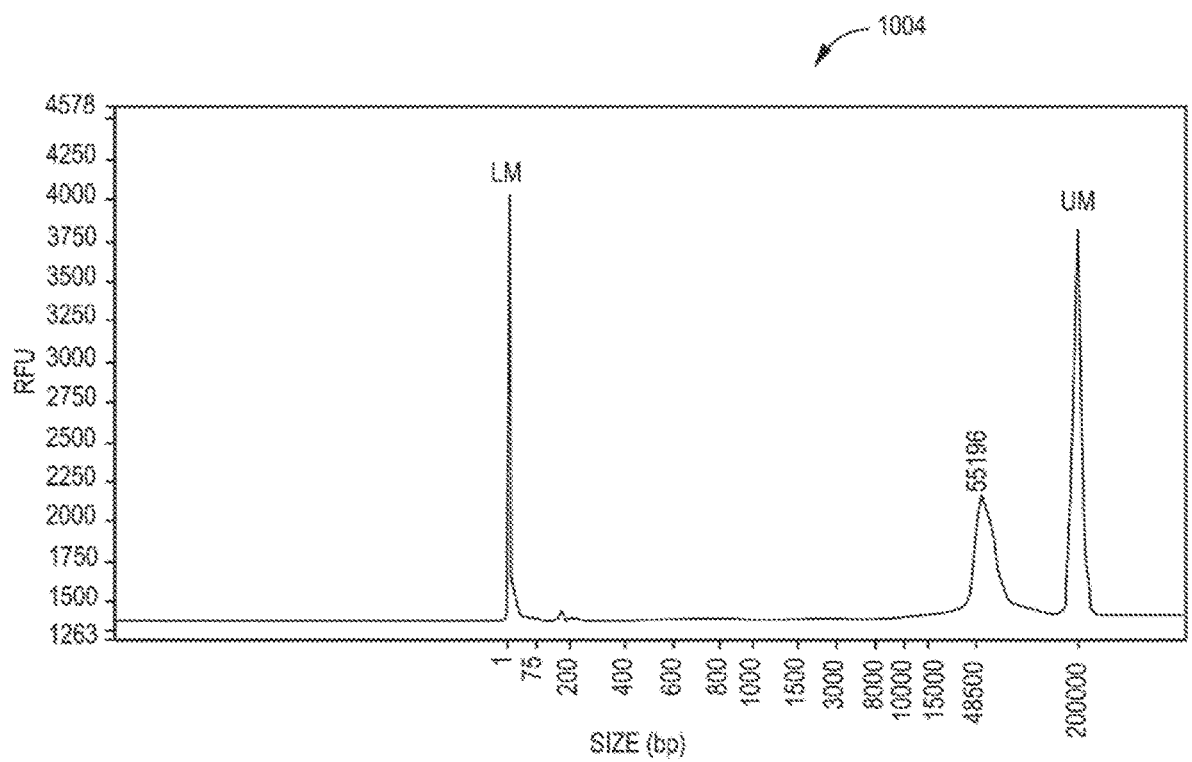
FIG. 10B is an analytical trace for the PROMEGA® gDNA sample.

FIGS. 10A and 10B show AATI Fragment Analyzer traces for the BIOLINE® (40 Kb) sample (FIG. 10A, chart 1002) and PROMEGA® (56 Kb) gDNA samples (FIG. 10B, chart 1004) highlighting that the samples were indeed the size as indicated by the commercial vendor. The qPCR Cp data for these samples is shown below in Table 3.

TABLE 3 qPCR Cp data for the native BIOLINE ® (40 Kb) and PROMEGA ® (56 Kb) samples.

| | | | | | | | | | |
|---|---|---|---|---|---|---|---|---|---|
| | Transfer Vol (nL) | 320 | 160 | 80 | 40 | 20 | 10 | 5 | 2.5 |
| | Final [DNA] (ng/µL) | 6.40 | 3.20 | 1.60 | 0.80 | 0.40 | 0.20 | 0.10 | 0.05 |
| | Log Final [DNA] (ng/µL) | 0.81 | 0.51 | 0.20 | −0.10 | −0.40 | −0.70 | −1.00 | −1.30 |
| BIOLINE Day 1 | Average Cp | 19.90 | 20.97 | 22.31 | 23.62 | 24.90 | 26.13 | 27.32 | 29.24 |
| | Stdev Cp | 0.08 | 0.07 | 0.14 | 0.14 | 0.21 | 0.28 | 0.34 | 0.97 |
| | % CV of Cp | 0.4% | 0.4% | 0.6% | 0.6% | 0.8% | 1.1% | 1.2% | 3.3% |
| | Min Cp | 19.72 | 20.79 | 22.09 | 23.28 | 24.64 | 25.77 | 26.80 | 27.97 |
| | Max Cp | 20.08 | 21.09 | 22.62 | 23.98 | 25.46 | 27.13 | 28.54 | 31.79 |
| | Number of Replicates | 32 | 32 | 32 | 32 | 32 | 32 | 32 | 32 |
| BIOLINE Day 2 | Average Cp | 20.09 | 21.17 | 22.47 | 23.72 | 24.95 | 26.17 | 27.46 | 28.54 |
| | Stdev Cp | 0.05 | 0.07 | 0.10 | 0.09 | 0.16 | 0.14 | 0.18 | 0.21 |
| | % CV of Cp | 0.3% | 0.3% | 0.5% | 0.4% | 0.6% | 0.5% | 0.6% | 0.7% |
| | Min Cp | 20.01 | 21.07 | 22.22 | 23.56 | 24.74 | 25.97 | 27.01 | 27.99 |
| | Max Cp | 20.22 | 21.33 | 22.68 | 23.89 | 25.56 | 26.63 | 27.88 | 28.90 |
| | Number of Replicates | 32 | 32 | 32 | 32 | 32 | 32 | 32 | 32 |
| PROMEGA Day 1 | Average Cp | 21.14 | 21.89 | 23.32 | 25.08 | 26.10 | 27.10 | 28.23 | 29.00 |
| | Stdev Cp | 0.15 | 0.13 | 0.37 | 0.61 | 0.50 | 0.81 | 0.67 | 1.51 |
| | % CV of Cp | 0.7% | 0.6% | 1.6% | 2.5% | 1.9% | 3.0% | 2.4% | 5.2% |

TABLE 3-continued qPCR Cp data for the native BIOLINE ® (40 Kb) and PROMEGA ® (56 Kb) samples.

|  |  |  |  |  |  |  |  |  |
|---|---|---|---|---|---|---|---|---|
|  | Min Cp | 20.94 | 21.6 | 22.7 | 23.79 | 25.01 | 25.98 | 26.8 | 27.95 |
|  | Max Cp | 21.64 | 22.33 | 24.16 | 26.63 | 27.15 | 28.93 | 28.97 | 36.23 |
|  | Number of Replicates | 32 | 32 | 32 | 32 | 32 | 32 | 26 | 26 |
| PROMEGA Day 2 | Average Cp | 21.26 | 22.09 | 23.46 | 25.04 | 26.50 | 27.78 | 28.63 | 29.73 |
|  | Stdev Cp | 0.15 | 0.16 | 0.50 | 0.49 | 0.85 | 0.87 | 0.79 | 0.62 |
|  | % CV of Cp | 0.7% | 0.7% | 2.1% | 2.0% | 3.2% | 3.1% | 2.8% | 2.1% |
|  | MinCp | 21.02 | 21.85 | 22.69 | 24.03 | 25.48 | 26.6 | 27.43 | 28.92 |
|  | Max Cp | 21.63 | 22.46 | 24.57 | 26.2 | 28.98 | 29.9 | 30.71 | 31.57 |
|  | Number of Replicates | 32 | 32 | 32 | 32 | 32 | 32 | 32 | 28 |

FIG. 11 shows qPCR data as measured by Cp versus log [DNA] for biological and technical replicates of native gDNA (N=26-32), and FIG. 12 shows the percent CV of the Cp versus log [DNA] for all biological and technical replicates described in Table 3. The high linearity is showcased by the $R^2$ value >0.99 in FIG. 11. Furthermore, the high precision and reproducibility is showcased by the low CV values for the replicates at each concentration of the experimental runs in FIG. 12.

Figure 13:
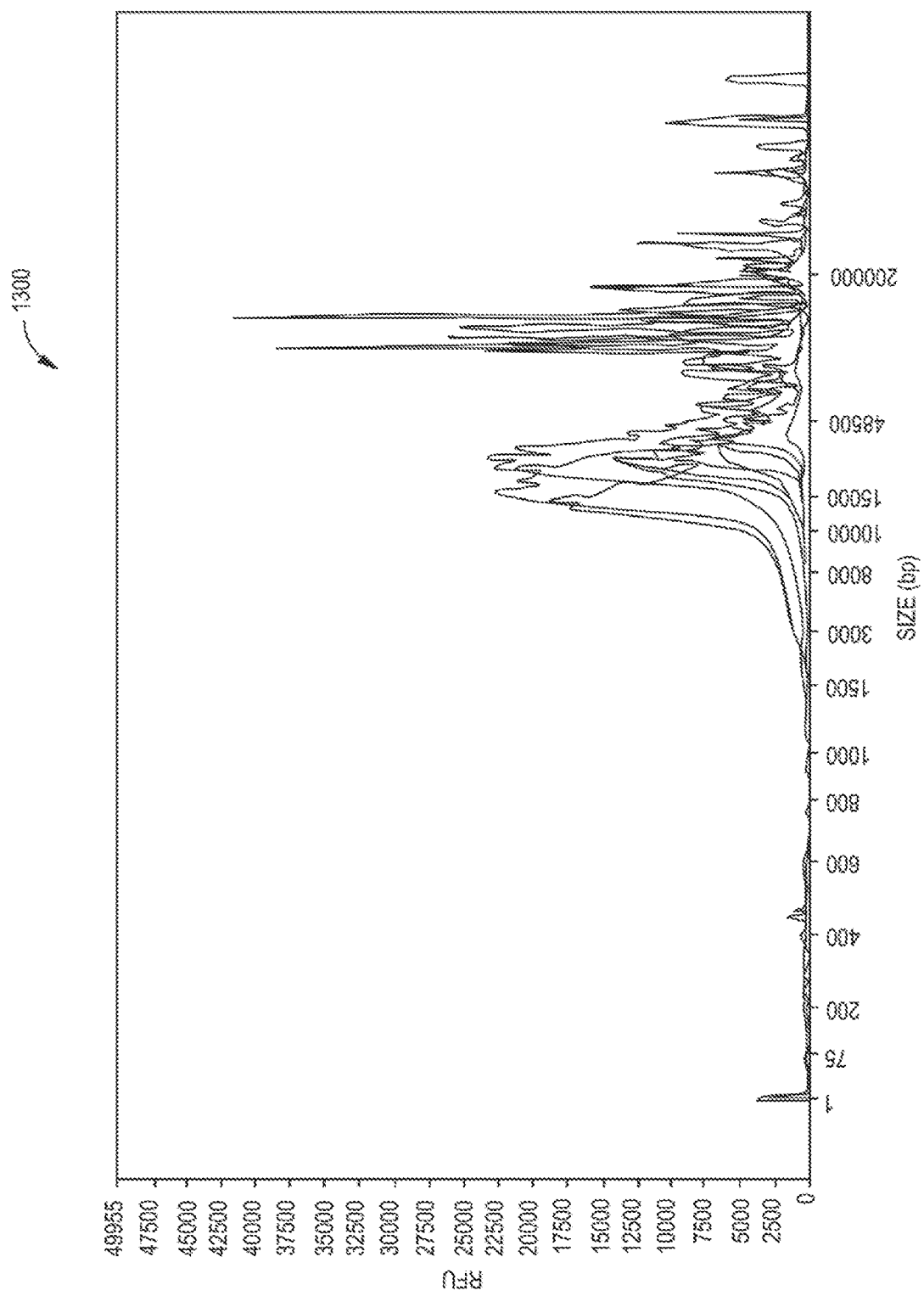
FIG. 13 shows an analytical trace for the human gDNA samples showcasing large fragment size.
Figure 14:
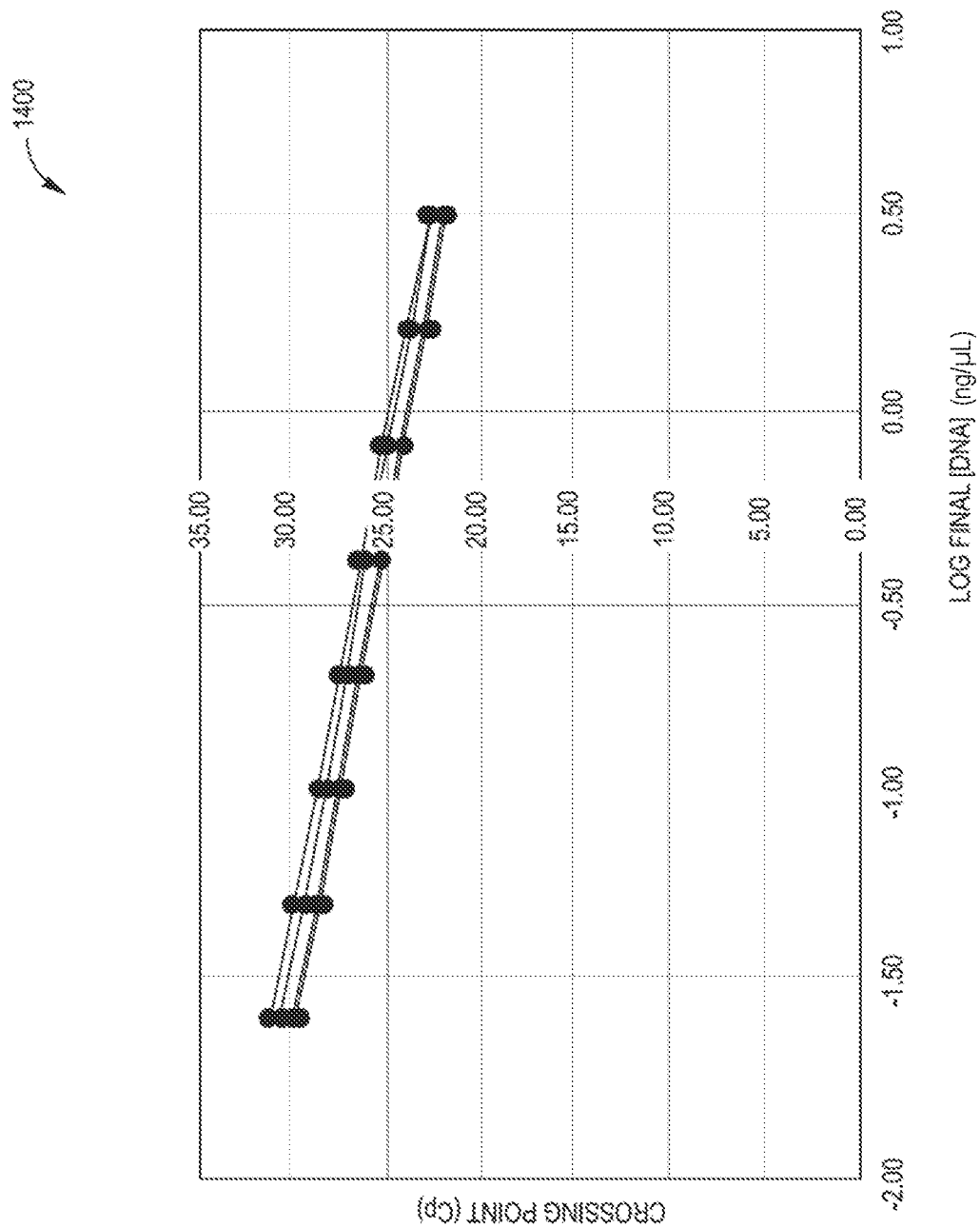
FIG. 14 is a plot showing Cp versus log [DNA] for a series of biological gDNA replicates.
Figure 15:
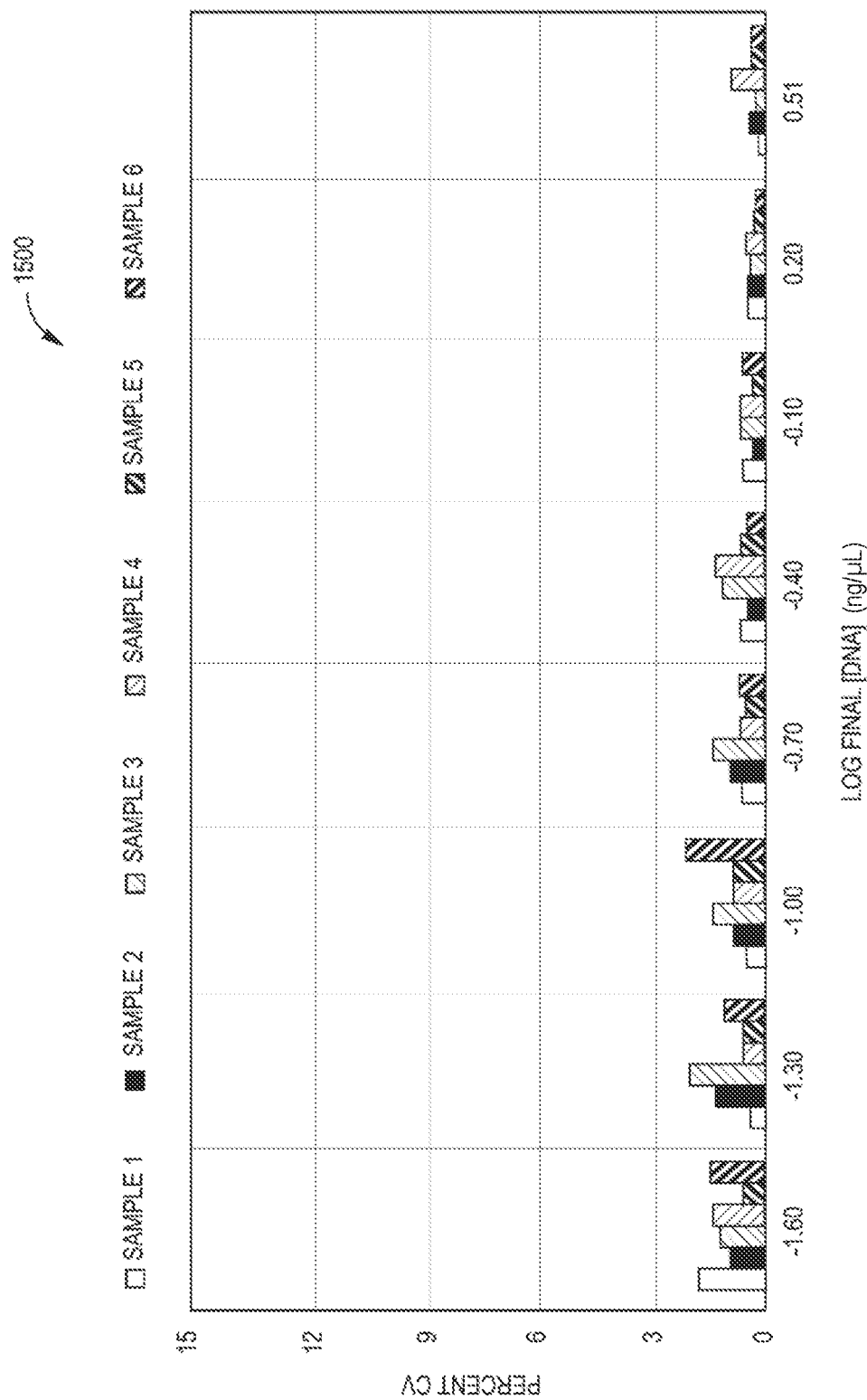
FIG. 15 is a plot showing shows the percent CV of Cp versus log [DNA] data for the series of replicates described in FIG. 14.

Experimental Data Using Untreated, Unfragmented, Intact, Native gDNA from Human Samples Utilizing the Non-Newtonian Calibration Native gDNA from six human samples extracted from whole blood, all with fragment sizes greater than 15 kKb with the largest fragment population approximately 150 Kb, were next transferred from an acoustically qualified tube (FIG. 13). The concentration of each native gDNA sample in the source tube was determined to be between 100 ng/µL to 175 ng/µL (as verified by NanoDrop results not shown). The transfer volumes ranged from 1 droplet (2.5 nL) to 128 droplets (320 nL) into a qPCR source well for loading the reaction. To address precision, for each biological sample, 10 technical replicates were transferred per each condition. Given the limited amounts of gDNA sample, the experiments were performed only once but are not expected to differ. Table 4, FIGS. 14 and 15 showcase the Cp values and highlight once again the high precision, high accuracy and high reproducibility of the transfers of human native gDNA samples. For all samples, all 10 replicates were transferred with a 100% success rate with no dropouts (0% dropout rate). The linearity of the standard curves generated using the transfer all have an $R^2$ value of 0.999. The percent CV of the Cp for all transfer were <2.5%.

TABLE 4 qPCR Cp data for the 6-human native gDNA samples

|  |  |  |  |  |  |  |  |  |  |
|---|---|---|---|---|---|---|---|---|---|
|  | Transfer Vol (nL) | 320 | 160 | 80 | 40 | 20 | 10 | 5 | 2.5 |
|  | Final [DNA] (ng/µL) | 6.40 | 3.20 | 1.60 | 0.80 | 0.40 | 0.20 | 0.10 | 0.05 |
|  | Log Final [DNA](ng/µL) | 0.81 | 0.51 | 0.20 | −0.10 | −0.40 | −0.70 | −1.00 | −1.30 |
| Sample 1 | Average Cp | 22.62 | 23.76 | 24.99 | 26.19 | 27.40 | 28.68 | 29.64 | 31.19 |
|  | Stdev Cp | 0.04 | 0.10 | 0.15 | 0.17 | 0.18 | 0.16 | 0.15 | 0.56 |
|  | % CV of Cp | 0.2% | 0.4% | 0.6% | 0.6% | 0.7% | 0.6% | 0.5% | 1.8% |
|  | Min Cp | 22.57 | 23.63 | 24.75 | 26.05 | 27.15 | 28.47 | 29.51 | 30.42 |
|  | Max Cp | 22.71 | 23.98 | 25.22 | 26.63 | 27.61 | 28.93 | 29.99 | 32.25 |
|  | Replicates (valid Cp) | 10 | 10 | 10 | 10 | 10 | 10 | 10 | 10 |
| Sample 2 | Average Cp | 22.33 | 23.55 | 24.79 | 26.00 | 27.22 | 28.32 | 29.31 | 30.44 |
|  | Stdev Cp | 0.10 | 0.11 | 0.09 | 0.12 | 0.26 | 0.24 | 0.40 | 0.30 |
|  | % CV of Cp | 0.4% | 0.5% | 0.4% | 0.5% | 1.0% | 0.8% | 1.4% | 1.0% |
|  | Min Cp | 22.19 | 23.43 | 24.69 | 25.81 | 27.05 | 28.02 | 28.78 | 30.03 |
|  | Max Cp | 22.50 | 23.82 | 24.93 | 26.23 | 27.89 | 28.66 | 30.08 | 30.88 |
|  | Replicates (valid Cp) | 10 | 10 | 10 | 10 | 10 | 10 | 10 | 10 |
| Sample 3 | Average Cp | 21.87 | 22.99 | 24.03 | 25.30 | 26.49 | 27.72 | 29.00 | 29.96 |
|  | Stdev Cp | 0.05 | 0.10 | 0.17 | 0.28 | 0.37 | 0.39 | 0.60 | 0.37 |
|  | % CV of Cp | 0.2% | 0.4% | 0.7% | 1.1% | 1.4% | 1.4% | 2.1% | 1.2% |
|  | Min Cp | 21.79 | 22.86 | 23.83 | 25.01 | 26.05 | 27.22 | 28.00 | 29.27 |
|  | Max Cp | 21.97 | 23.14 | 24.43 | 25.90 | 27.30 | 28.62 | 29.94 | 30.49 |
|  | Replicates (valid Cp) | 10 | 10 | 10 | 10 | 10 | 10 | 10 | 10 |
| Sample 4 | Average Cp | 22.88 | 24.03 | 25.37 | 26.54 | 27.59 | 28.66 | 29.83 | 31.01 |
|  | Stdev Cp | 0.23 | 0.14 | 0.18 | 0.35 | 0.20 | 0.26 | 0.21 | 0.42 |
|  | % CV of Cp | 1.0% | 0.6% | 0.7% | 1.3% | 0.7% | 0.9% | 0.7% | 1.4% |
|  | Min Cp | 22.75 | 23.86 | 25.18 | 26.18 | 27.29 | 28.15 | 29.44 | 30.53 |
|  | Max Cp | 23.53 | 24.30 | 25.72 | 27.27 | 27.83 | 29.06 | 30.07 | 31.60 |
|  | Replicates (valid Cp) | 10 | 10 | 10 | 10 | 10 | 10 | 10 | 10 |
|  | Transfer Vol (nL) | 320 | 160 | 80 | 40 | 20 | 10 | 5 | 2.5 |
|  | Final [DNA] (ng/nL) | 6.40 | 3.20 | 1.60 | 0.80 | 0.40 | 0.20 | 0.10 | 0.05 |

TABLE 4-continued qPCR Cp data for the 6-human native gDNA samples

| | | | | | | | | | |
|---|---|---|---|---|---|---|---|---|---|
| | Log Final [DNA](ng/μL) | 0.81 | 0.51 | 0.20 | −0.10 | −0.40 | −0.70 | −1.00 | −1.30 |
| Sample 5 | Average Cp | 21.96 | 22.98 | 24.11 | 25.29 | 26.44 | 27.60 | 28.74 | 29.63 |
| | Stdev Cp | 0.08 | 0.08 | 0.07 | 0.16 | 0.13 | 0.23 | 0.17 | 0.17 |
| | % CV of Cp | 0.4% | 0.3% | 0.3% | 0.6% | 0.5% | 0.8% | 0.6% | 0.6% |
| | Min Cp | 21.85 | 22.90 | 24.00 | 25.07 | 26.25 | 27.21 | 28.51 | 29.49 |
| | Max Cp | 22.09 | 23.15 | 24.21 | 25.55 | 26.66 | 28.08 | 29.11 | 30.07 |
| | Replicates (valid Cp) | 10 | 10 | 10 | 10 | 10 | 10 | 10 | 10 |
| Sample 6 | Average Cp | 21.78 | 22.75 | 23.88 | 25.04 | 26.19 | 27.40 | 28.44 | 29.64 |
| | Stdev Cp | 0.09 | 0.06 | 0.12 | 0.13 | 0.18 | 0.58 | 0.32 | 0.42 |
| | % CV of Cp | 0.4% | 0.3% | 0.5% | 0.5% | 0.7% | 2.1% | 1.1% | 1.4% |
| | Min Cp | 21.66 | 22.66 | 23.69 | 24.86 | 26.01 | 26.92 | 28.05 | 29.12 |
| | Max Cp | 21.96 | 22.84 | 24.05 | 25.23 | 26.55 | 28.92 | 29.00 | 30.35 |
| | Replicates (valid Cp) | 10 | 10 | 10 | 10 | 10 | 10 | 10 | 10 |

FIG. 13 shows AATI Fragment Analyzer traces 1300 for the human gDNA samples showcasing the large fragment size. The gDNA size was assessed in FIG. 13 and confirmed to be of large fragment size for the samples. FIG. 14 shows qPCR data as measured by Cp vs. Log [DNA] data 1400 for all biological and technical replicates as described in Table 4. The transfer results showcase highly reproducible transfers and highly linear transfers with $R^2$ values >0.99 for 6 different samples of human gDNA. FIG. 15 shows the percent CV of Cp versus log [DNA] data 1500 for biological and technical replicates for all human samples as described in Table 4. The CV of the Cp's for all transfers of biological and technical replicates was 3.2% or below.

Pre and Post Transfer Analysis

Genomic DNA sample integrity is a key concern for many biological applications, workflows and specifically for gDNA stores and repositories. Data highlighted in the sections confirm that native gDNA transferred by ADE with a novel tone burst and acoustic energy range as well as the transferred gDNA could then be amplified successfully in a qPCR assay to assess the quality. To further assess the characteristics of the transferred native gDNA, post transfer samples were analyzed to determine and confirm the fragment size using the AATI Fragment Analyzer (AATI) and the native gDNA retained its integrity (with minimal shear). FIGS. 16A-16F and table 5 all show the AATI Fragment Analyzer traces for the human native gDNA samples obtained commercially from BIOLINE® and PROMEGA® and the human samples.

The AATI traces for each of these samples show either minor augmentation (within the experimental error of the technique) of the gDNA size or a small downward shift for the post transfer condition, suggesting a possible minor amount of shear. However, in all cases the gDNA post transfer in any of these samples is greater than 20 Kb—which was the limit of the Newtonian tone burst and acoustic energy transfer capability. The AATI instrument also has a DNA quantification accuracy of ±25% and DNA quantification precision of 20% CV. All the data presented here fall well within these specifications. The data generated here is representative of large fragment gDNA, and is shown in Table 5, below, which shows the fragment size (Kb) for commercial and human native gDNA samples that were either manually pipetted (control) compared to the same samples pre- and post-transfer utilizing the novel acoustic non-Newtonian parameters.

TABLE 5

Fragment size (Kb) for commercial and human native gDNA samples.

| | Fragment Size (Kb) | | |
|---|---|---|---|
| Samples | Pipetted transfer | Pre-transfer | Post-transfer |
| BIOLINE | 40.9 | 40.4 | 39.0 |
| PROMEGA | 63.6 | 59.6 | 23.4 |
| Sample 1 | 59.4 | 51.9 | 35.2 |
| Sample 2 | 66.2 | 70.2 | 62.5 |
| Sample 3 | 54.7 | 41.6 | 46.3 |
| Sample 4 | 54.3 | 41.8 | 41.8 |

Figure 16A:
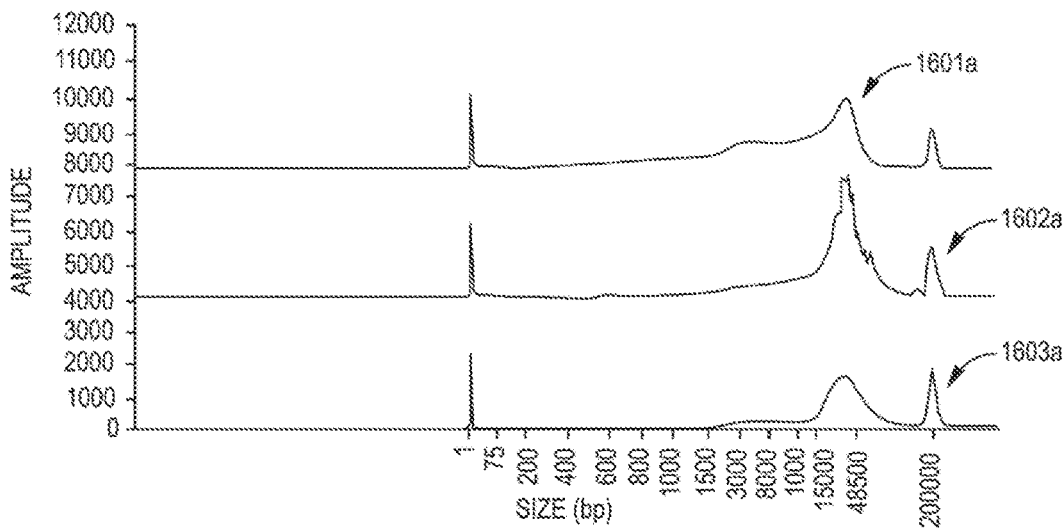
FIG. 16A shows an analytical trace for a BIOLINE® DNA sample.
Figure 16B:
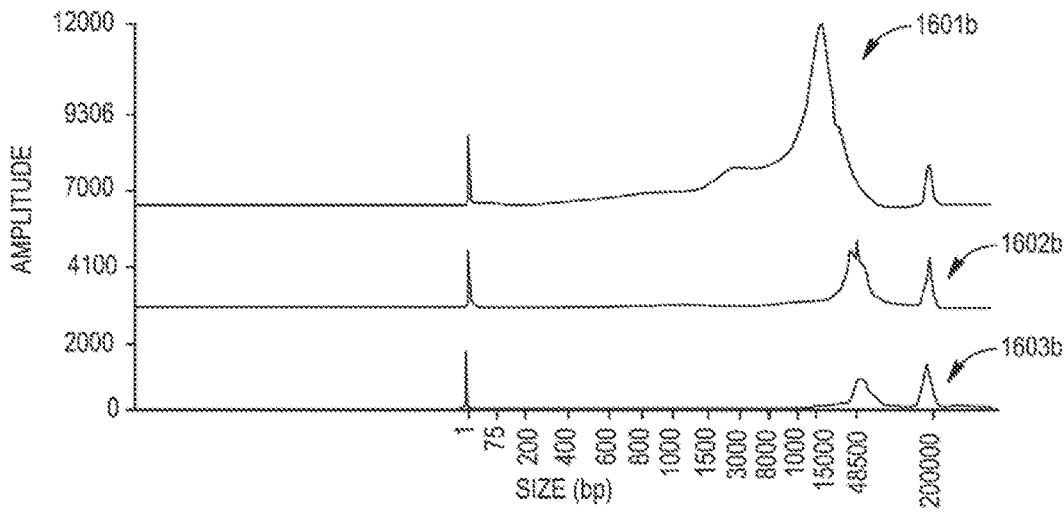
FIG. 16B shows an analytical trace for a PROMEGA® DNA sample.
Figure 16C:
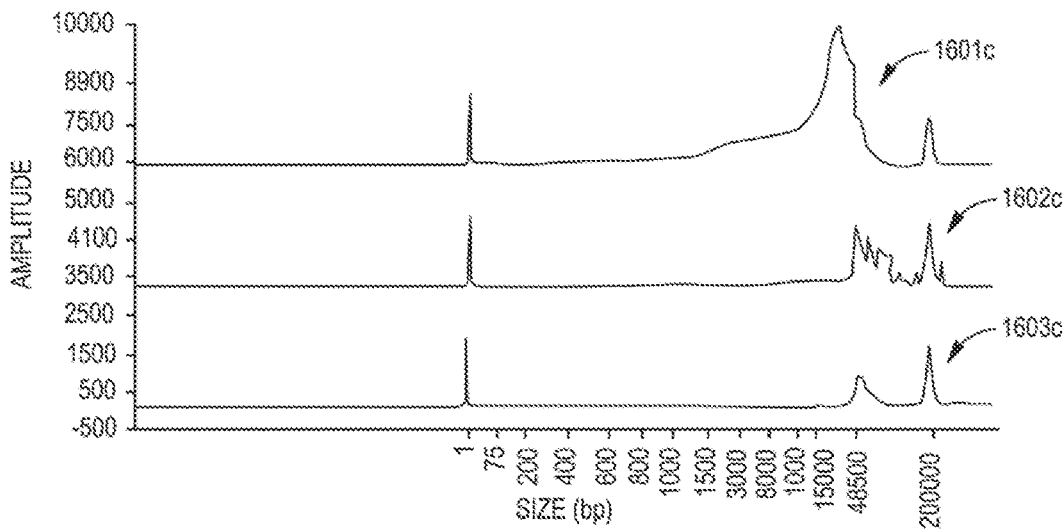
FIGS. 16C-16F show a series of analytical traces for first, second, third, and fourth human native gDNA samples.
Figure 16D:
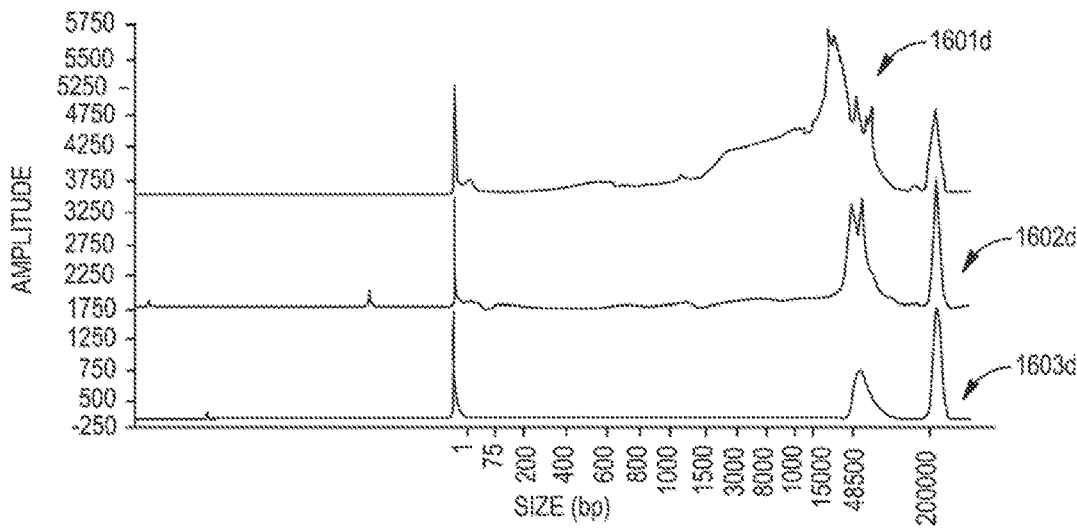
Figure 16E:
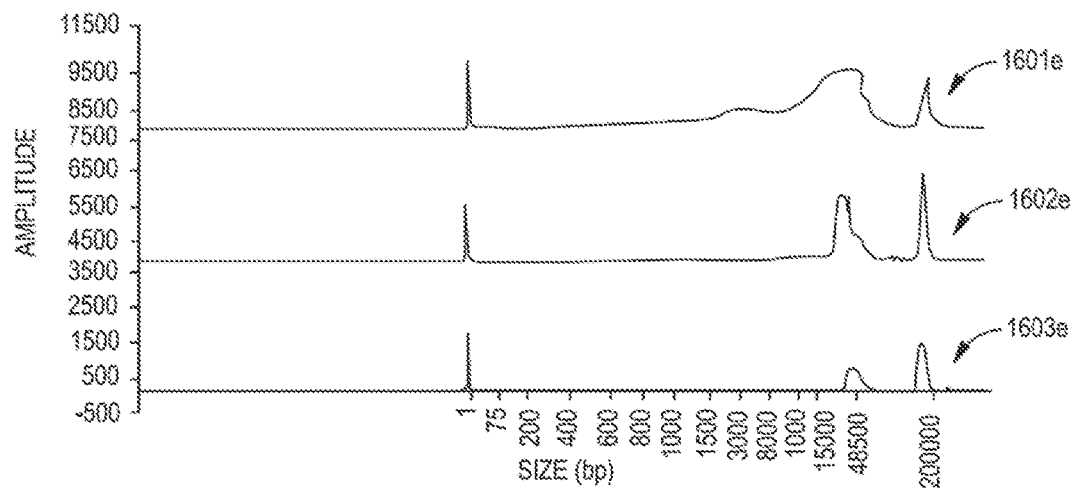
Figure 16F:
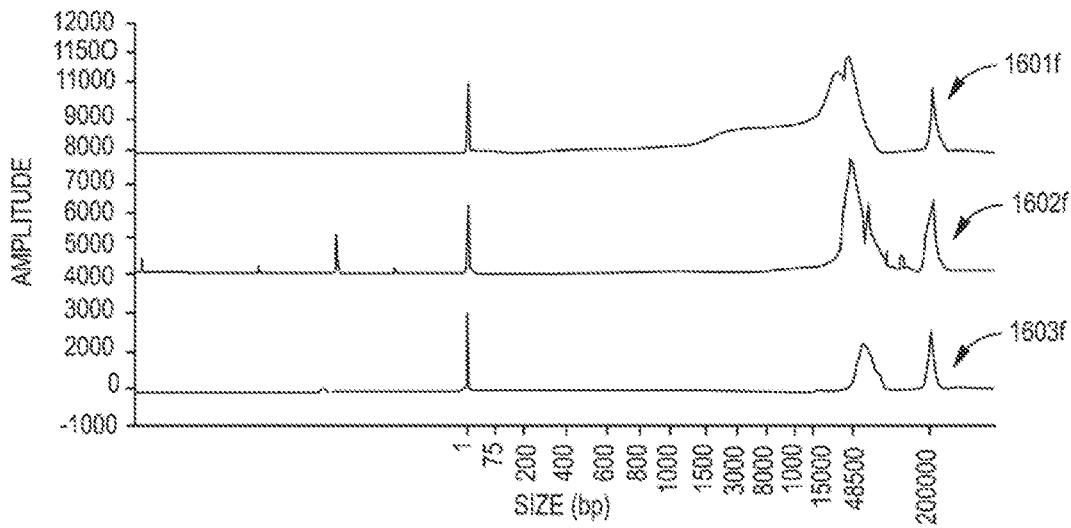

Fragment characteristics are shown in the AATI Fragment Analyzer traces (FIGS. 16A-16F) for the manually pipetted (bottom—1603a-1603f), pre-(middle—1602a-1602f) and post-transfer (top—1601a-1601f) traces for each selected type of gDNA samples. FIG. 16A shows the traces for BIOLINE gDNA sample. FIG. 16B shows the traces for PROMEGA gDNA sample, and FIGS. 16C-F show the traces for each of the human native gDNA samples Sample 1 (FIG. 16C), Sample 2 (FIG. 16D), Sample 3 (FIG. 16E), and Sample 4 (FIG. 16F).

Melt Curve Analysis

Successful qPCR reactions are not only based on DNA amplification but also melt curve analysis. During the qPCR reaction, as the amplicons are generated, the fluorescent SYBR green dye binds to the double stranded DNA (dsDNA) and these complexes fluoresce, producing the fluorescence signal and the characteristic amplification curve. The amplification curve is made up of 3 phases—the initiation phase, the exponential phase and the plateau phase. The initiation phase is almost always below the fluorescence detection level. In the exponential phase, newly synthesized dsDNA copies are made, which are thus represented by an increase in fluorescence as the SYBR dye binds to the dsDNA. Finally, the plateau phase indicates the end of the reaction and is also termed the stabilization phase.

Figure 17:
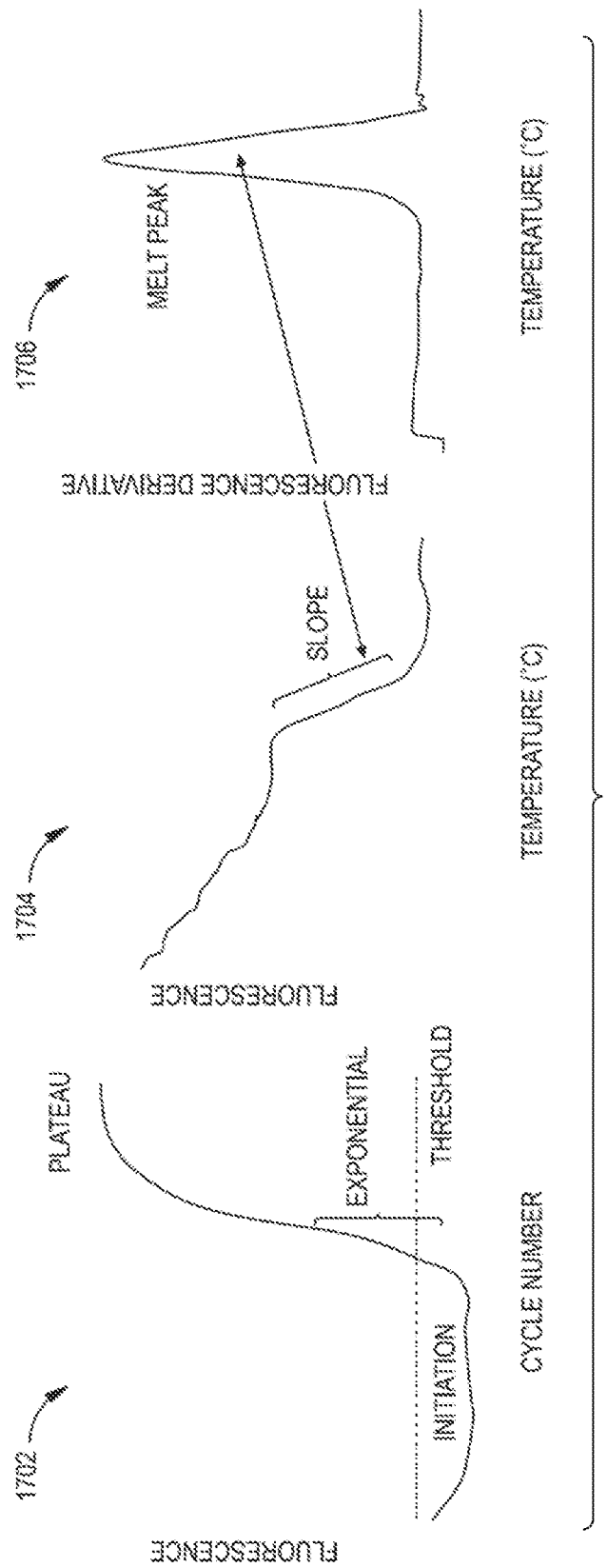
FIG. 17 is a series of fluorescence and fluorescence derivative plots illustrating an amplification curve and melt study for assessing success of a qPCR reaction.

Each specific amplicon has a characteristic amplification curve. As the amplification occurs, the number of qPCR cycles are recorded so that a threshold, called cycle threshold (Ct) or crossing point threshold (Cp) in the exponential phase is utilized to evaluate the level that which amplification occurs (see FIG. 17, plot 1702). The amplification curve is plotted as a function of crossing point (Cp), also known as cycle threshold (Ct) or cycle number. The lower the number of cycles (Ct or Cp) the higher the initial amount of DNA. The higher the number of cycles (Ct or Cp) the lower amount of initial DNA, meaning it takes more cycles as the concentration of the DNA increases per cycle. To ensure specificity of the qPCR reaction, a melt curve analysis was also done, to measure the temperature at which the amplicon dissociates from dsDNA to single stranded DNA (ssDNA). After amplification, the double stranded, SYBR green bound amplicons, were exposed to an incremental increase in temperature (plot 1704). When the temperature is above that of the melting temperature of the primers, the amplicons dissociate and the SYBR green fluorescent signal decreases. The slope of this curve is then plotted as a function of temperature to produce the melt curve, an analysis used by most researchers in the art (FIG. 17, plot 1706).

In all the studies described here, the β-actin amplicon is 266 base pairs (bp) and has a melting peak temperature at 88±1° C. The positive control 8-point 2-fold dilution standard curve ranging from 100 to 0.78 ng/4 showed amplicon Cp/Ct in the range from 20 to 32, respectively.

Techniques described herein can be applied to a variety of sample types and sample transfer protocols. For example, in many research and clinical labs, genomic deoxyribonucleic acid (gDNA) is extracted from both fresh and archived samples including. but not limited to bacteria, virus, plant, whole blood (WB) and components (plasma, serum), tissues, formalin-fixed paraffin-embedded (FFPE) tissues, cells, saliva (-buccal), urine and cerebrospinal fluid (CSF).

The techniques described herein are useful in any DNA technology application that requires high sample integrity (for example samples from bio stores or repositories) where intact native gDNA is desired to be handled by a liquid handler for downstream applications. As DNA is the cornerstone building block of life, the applications are far reaching and can be used in clinical/diagnostic applications, medical research, medical therapies, pharmaceutical/biotechnology research applications, agricultural applications and forensics.

Some embodiments of the present invention enable highly reproducible, highly accurate and highly precise acoustic droplet ejection of viscoelastic polymer melts and polymeric solutions previously not accessible by ADE. In the past, methodologies to reduce viscosity and reduce elasticity such as heating and diluting polymer melt or polymer solution samples with solvents exhibited marginal levels of success and involved altering the native sample and potentially compromising the sample (via heat deactivation or solvent driven degradation). Some embodiments of the present invention have the potential to address semi-conductor applications such as deposition of photo-resist or the ability to miniaturize investigations of polymeric samples and polymer melts. Furthermore, drug delivery applications could also be enabled as high doses of "timed-release" drugs could be doped into polymeric solutions that can be transferred to a receiver creating a hyper-disperse "loaded" drug delivery agents in the form of a uni-dispersed spheres which have the highest surface area to volume ratio to deliver the drug most efficiently.

Figure 18:
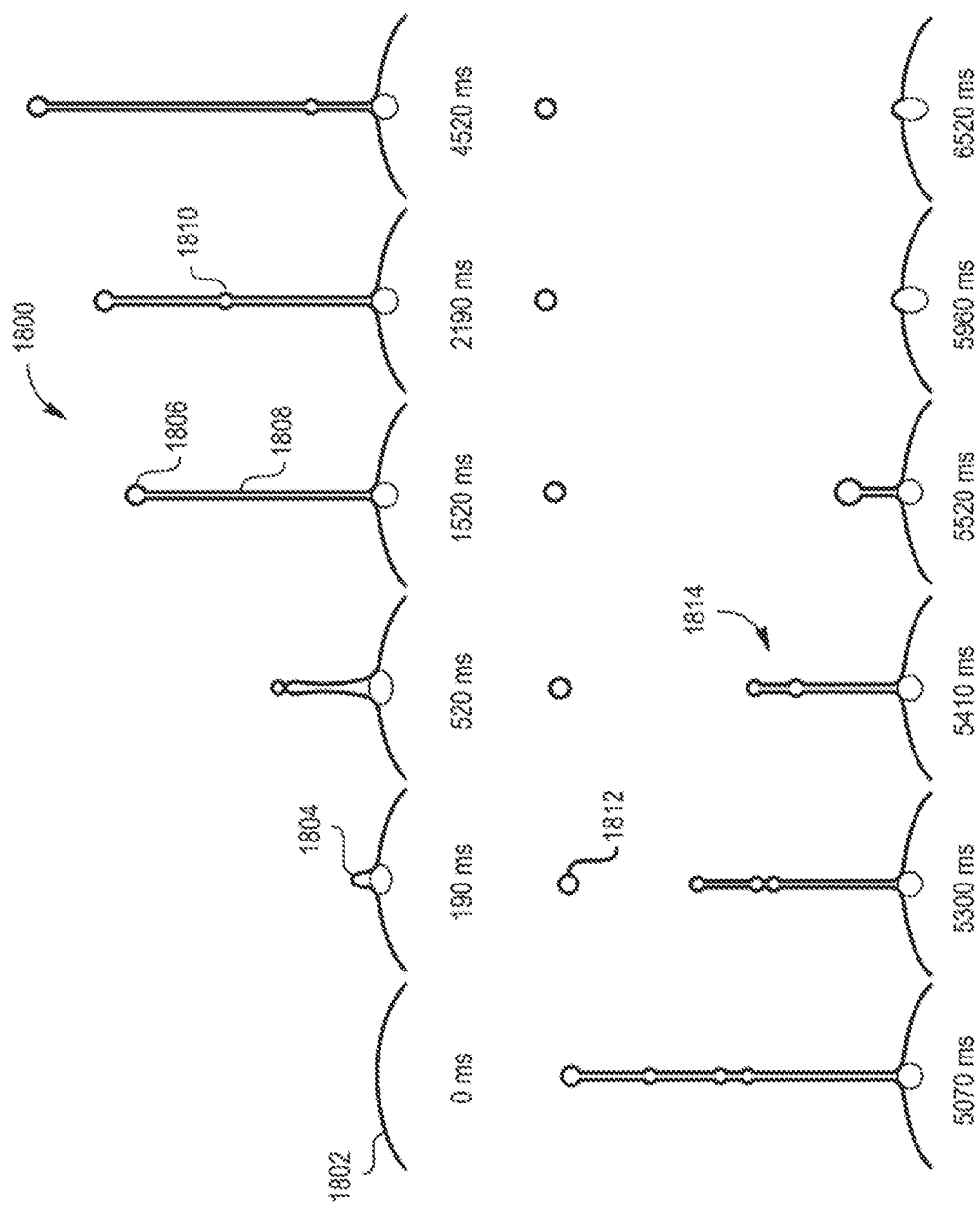
FIG. 18 shows the time evolution of the drop formation for a human gDNA solution.

FIG. 18 shows the time evolution of the drop formation for a non-Newtonian liquid that exhibits shear-thinning behavior. The fluid comprises gDNA from a PROMEGA®. Note the long filament formation and long timescale required before release of droplet compared to a Newtonian fluid with similar viscosity. The present disclosure enables the head of the filament to break into a droplet in a robust manner meaning the volumes of these droplets are consistent, and the filament retreats back to the reservoir without breaking up further (with beads on a chain retracting reproducibly). This was performed using the transducer on our Echo 550 and Echo 555 instruments that generate 2.5 nL drops (higher frequency, shorter wavelength). The droplet size here is estimated to be roughly 2.5 nL. These methods can be applied with any suitable non-Newtonian fluid, and particularly standard nucleic acid elution buffers, such as but not limited to water or TE.

As shown in FIG. 18, applying acoustic energy to a fluid surface 1802 induces droplet ejection by creating a mound 1804 that further develops into a leading lobe 1806 and filament 1808. In existing methods of ADE, acoustic energy provides a slug of momentum that forces fluid away from the fluid surface; but for non-Newtonian fluids, these methods tend to create a transient lobe that separates readily from the fluid surface 1802 or is reabsorbed. According to embodiments described herein for ejecting droplets of non-Newtonian fluids, the initial tone burst generates an elongated filament 1808 that contains a large proportion of the fluid raised from the fluid surface 1802. Some non-Newtonian fluids, when drawn into the elongated filament 1808, also generate a series of accumulations or beads 1810 of fluid along the filament which could consist of 1, 2, 5, 10 or more beads where the size of the beads may vary between 10, 20% or 50% thicker than the filament diameter under 50%, 75% or 90% of the resulting droplet during the elongation phase. When traditional ADE methods are applied to a non-Newtonian fluid at low or standard ejection amplitudes for Newtonian fluids, the effective elasticity of the filament 1808 tends to prevent droplet ejection. Conversely, when traditional ADE methods are applied at very high amplitudes, the filament 1808 will tend to break between the beads 1810, causing unpredictable ejection of multiple smaller droplets. This effect is undesirable not only for the loss of control in droplet ejection volume, but because the sudden separation of an elongated filament 1808 can shear DNA or other contents of the fluid. In contrast, methods described herein provide for a clean separation between the droplet 1812 and a remainder 1814 of the elongated filament 1810. In some embodiments, the separation of droplet 1812 can occur when the filament 1810 is very long in comparison to the droplet diameter. Separation can occur for filament lengths of over 2, over 5, or over 10, or over 20, or over 50, over 100 times the ejected droplet diameter or even more in some embodiments. During retraction of the filament in some embodiments, beads may combine with each other or coalesce into the retreating remainder 1814, so the number of beads will decrease and size of the merged beads will grow as it retreats towards the meniscus. In some embodiments, the volume of droplet 1812 can be significantly smaller than the volume contained within the filament 1810 at the time of separation, e.g., having a diameter less than 10% of the length of the fluid filament 1810. In some embodiments, the volume contained in the ejected droplet 1812 can be less than 50%, less than 10%, or less than 5% of the volume of the remainder 1814.

Figure 19:
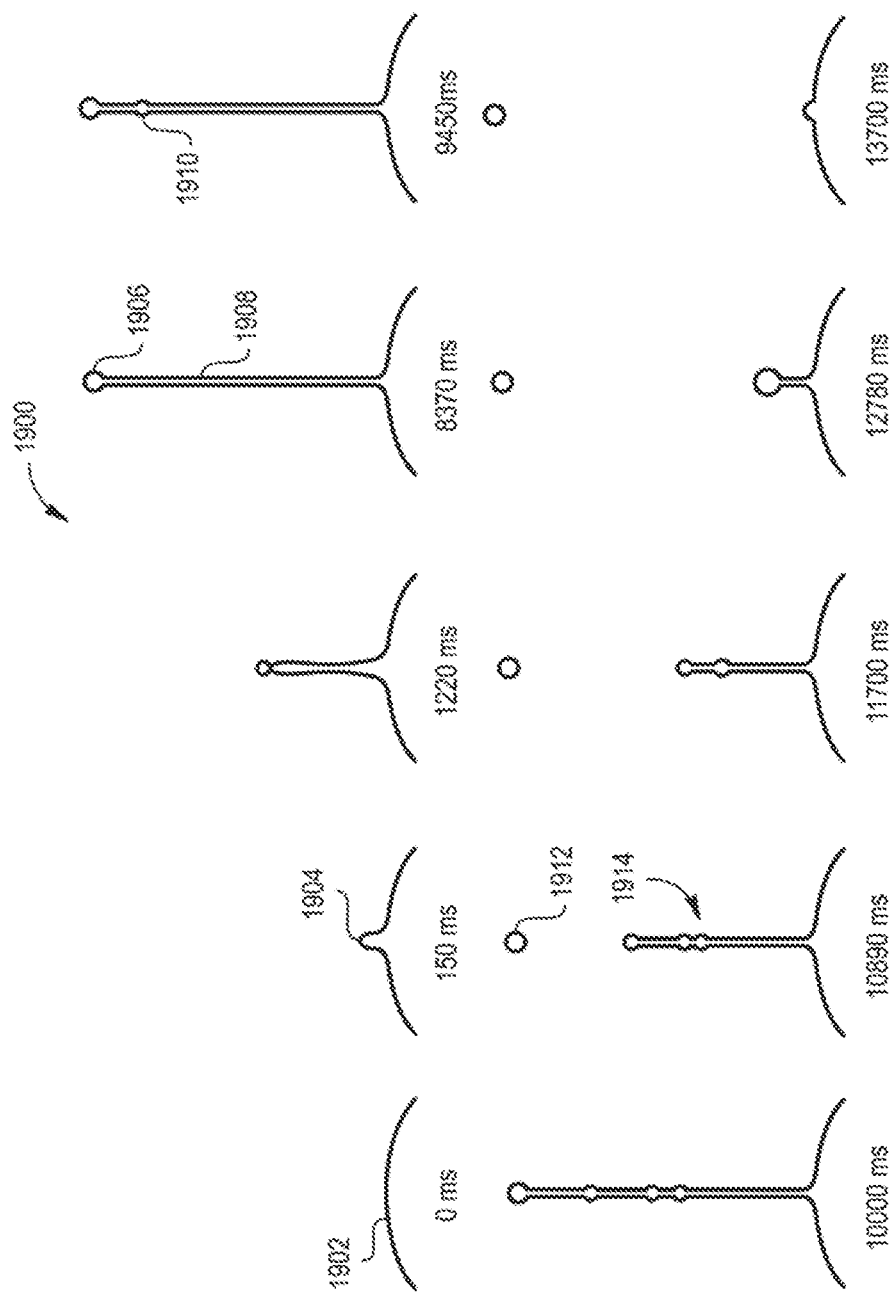
FIG. 19 shows the time evolution of the drop formation for a different sample of human gDNA solution and a different size scale.

FIG. 19 is a schematic chart 1900 that shows the time evolution of the drop formation for a different DNA solution and a different size scale. Here, the fluid was from BIO-LINE® and the transfer performed on an Echo 525 instrument (lower frequency and larger wavelength that Echo 550 or Echo 555 instruments) making nominal drop sizes of 25 nL. As shown in FIG. 19, applying acoustic energy to the fluid surface 1902 also induces droplet ejection by creating a mound 1904 that further develops into a leading lobe 1906 and filament 1908. The initial tone burst generates an elongated filament 1908 that contains a large proportion of the fluid raised from the fluid surface 1902. In response to the additional tone bursts, the droplet 1912 and a remainder 1914 of the elongated filament 1910 separate from each other without emitting any small droplets. In some embodiments, the droplet 1912 can be significantly smaller than the filament 1910, e.g., having a diameter less than 10% of the length of the fluid filament 1910. In some embodiments, the volume contained in the ejected droplet 1912 can be less than 50%, less than 10%, or less than 5% of the volume of the remainder 1914.

Figure 20:
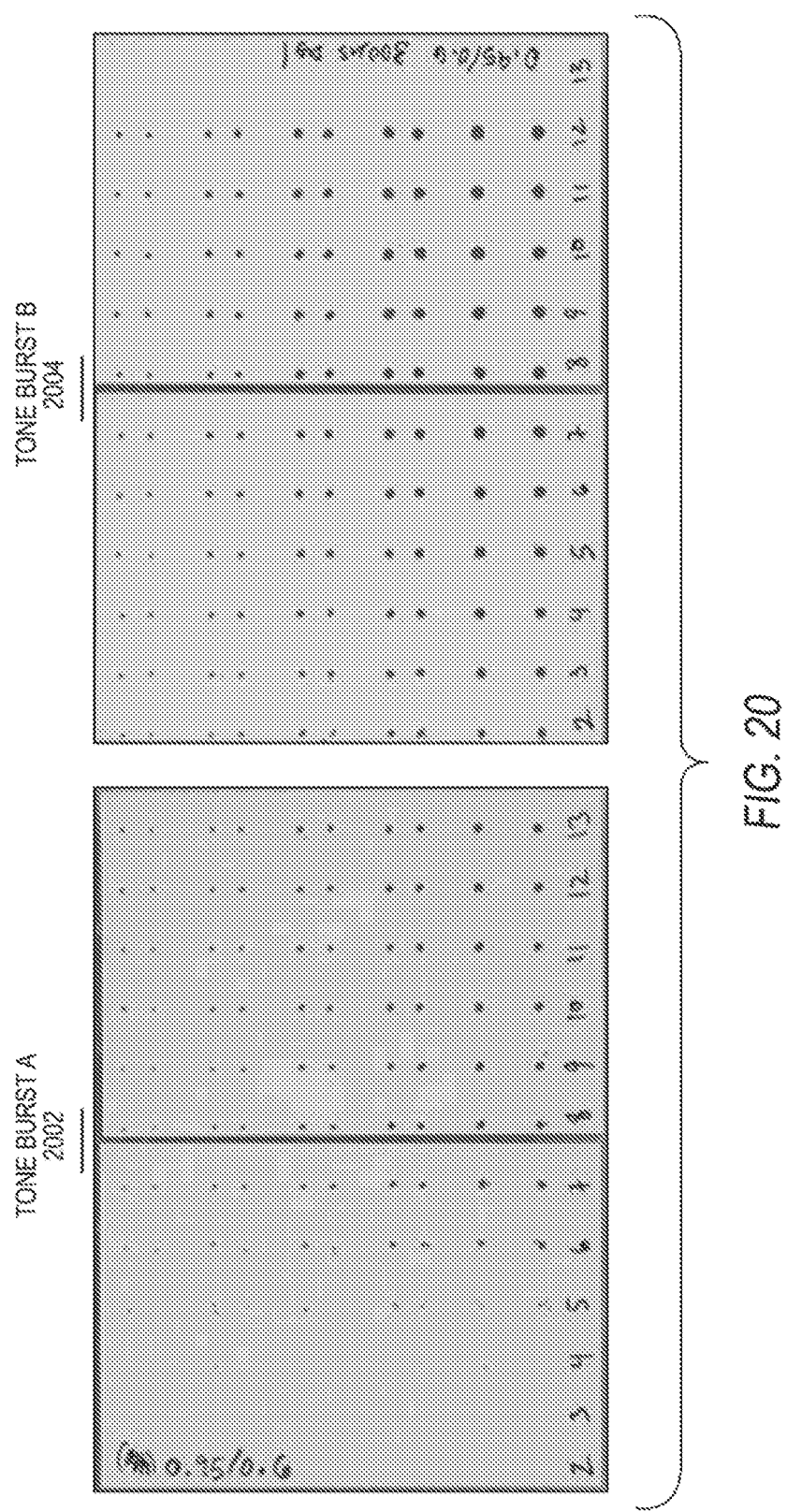
FIG. 20 shows droplets transferred with 2 different tone burst ratios at various acoustic power levels.
Figure 21:
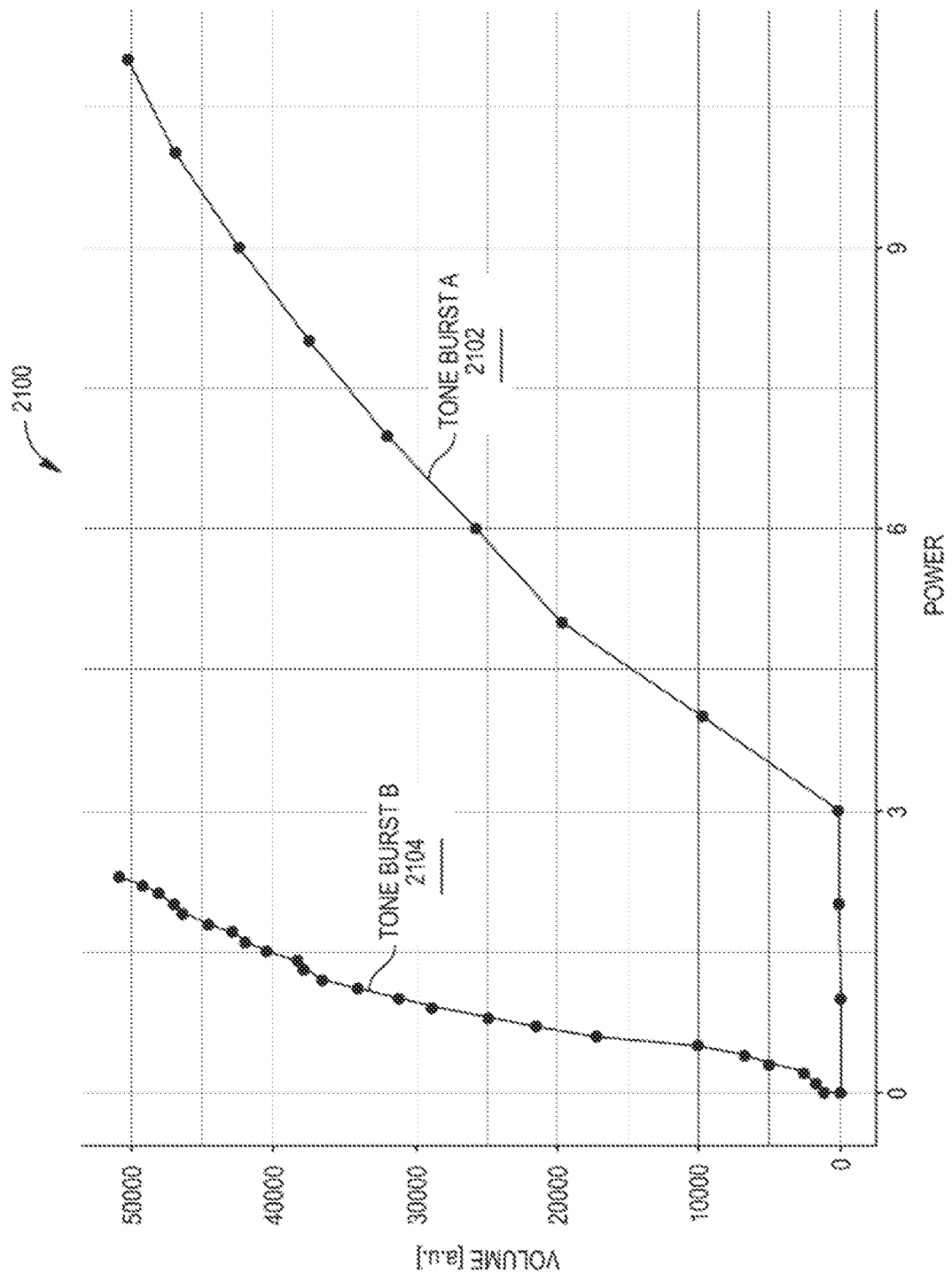
FIG. 21 is a chart comparing ejection volume with ejection power for increasing ejection powers for 2 different tone burst ratios.

According to some embodiments, tone bursts as described herein involve 3 segments. In one embodiment to make 2.5 nL droplets of a non-Newtonian fluid, Segment 1 is longest and at high intensity, followed by a brief Segment 2 where no acoustic energy is generated, and then a final Segment (3) of intermediate duration (here 18 microseconds). Note, that through adjustments in power intensity and lengths of the various segments, drop ejection can be achieved. The power levels for both the tone burst A and tone burst B both require power levels well beyond that for Newtonian fluids as shown in FIG. 20 and FIG. 21 to achieve robust volume transfer and reproducible retraction of the filament back into the reservoir (avoiding generation of small satellites). Tone burst characteristics are listed below in Table 6.

TABLE 6

Tone bursts for Non-Newtonian Fluids

| | Tone burst Segment Length | | |
|---|---|---|---|
| | 1 | 2 | 3 |
| Tone burst A | 120 µs | 8 µs | 18 µs |
| Tone burst B | 300 µs | 8 µs | 18 µs |

FIG. 20 shows droplets of the same non-Newtonian fluid transferred with these tone bursts at various acoustic power levels (show in dB increasing from left to right) for Tone burst A (2002) and Tone burst B (2004). At low levels droplets do not release from filament. At high levels, only droplets transfer and with good placement (8 dB and 10 dB respectively). At higher levels, the transfer quality degrades and the filament breaks up into more than the single desired droplet. Any auxiliary droplets or satellites are not desirable. The preferred implementation of the tone burst and power is one that forms a single droplet of the desired volume and for the filament to retract into the reservoir as shown in the outlines of FIGS. 18 and 19.

Figure 22:
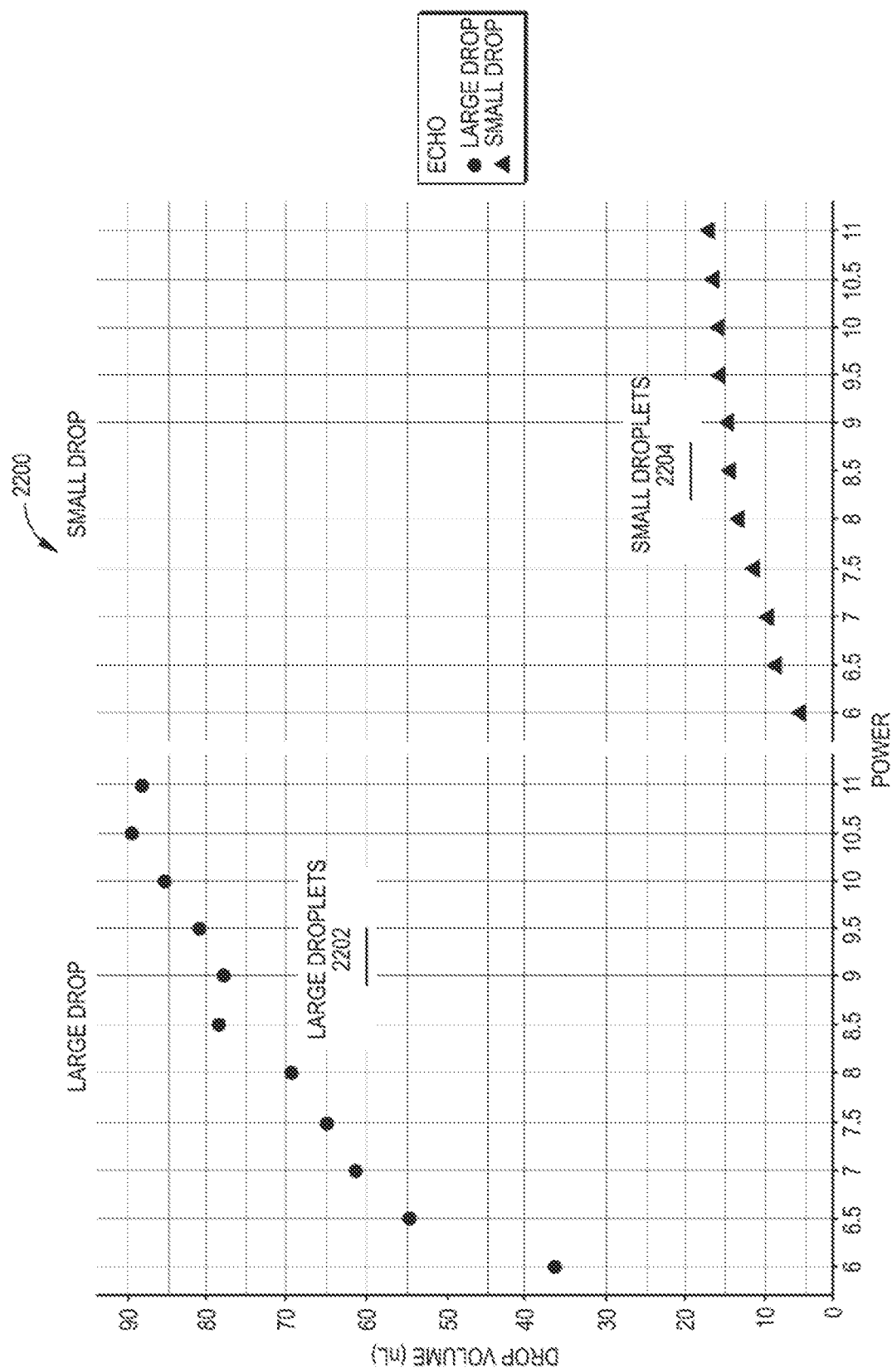
FIG. 22 is a scatter plot of measured volumes transferred in both large and small drops at varying ejection powers.

FIG. 21 also shows how transferred volume varies with increasing acoustic power in a chart 2100 comparing ejection volume with ejection power. In some embodiments, lower slopes of the volume vs. power curve are desirable (see, e.g., the volume vs. power curve for Tone burst A 2102 vs Tone burst B 2104), reducing the sensitivity to power on transferred drop volume. Adjustment of tone burst relative amplitude, duration, frequency content for each segment can be modified to improve sensitivity characteristics of the drop volume characteristics. FIG. 22 shows a scatter plot 2200 of measured volumes transferred for BIOLINE® fluid for both large (2202) and small droplets (2204) at varying ejection powers and their associated volume correlated to the power sensitivity.

Figure 23:
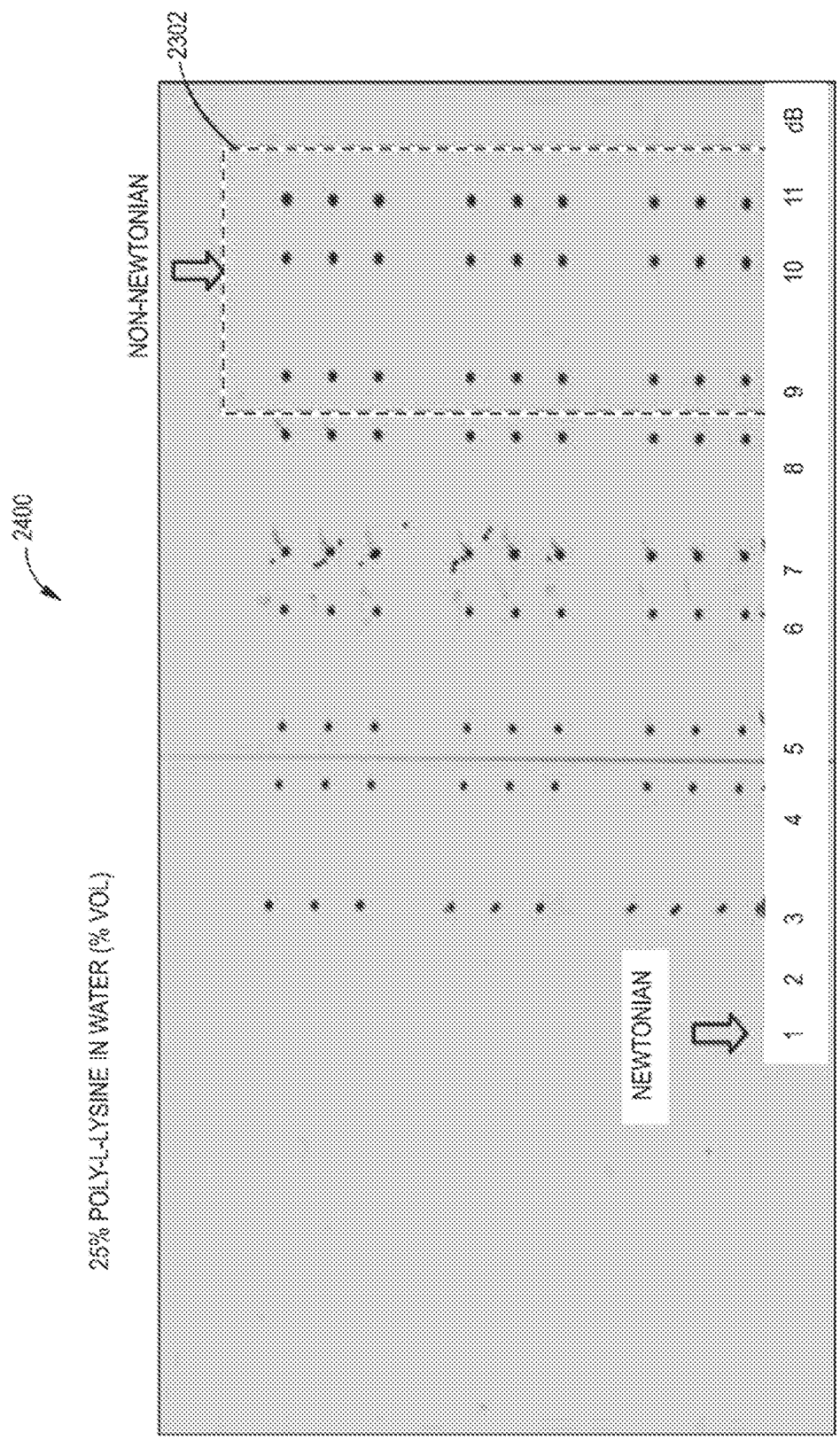
FIG. 23 shows droplet transfer success for a shear thinning non-Newtonian fluid. Note transfer attempts with Newtonian parameters yields no ADE transfer.
Figure 24:
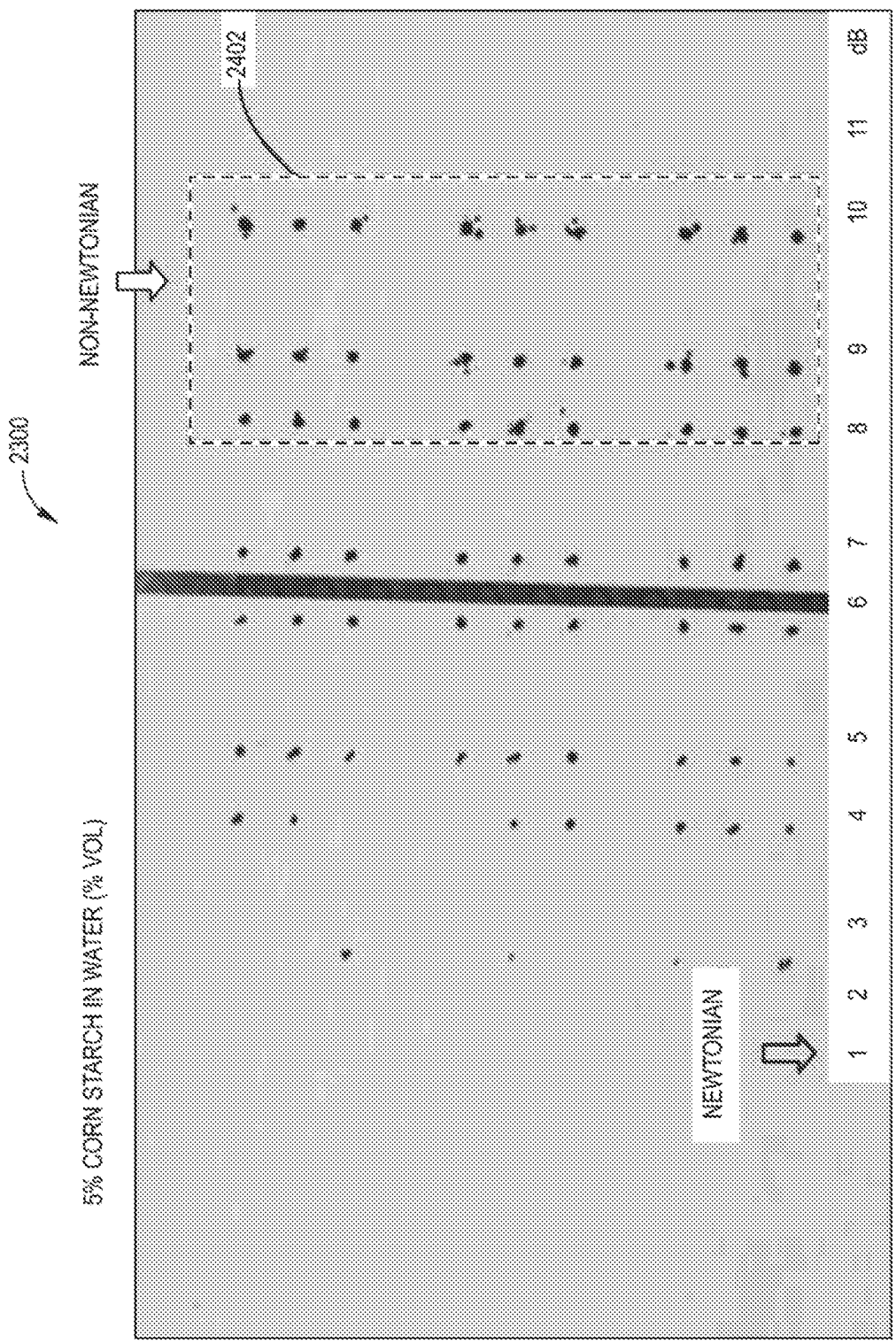
FIG. 24 shows droplet transfer success for a shear thickening non-Newtonian fluid. Note transfer attempts with Newtonian parameters yields no ADE transfer.

FIGS. 23-24 illustrate other specific embodiments of the present invention applied to fluids whose non-Newtonian behaviors is not anionic and not due to nucleotide polymers such as DNA. One example is for another non-Newtonian fluid class termed shear thinning fluids (FIG. 23, image 2300) and the other is for shear thickening fluids (FIG. 24, image 2400). Image 2300 (FIG. 23) shows the successful droplet for a cationic homopolymer consisting of the amino acid lysine solution, 25% poly-1-lysine solution in water (% vol), which is shear thinning. Image 2400 (FIG. 24) shows successful droplet transfer for a 5% corn starch solution in water (% vol) which is shear thickening or a dilatant fluid consisting of a colloidal suspension. The presence of a power window that works for each fluid type is clearly shown by 2302 and 2402. However, many other types of fluids, classes of solutes and non-Newtonian classifications can be processed by ADE according to the methods described herein. For example, suitable non-Newtonian fluids that can be transferred using the disclosed methods include, but are not limited to, cationic, anionic, nucleotidic, and peptidic solutions, suspensions, colloids, dilatants, and other fluids.

Figure 26:
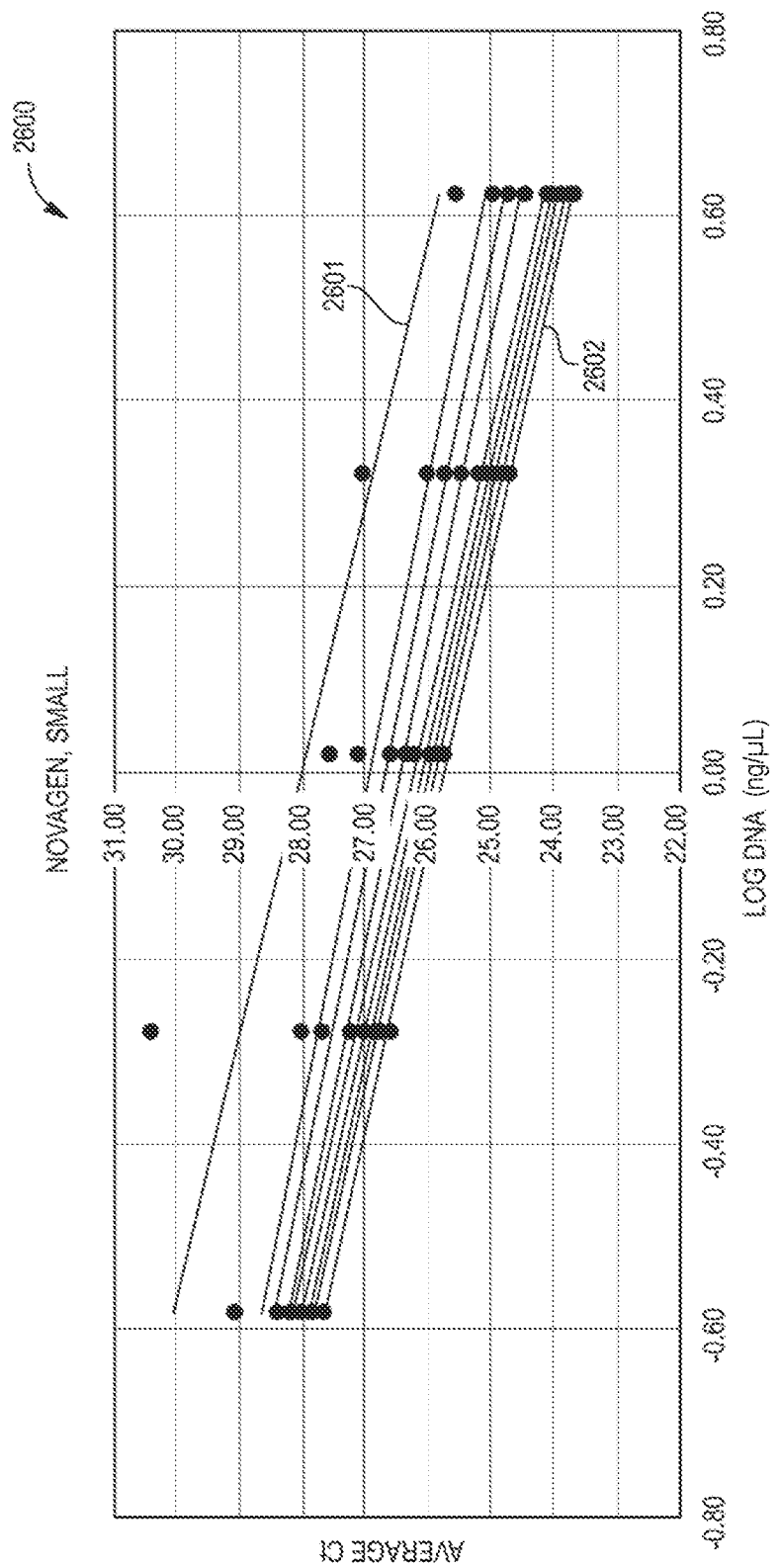
FIG. 26 is a plot showing Ct versus log [DNA] for human gDNA transferred from the test plate of FIG. 25 using small droplets.
Figure 27:
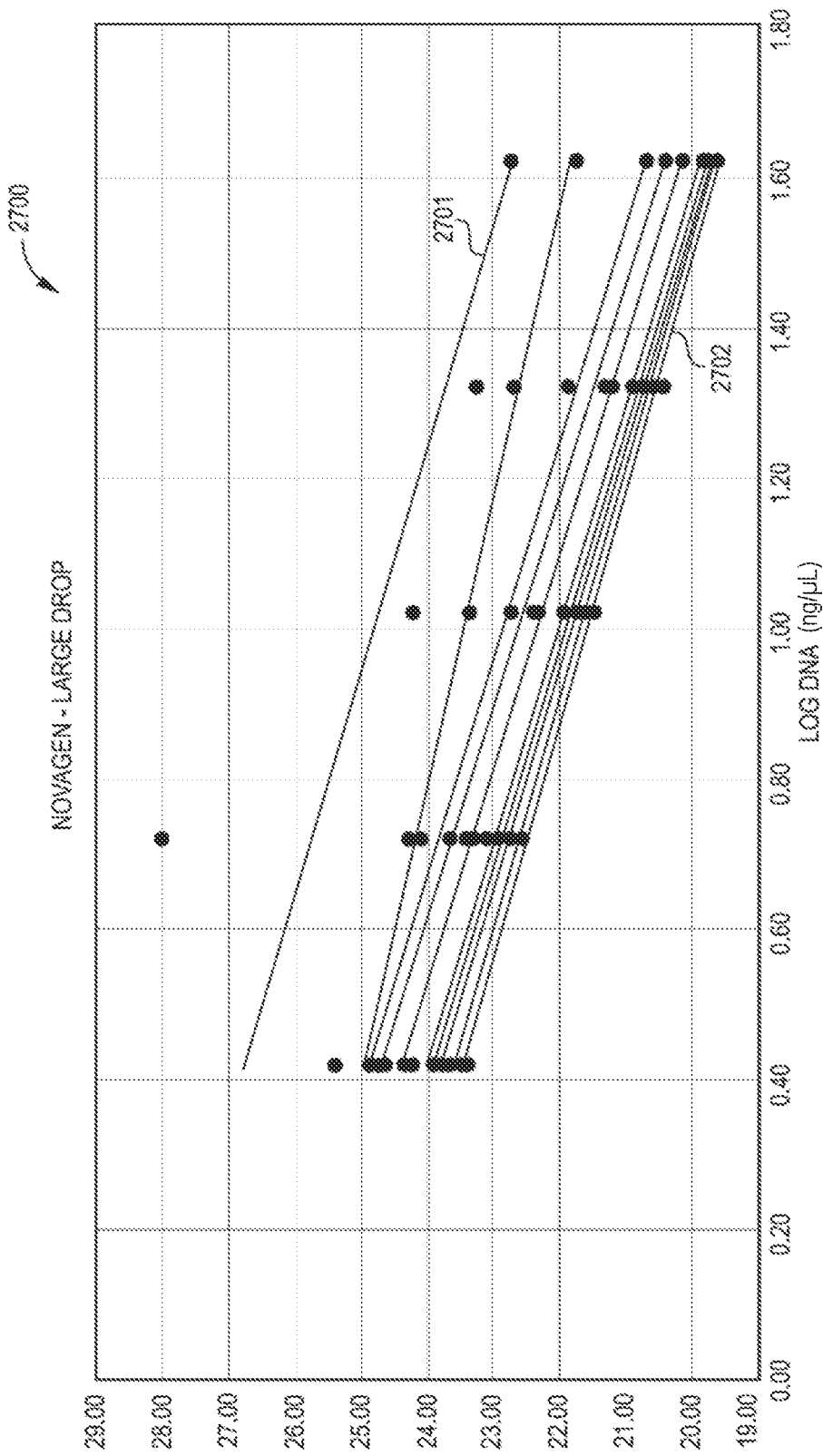
FIG. 27 is a plot showing Ct versus log [DNA] for human gDNA transferred from the test plate of FIG. 25 using large droplets.

FIGS. 25-28 illustrate data for yet another DNA-containing fluid to show the robustness of the method by quantitating the DNA transferred from a number of different wells and measured by qPCR. The layout map for the test plate is shown in FIG. 25 and uses both the high and low acoustic frequencies to make the small and large drops respectively for a range of concentrations of the DNA solutions and varying numbers of droplets collected in each well. FIGS. 26 and 27 show that the responses are very repeatable and linear for some power levels, with FIG. 26 showing Ct data 2600 for small droplets and FIG. 27 showing Ct data 2700 for large droplets. Ejection toneburst amplitudes ranged from about six dB (2601, 2701) to about 11 dB (2602, 2702), in half-dB steps. Note the Y axis is Ct, the number of cycles in the qPCR instrument required to amplify DNA to a certain threshold level. So, lower Ct corresponds to more initial starting DNA concentration. The power levels to achieve linearity at the expected slope for our starting concentration and drop counts are highlighted on the tables of FIG. 28. For both small and large drop sizes 2802, 2804 are repeatable and are linear and the results are achievable across a range of power levels, even for large gDNA (68 Kb) and high gDNA concentration (105 ng/□L).

Figure 29:
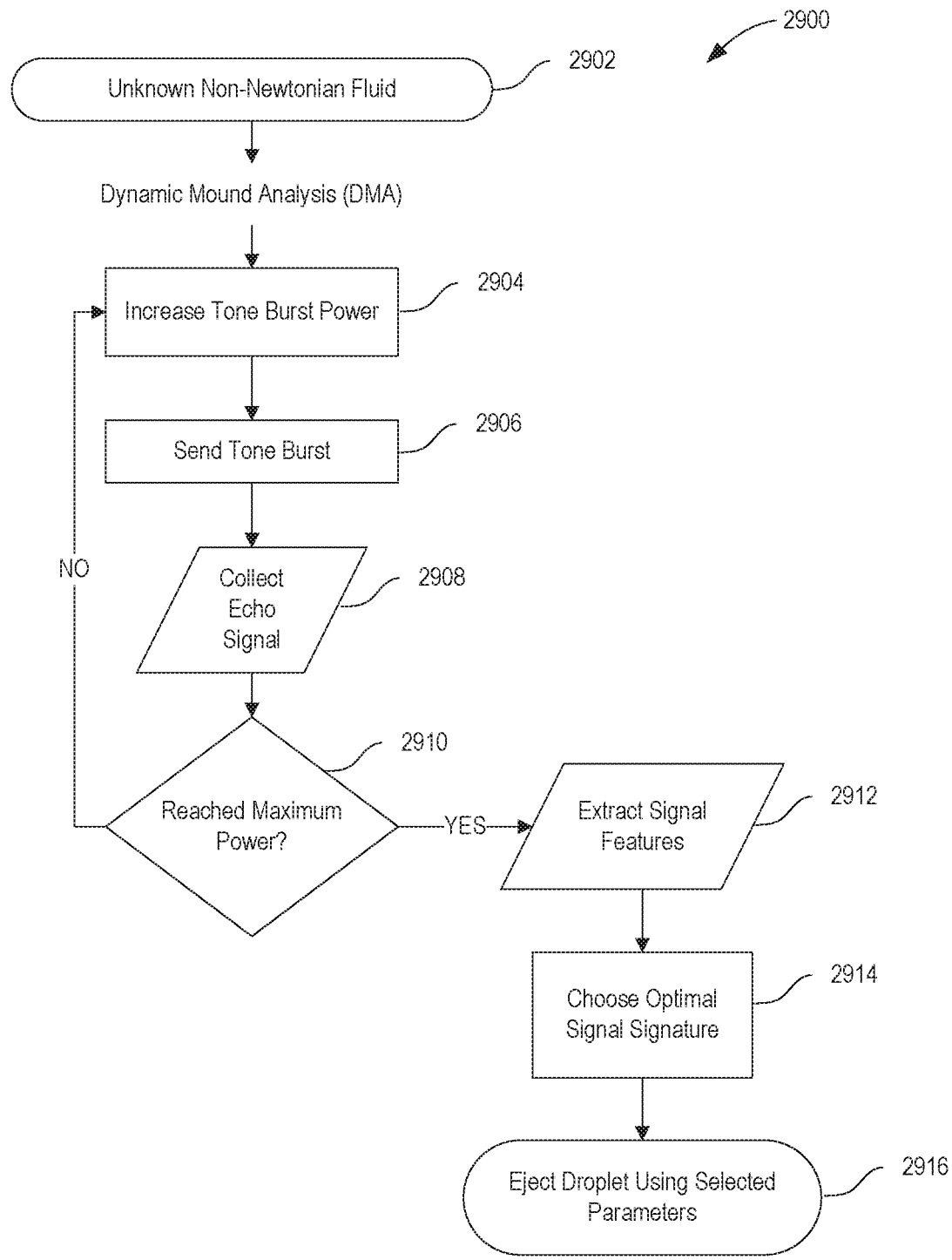
FIG. 29 illustrates a first example process for setting droplet ejection parameters and ejecting droplets of non-Newtonian fluids.
Figure 30:
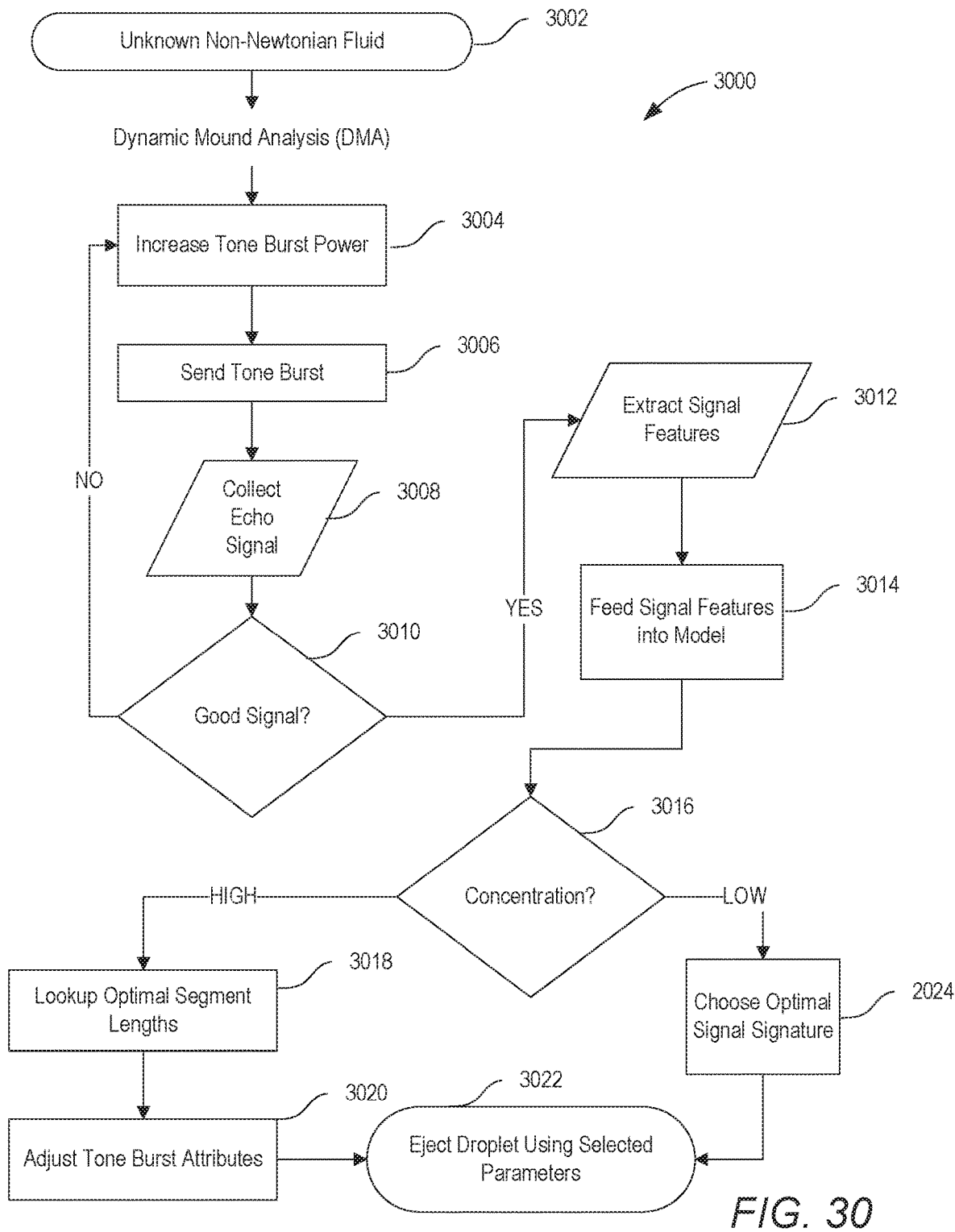
FIG. 30 illustrates a second example process for setting droplet ejection parameters and ejecting droplets of non-Newtonian fluids.
Figure 31:
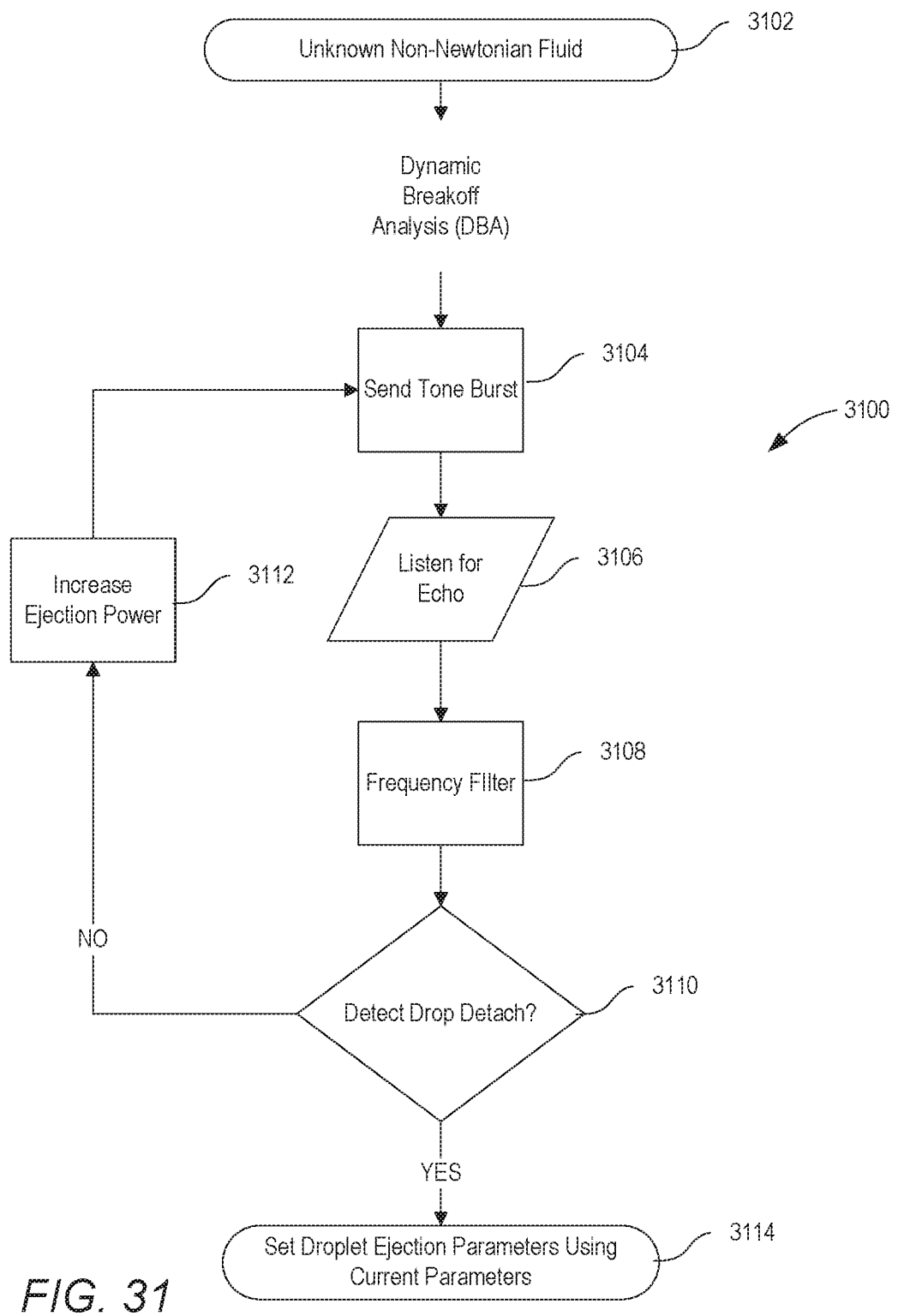
FIG. 31 illustrates a third example process for setting droplet ejection parameters and ejecting droplets of non-Newtonian fluids.

FIGS. 29-31 illustrate example processes for setting droplet ejection parameters and ejecting droplets of non-Newtonian fluids. Processes 2900, 3000, 3100, and 3200, and any other processes described herein, can be performed by any suitable acoustic droplet ejection system as described herein.

FIG. 29 illustrates a first example process 2900 for setting droplet ejection parameters and ejecting droplets of non-Newtonian fluids according to a dynamic mound analysis (DMA) technique, whereby the tone burst power is increased incrementally, according to at least some embodiments. First, a reservoir containing an unknown non-Newtonian fluid can be inserted in an acoustic ejection device (2902). The tone burst power is incremented (2904) and then applied to the fluid in the reservoir (2906). At least one and often many echo signals are collected and analyzed at each tone burst power (act 2908). These processes are repeated in a do-loop until a maximum possible power has been reached (2910). When maximum power is reached, the system extracts the signal features of the echo signals (2912) for each tone burst setting (e.g., tone burst pattern and the length of each tone burst, tone burst amplitude, tone burst frequency and frequency pattern, etc.) The optimal signal signature is chosen using a pre-trained artificial intelligence or machine learning model (2914). This model correlates signal features extracted based on the collected echo signals to known tone burst power settings. The model looks for trends in the echo or optical signal that vary with time. The signal features could increase, decrease, or remain constant over successive time delays. At least one echo signal is necessary to train the model. The system can then select an optical signal signature (2916) according to the methods described above, and then select the signal features and signal signature for ejecting subsequent droplets.

FIG. 30 illustrates a second example process 3000 for setting droplet ejection parameters and ejecting droplets of non-Newtonian fluids also according to DMA, whereby the tone burst power is increased incrementally. As described above, a reservoir containing an unknown non-Newtonian fluid can be inserted in an acoustic ejection device (3002). The tone burst power is incremented (3004) and then applied to the fluid in the reservoir (3006). An echo signal is collected and analyzed at successive power steps (3008) to determine when a good signal has been received (3010), where the signal quality is based on one or more signal parameters such as, e.g., sufficient power, clarity of the return signal, or other parameter. This comparison can include comparing a feature of signal quality to a predefined threshold. When a good echo signal has been received, the system can extract signal features (3012) as described above, and then feed the signal features to a model (3014) for addressing target/solvent concentration. The model outputs a determination of whether the target/solvent concentration is low or high (3016) based on the obtained signal features. For low concentration cases, the system can proceed to choose an optimal signal signature for the solution (3024) and then select the signal features and signature for ejecting subsequent droplets (3022), as described above. For high concentration cases, the system can take an additional intervening step of looking up optimal segment lengths (3018) (i.e., tone burst lengths for the tone burst pattern) and then adjust the tone burst attributes (3020) before selecting the signal features and adjusted signature for subsequent droplet ejection.

FIG. 31 illustrates a third example process 3100 for setting droplet ejection parameters and ejecting droplets of non-Newtonian fluids according to a dynamic breakoff analysis (DBA). As described above, a reservoir containing an unknown non-Newtonian fluid can be inserted in an acoustic ejection device (3102). A tone burst is emitted into the fluid by the ADE system (3104), which listens for the echo (3106) and a frequency filter is applied to the echo signal (3108) to detect whether a droplet has detached (3110). Listening occurs at least once and often multiple times between each tone burst iteration. If a droplet has not detached, the system increases ejection power (3112) and repeats the process by emitting another tone burst at the adjusted ejection power. Failed or successful drop breakoff can be observed optically in between each modulation of the tone burst. When droplet detachment has been detected, the system can set the ejection parameters for subsequent droplets (3114) based on the last successful droplet ejection power and "lock-in" the desired parameters.

Figure 32:
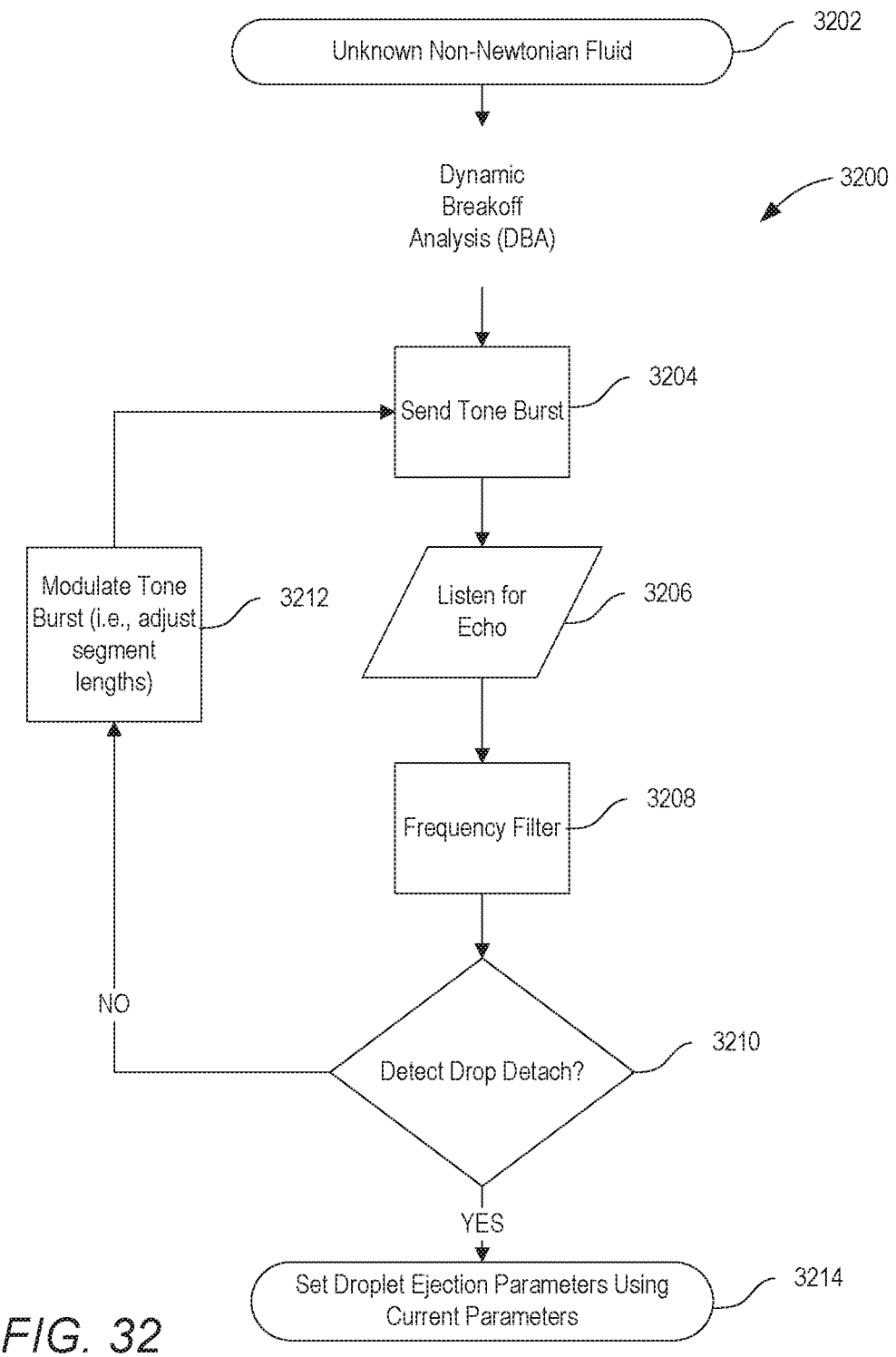
FIG. 32 illustrates a fourth example process for setting droplet ejection parameters and ejecting droplets of non-Newtonian fluids.

FIG. 32 illustrates a fourth example process 3200 for setting droplet ejection parameters and ejecting droplets of non-Newtonian fluids, also according to DBA. As described above, a reservoir containing an unknown non-Newtonian fluid can be inserted in an acoustic ejection device (3202). A tone burst is emitted into the fluid (3204) by the ADE system, which listens for the echo (3206), and a frequency filter is applied (3208) to the echo signal to detect whether a droplet has detached (3210). Listening occurs at least once and often multiple times between each tone burst iteration. If a droplet has not detached, the system modulates the tone burst (3212), e.g. by changing one or more of the tone burst segment lengths, and repeats the process by emitting another tone burst using the modulated tone burst. Failed or successful drop breakoff can be observed optically in between each modulation of the tone burst. When droplet detachment has been detected, the system can set the ejection parameters for subsequent droplets (3214) based on the last successful droplet ejection tone burst characteristics and "lock-in" the desired parameters.

Any or all of processes 2900, 3000, 3100, 3200 can be used in conjunction with each other, or with any of the techniques described in detail above. For example, a system may employ both DMA and DBA techniques to determine and store optimized droplet ejection characteristics (e.g., tone burst segment lengths, tone burst ejection power), or may use any suitable combination of these techniques iteratively to further optimize droplet ejection parameters.

Embodiments of the systems and methods described herein may also be used to classify, characterize and henceforth determine the correct dynamic fluidic parameter information content utilizing Machine Learning Algorithms (MLA) to enable acoustic droplet ejection (ADE) for non-Newtonian fluids. This enables the capability to transfer samples of non-Newtonian fluids using ADE in a highly reproducible, highly accurate, and highly precise manner (such as intact, native genomic DNA or viscoelastic polymers in solution) and quantified using standard laboratory techniques such as qPCR, Fluorescence based assay, or NGS for varied sample inputs. Dynamic Mound Analysis (DMA), described above, enables the capability to characterize and classify the sample concentration, fragment size and preparation of non-Newtonian fluids (such as intact, native genomic DNA or viscoelastic polymers in solution) utilizing acoustic droplet ejection (ADE) technology. Dynamic Breakoff Analysis (DBA), also described above, enables the capability to characterize the amount of power, amplitude, frequency, or other attributes of a tone burst, for drop breakoff of non-Newtonian fluids (such as intact, native genomic DNA (gDNA) or viscoelastic polymers in solution) utilizing ADE technology. Additional methods permit reproducible, accurate and precise prediction of drop volumes using Dynamic Volume Analysis (DVA) for non-Newtonian fluids using ADE for downstream applications such as qPCR, fluorescence, NGS and other genomic applications.

Each of the three modes of analysis described above (DMA, DBA, DVA) use multiple acoustic reflections in concert with machine learning based on training data sets to obtain fluidic parameter information 1) pre- and 2) post-Acoustic Droplet Ejection of a non-Newtonian fluid.

For the class of non-Newtonian fluids (that exhibit viscoelastic properties), the use of an impedance-based signature (and associated power threshold) does not enable successful characterization or classification for acoustic droplet ejection. Even with well understood parameters such as the sample concentration, fragment size or preparation method, the impedance changes are too broad to detect. The addition of a solute (e.g., gDNA) to a Newtonian buffer solution does not significantly alter the impedance of the fluid and thus does not significantly affect the signature readout, however, this addition creates a viscoelastic phenomenon termed non-Newtonian fluid behavior which requires significantly different power and alternate tone burst parameters to enable ADE.

The non-Newtonian property can be assessed using one or multiple sub ejection energy bursts to perturb the fluid surface and collecting one or multiple acoustic signals reflected from the resulting mound. For example, Dynamic Mound Analysis (DMA) enables the capability to characterize and classify the sample concentration, fragment size and preparation of non-Newtonian fluids (such as intact, native genomic DNA or viscoelastic polymers in solution) utilizing acoustic droplet ejection (ADE) technology.

According to various embodiments, a model can be generated that analyzes the acoustic reflections from a fluid surface after it is perturbed by a tone burst and uses a binary scheme that classifies the ADE event as successful or not successful. The result can be interpreted to iteratively modulate the tone burst until a successful drop breakoff event occurs. This methodology is termed Dynamic Breakoff Analysis (DBA), which differs from a Mound Image Print (MIP) based result, as a non-obvious signal processing algorithm is preferred to a null space analysis when interrogating non-Newtonian fluids in a container, well plate or reservoir. Importantly, a MIP result predicts a successful drop breakoff event—6-11 dB lower in power than the correctly determined DBA result.

An alternative model can be generated that analyzes the drop volume resulting from a successful ADE event. The model is trained on and processes acoustic reflections from a fluid surface before, during, and after a droplet ejection event. This Dynamic Volume Analysis (DVA) realizes an accurate drop volume prediction for any droplet of non-Newtonian fluid (e.g., DNA with different concentrations, fragment sizes and preparation) created using any tone burst.

Human genomic DNA (gDNA) samples are utilized as surrogates for non-Newtonian fluids. gDNA samples can vary in concentration, fragment size as well as preparation and these factors are difficult to parameterize. As such, training sets incorporated with machine learning algorithms (MLA) can be utilized to enable highly reproducible, highly accurate and highly precise ADE.

Figure 33:
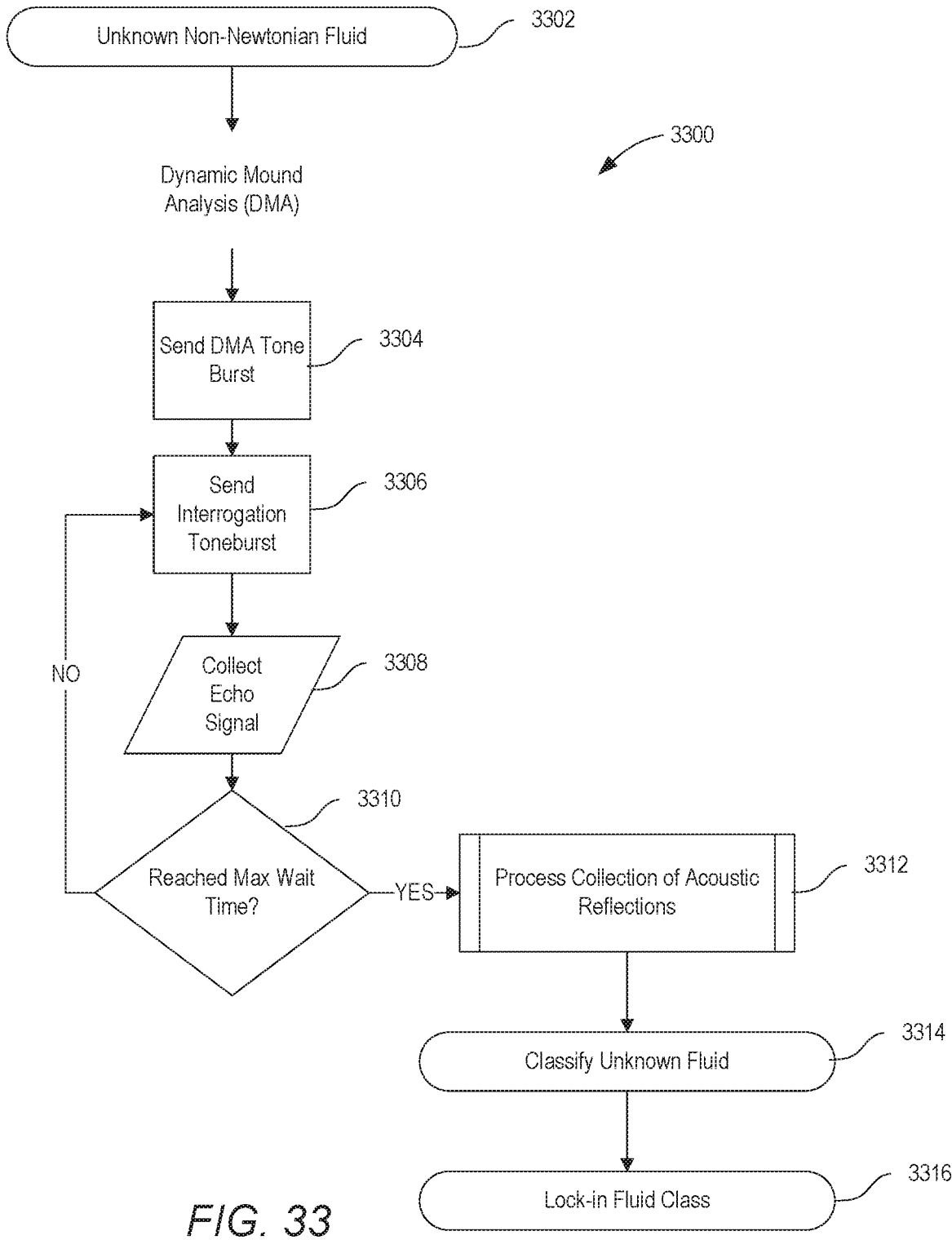
FIG. 33 illustrates an example process for using Dynamic Mound Analysis (DMA) for characterizing a non-Newtonian fluid and to lock-in the identity of the fluid.
Figure 34:
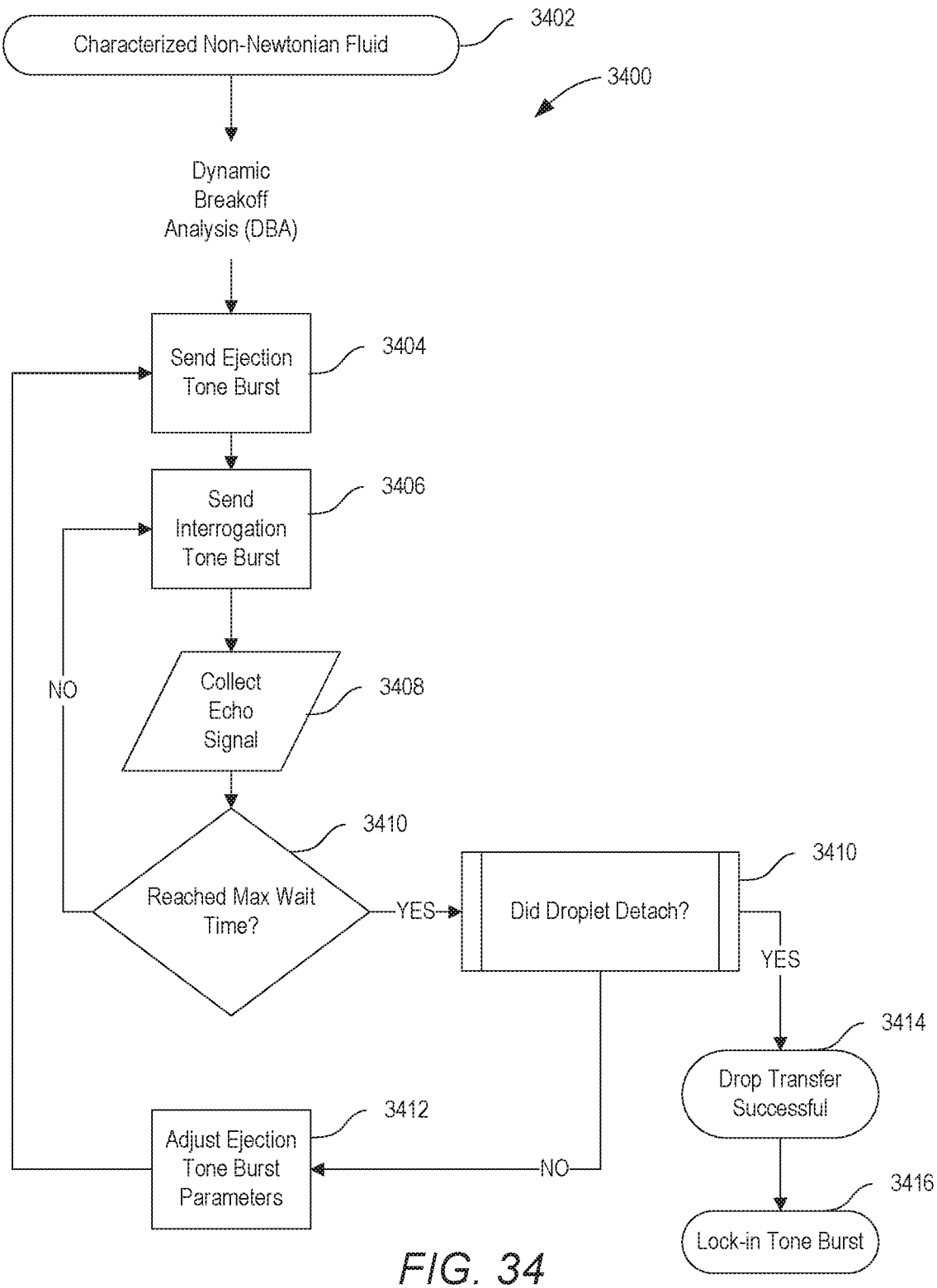
FIG. 34 illustrates an example process for using Dynamic Breakoff Analysis (DBA) for achieving acoustic droplet ejection and to lock-in tone burst parameters.
Figure 35:
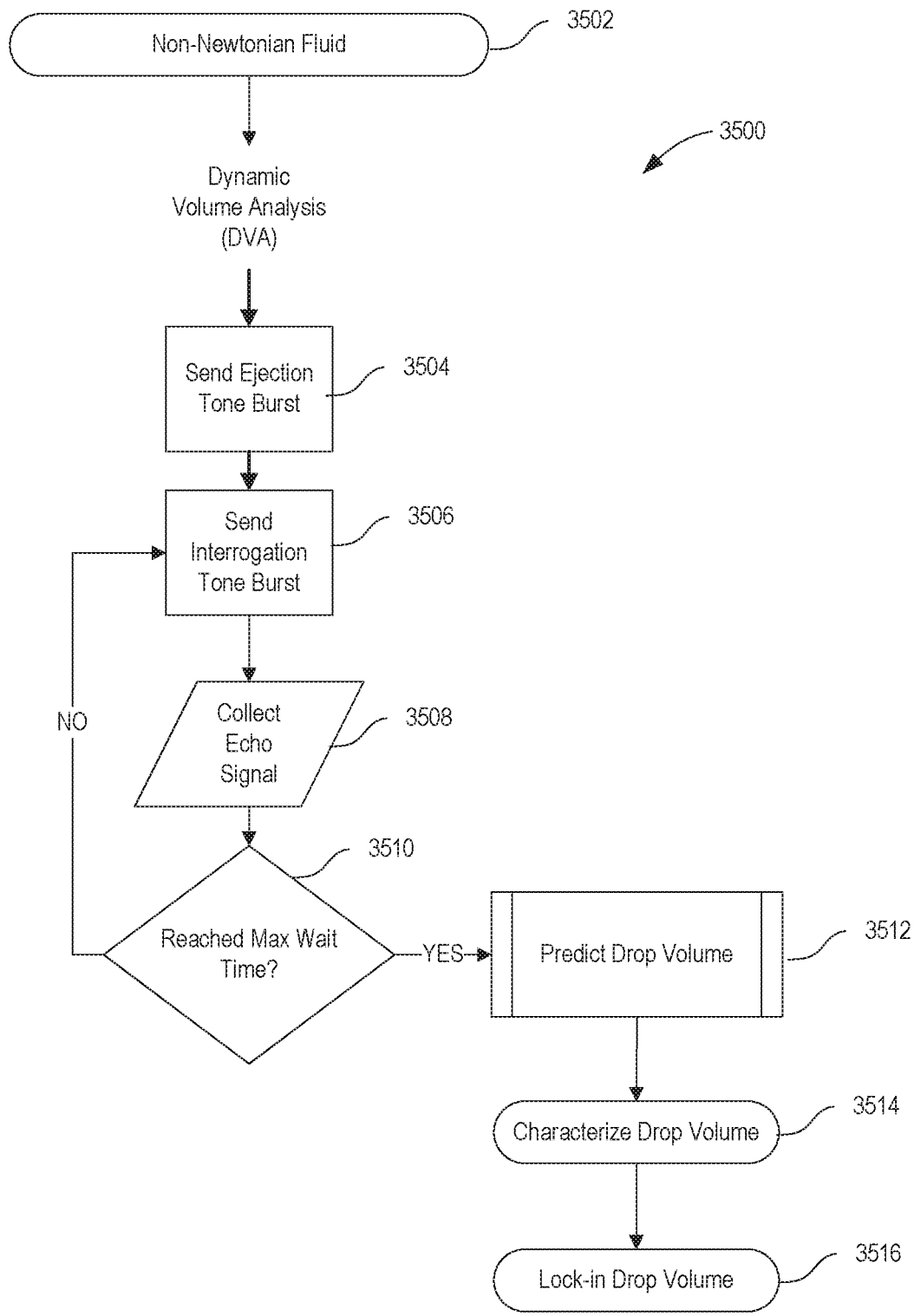
FIG. 35 illustrates an example process for using Dynamic Volume Analysis for characterizing the volume of a drop produced by acoustic droplet ejection and to lock-in a drop volume.

FIGS. 33-35 illustrate example processes for data collection and processing to characterize non-Newtonian fluids, determine tone burst parameters suitable for acoustic droplet ejection, and to characterize droplet volume for ejected droplets of non-Newtonian fluid. Processes 3300, 3400, 3500, and any other processes described herein, can be performed by any suitable acoustic droplet ejection system as described herein.

Dynamic Mound Analysis

FIG. 33 illustrates an example process 3300 for using Dynamic Mound Analysis for characterizing a non-Newtonian fluid and to lock-in the identity of the fluid. According to various embodiments, a fluid with unknown characteristics is contained in a fluid reservoir (3302). The identification or characterization of this fluid is performed using Dynamic Mound Analysis (DMA). First, a series of acoustic signals are generated and focused at the surface of the fluid (act 3304). These signals perturb the surface but remain low enough in energy to avoid breaking off any droplet of fluid from the bulk. After each perturbation, series of interrogation pings or interrogation tone bursts are emitted and focused at the surface of the fluid (act 3306), after which an acoustic reflection (or echo signal) is collected from the fluid surface (3308) until a maximum wait time is reached (3310). A collection of these reflections is processed (3312) to determine the non-Newtonian behavior of the fluid.

The analysis of multiple unknown fluids can be relative and provide a result that is a ranking of the degree of the non-Newtonian fluidic parameters. This qualitative ranking is simple and achieved by inspection of signal collection. A quantitative classification of these fluids is then next achieved (3314) using a convolution neural network (CNN) that is trained and validated using samples of known concentration, fragment size and preparation method. This is the application of a general technique to a nonobvious classification to produce a fluid classification model utilized to perform ADE with reproducibility, accuracy and precision. A data set consists of reflected acoustic signals collected from a fluid mound created at various sub ejection power levels. The collection of reflected time domain signals can be used unfiltered to train the model. Alternatively, the collection of reflections can be processed using a Fast Fourier Transform (FFT) before training the model.

According to one CNN model trained based on FFT signals from 15 unique samples, 99% of the samples were characterized correctly, enabling successful gDNA transfer by ADE. The samples are unique based on a combination of gDNA concentration, fragment size and preparation method. These unique properties are summarized in Table 1, below.

TABLE 7 gDNA samples used to train and validate DMA, DBA, and DVA models.

| Index | Vendor/Preparation | Concentration (ng/µL) | Fragment Size (Kb) |
|---|---|---|---|
| 0 | BIOLINE | 25 | 45 |
| 1 | BIOLINE | 75 | 45 |
| 2 | BIOLINE | 100 | 45 |
| 3 | BIOLINE | 150 | 45 |
| 4 | BIOLINE | 200 | 45 |
| 5 | NOVAGEN | 10 | 68 |
| 6 | NOVAGEN | 40 | 68 |
| 7 | NOVAGEN | 60 | 68 |
| 8 | NOVAGEN | 80 | 68 |
| 9 | NOVAGEN | 105 | 68 |
| 10 | PROMEGA | 25 | 55 |
| 11 | PROMEGA | 75 | 55 |
| 12 | PROMEGA | 100 | 55 |
| 13 | PROMEGA | 150 | 55 |
| 14 | PROMEGA | 200 | 55 |

Dynamic Breakoff Analysis (DBA)

FIG. 34 illustrates an example process 3400 for using Dynamic Breakoff Analysis (DBA) for achieving acoustic droplet ejection and to lock-in tone burst parameters, i.e., selecting the correct energy level for ADE for a non-Newtonian fluid such as, but not limited to, gDNA. According to various embodiments, a characterized non-Newtonian fluid is contained in a fluid reservoir (3402). A high energy acoustic signal, or tone burst, is focused and aimed at the fluid contained within a reservoir (3404). A series of interrogation tone bursts can be applied to the fluid in the reservoir (3406), after which the acoustic reflections or echo signals are collected (3408) until a maximum wait time is reached (3410). The success or failure of the ejection tone burst can be ascertained (3410) by, e.g., optical methods such as scanning the region above the reservoir for the passage of a droplet, acoustic methods based on, e.g., an analysis of the collected echo signals, or other suitable method.

The result of each droplet ejection attempt can be classified as successful, not successful, or inconsistent. A perturbation of the fluid surface and no droplet breakoff or detachment is defined as an unsuccessful attempt. The classification of inconsistent describes droplet breakoff events that occur intermittently or produce inconsistent drop volumes that are not highly reproducible, highly accurate or highly precise. Finally, successful events are defined as a drop breakoff event that transfers a droplet of non-Newtonian fluid out of the source reservoir that is highly reproducible, highly accurate and highly precise. An iterative increase in tone burst energy (3412) and DBA analysis can be carried out until a successful ADE event occurs (3414). At that point, the parameters (i.e. tone burst pattern and energy) can be "locked-in" to perform subsequent ejections (3416). If an acoustic reflection after a tone burst event registers as an unsuccessful event, the energy level can be increased, and the subsequent acoustic reflection is analyzed. For optimal performance, the ejection energy may be incrementally increased until a successful event is "locked in".

Dynamic Volume Analysis (DVA)

FIG. 35 illustrates an example process for using Dynamic Volume Analysis for characterizing the volume of a drop produced by acoustic droplet ejection and to lock-in a drop volume. According to various embodiments, a non-Newtonian fluid is contained in a fluid reservoir (3502). An acoustic droplet ejection is triggered by aiming a focused acoustic tone burst at a fluid surface within a reservoir (3504). The dynamic fluid surface is subsequently interrogated using a sequence of interrogation pings (3506) until a max wait time has been reached (3510). The acoustic reflections or echo signals can then be analyzed to predict the drop volume (3512), and compared against measured drop volume data to characterize the volume of the drop that was formed (3512). The process can be performed iteratively to lock-in the drop volume (3516) by varying the parameters of the model.

One method of determining droplet volume is to acquire a series of acoustic reflections for each acoustic droplet ejection. The raw time domain signals can be processed via a Hilbert Transform, and optional further processing by thresholding and blanking pixels below a critical grayscale value to simplify feature extraction and dampen noise. Key features that can be extracted from an acoustic reflection image include, e.g., the center of mass (derived from density and amplitude of signal amplitude), the leading edge of each filtered reflection, and a peak feature. These extracted features are combined with attributes of the tone burst used to create the drop and the total set of features is used to train the model to predict drop volume. Training and validating a neural network model results in the characterization of drop volumes with high accuracy, high precision and high reproducibility as shown in FIG. 9. Each point has a known or expected drop volume associated with its characteristic DVA signal feature.

Genomic Confirmation to Assess Sample Integrity and non-Biased Transfer

Control Experiments using non-DMA calibration and DMA for ADE of gDNA To quantitatively assess gDNA transfer, quantitative polymerase chain reaction (qPCR) was utilized to confirm and detect the expression of the house keeping gene beta actin (actin). The qPCR assays were carried out using the ~-actin forward primer: AGC CAT GT A CGT TGC TAT CC; the ~-actin reverse primer: CGT AGC ACA GCT TCT CCT TAA T, (IDT). All primers were at a final concentration on 1 µM. qPCR reaction assays were done on the THERMOFISHER QuantStudio 6 Flex Real-Time PCR System utilizing PowerUp™ SYBR® Master Mix and THERMOFISHER 384-Well Clear Optical Plate.

The qPCR program was used as follows: step 1, 50° C. for 2 minutes; 95° C. for 2 minutes; step 2, 95° C. for 15 seconds, 60° C. for 1 minute, acquisition (40 cycles); step 3, 95° C. for 15 seconds, 60° C. for 1 minute and 95° C. for 15 seconds. Human native gDNA was obtained from BIOLINE (45 Kb), NOVAGEN (68 Kb), and PROMEGA (55 Kb). Each vendor represents a different preparation method and all samples were used as received or diluted in Tris-EDTA (TE) buffer pH 8.0 to the final desired concentration. A 6-point 2-fold standard curve was created by acoustically transferring 1, 2, 4, 8, 16, and 32 drops of gDNA solution. For each concentration of gDNA, eight (n=8) technical replicates were performed.

For comparison, a control set of qPCR results for the transfer of gDNA solutions using a non-DMA calibration was obtained. The CVs for the non-DMA calibration exhibited high variance and many points having greater than 5% CV. Additionally, for BIOLINE at 150 ng/µL and 200 ng/µL, NOVAGEN 80 and 105 ng/µL, and PROMEGA 100, 150 and 200 ng/µL the R"2 value is <0.51. This is not reproducible, not accurate and not precise. Additionally, the non-DMA calibration resulted in many failed transfers or no amplification in target wells.

In contrast, transfers obtained using the DMA calibration transferred gDNA solutions robustly and reproducibly. For each preparation method, the CVs are generally <4% and the R^2 values are >0.9 for BIOLINE and NOVAGEN. For PROMEGA 100, 150, and 200 ng/µL, the R^2 values are much higher >0.8 compared to <0.51 using the non-DMA calibration.

Volume Verification for DV A using a Fluorescence and a qPCR Assay

The DVA model was also trained using drop volume data collected using a fluorescence-based assay for volume accuracy and precision confirmation. Solutions with various concentrations gDNA were prepared with 0.0375 mM sodium fluorescein. The solutions were transferred to an assay plate using non-Newtonian ADE. The assay plate (1536 LDV, LABCYTE) was prefilled with a solution of 10 mM NaOH as a quench solution. A 6-point 2-fold standard curve was made using bulk dilutions of the 0.0375 mM solutions and pipetting 5 µL into the assay plates. These plates were centrifuged (3,000 rpm, incubated at room temperature for 5 minutes and read on a fluorescence reader (BMG PHERASTAR).

A correlation was generated between the drop volumes predicted by DVA and measured using the fluorescence-based assay. A perfect correlation has an R^2=1.0. In these cases, using various tone burst frequencies, the regression slopes indicated high correlation, with R^2 values exceeding 0.98. DVA performance was also successfully validated using the qPCR assay, with R^2 values exceeding 0.95.

Experimental data was obtained using untreated, unfragmented, intact, native gDNA from commercially available sources and utilizing the non-Newtonian calibration with Machine Learning Algorithms for NGS. To quantitatively assess gDNA transfer using the acoustic parameters discussed above, next generation library preparation (NGP) and next generation sequencing (NGS) were then utilized to confirm that no preferential transfer (size or single vs. double stranded DNA, for example) or that no damage (unintended gDNA shearing, for example) occurred to the DNA sequences maintaining sample integrity.

The NEXTERA™ DNA Flex Kit (Illumina) was used for NGP and NGS was carried out using the MiSeq Instrument (Illumina). Data analysis was performed using Illumina's BaseSpace FastQC and BW A Aligner Sequencing Tools. Highly concentrated (>100 ng/µL), large fragment (>20 Kb) gDNA obtained commercially from BIOLINE and MILLIPORE SIGMA (formerly NOVAGEN) were acoustically or pipette transferred (control) into a 384-destination qPCR plate for library preparation. A total of 140 ng of each gDNA sample was transferred in triplicate technical replicates. All library preparation protocols were miniaturized 3-fold to enable acoustic transfer into a 384 well plate with all processes such as tagmentation, post tagmentation clean up and amplification, performed on the THERMOFISHER QuantStudio™ 6 Flex Real-Time PCR System adapted to be used as an end point PCR instrument. gDNA sample information is shown below in Table 8.

TABLE 8 gDNA samples used for NEXTERA DNA Flex Library Preparation

| gDNASample | Conc. ng/μL | Size (kb) | Transfer Vol (nL) |
|---|---|---|---|
| BIOLINE | 200 | 40 | 1375 |
| MILLIPORE SIGMA | 105 | 69 | 830 |

The libraries were sequenced on the MI SEQ® Reagent Kit v3 (150 cycle). Even intensities were detected across the run for each nucleotide indicating that the detection of all 4 bases are uniform. In addition, QScore heat maps were obtained indicating base calling accuracy exceeding 91.5%, with a 1 in 1,000 probability of an incorrect base call. The per base sequence data quality for acoustic transfer and pipette transfer matched and were of high quality, indicating that the per base sequence content for acoustic transfer and pipette transfer have no difference between the four different bases of the sequence run.

Table 9A-9D, below, show the sequencing parameters for both gDNA samples across multiple technical replicates. The properly paired reads are >98% for all samples, indicating both the mates of the reads are in a proper orientation and has certain insert size on alignment with the genome. For all samples, >99% of insert sequences are aligned to the reference genome showing libraries generated from acoustically transferred or pipette transfer are comparable and no bias ADE or damage to the gDNA is occurring.

TABLE 9A

Sequencing parameters for comparison of acoustic and pipette gDNA transfer

| | Acoustic Transfer BIOLINE hgDNA | | | | | |
|---|---|---|---|---|---|---|
| Parameter | Replicate 1 | | Replicate 2 | | Replicate 3 | |
| Total PF | 4.40E+06 | 100.00% | 5.03E+06 | 100.00% | 8.40E+06 | 100.00% |
| Paired | 4.39E+06 | 99.82% | 5.03E+06 | 99.83% | 8.39E+06 | 99.83% |
| Read 1 | 2.19E+06 | 49.91% | 2.51E+06 | 49.92% | 4.19E+06 | 49.91% |
| Read 2 | 2.19E+06 | 49.91% | 2.51E+06 | 49.92% | 4.19E+06 | 49.91% |
| Aligned | 2.19E+06 | 49.91% | 2.51E+06 | 49.92% | 4.19E+06 | 49.91% |
| Properly Paired | 2.19E+06 | 49.91% | 2.51E+06 | 49.92% | 4.19E+06 | 49.91% |
| Singletons | 2.19E+06 | 49.91% | 2.51E+06 | 49.92% | 4.19E+06 | 49.91% |
| Secondary Alignments | 2.19E+06 | 49.91% | 2.51E+06 | 49.92% | 4.19E+06 | 49.91% |
| Duplicates | 2.19E+06 | 49.91% | 2.51E+06 | 49.92% | 4.19E+06 | 49.91% |

TABLE 9B

Sequencing parameters for comparison of acoustic and pipette gDNA transfer

| | Pipette Transfer BIOLINE hgDNA | | | | | |
|---|---|---|---|---|---|---|
| Parameter | Replicate 1 | | Replicate 2 | | Replicate 3 | |
| Total PF | 2.19E+06 | 49.91% | 2.51E+06 | 49.92% | 4.19E+06 | 49.91% |
| Paired | 2.19E+06 | 49.91% | 2.51E+06 | 49.92% | 4.19E+06 | 49.91% |
| Read 1 | 2.19E+06 | 49.91% | 2.51E+06 | 49.92% | 4.19E+06 | 4191% |
| Read 2 | 2.19E+06 | 49.91% | 2.51E+06 | 49.92% | 4.19E+06 | 49.91% |
| Aligned | 2.19E+06 | 49.91% | 2.51E+06 | 49.92% | 4.19E+06 | 49.91% |
| Properly Paired | 2.19E+06 | 49.91% | 2.51E+06 | 49.92% | 4.19E+06 | 49.91% |
| Singletons | 2.19E+06 | 49.91% | 2.51E+06 | 49.92% | 4.19E+06 | 49.91% |
| Secondary Alignments | 2.19E+06 | 49.91% | 2.51E+06 | 49.92% | 4.19E+06 | 49.91% |
| Duplicates | 2.19E+06 | 49.91% | 2.51E+06 | 49.92% | 4.19E+06 | 49.91% |

TABLE 9C

Sequencing parameters for comparison of acoustic and pipette gDNA transfer

| | Acoustic Transfer MILLIPORE SIGMA | | | | | |
|---|---|---|---|---|---|---|
| Parameter | Replicate 1 | | Replicate 2 | | Replicate 3 | |
| Total PF | 2.19E+06 | 2.19E+06 | 2.19E+06 | 2.19E+06 | 2.19E+06 | 2.19E+06 |
| Paired | 49.91% | 49.91% | 49.91% | 49.91% | 49.91% | 49.91% |
| Read 1 | 2.51E+06 | 2.51E+06 | 2.51E+06 | 2.51E+06 | 2.51E+06 | 2.51E+06 |

TABLE 9C-continued

Sequencing parameters for comparison of acoustic and pipette gDNA transfer

Acoustic Transfer
MILLIPORE SIGMA

| Parameter | Replicate 1 | | Replicate 2 | | Replicate 3 | |
|---|---|---|---|---|---|---|
| Read 2 | 49.92% | 49.92% | 49.92% | 49.92% | 49.92% | 49.92% |
| Aligned | 4.19E+06 | 4.19E+06 | 4.19E+06 | 4.19E+06 | 4.19E+06 | 4.19E+06 |
| Properly Paired | 49.91% | 49.91% | 49.91% | 49.91% | 49.91% | 49.91% |
| Singletons | 2.19E+06 | 2.19E+06 | 2.19E+06 | 2.19E+06 | 2.19E+06 | 2.19E+06 |
| Secondary Alignments | 49.91% | 49.91% | 49.91% | 49.91% | 49.91% | 49.91% |
| Duplicates | 2.51E+06 | 2.51E+06 | 2.51E+06 | 2.51E+06 | 2.51E+06 | 2.51E+06 |

TABLE 9D

Sequencing parameters for comparison of acoustic and pipette gDNA transfer

Pipette Transfer
MILLIPORE SIGMA

| Parameter | Replicate 1 | | Replicate 2 | | Replicate 3 | |
|---|---|---|---|---|---|---|
| Total PF | 4.09E+06 | 100.00% | 3.11E+06 | 100.00% | 2.61E+06 | 100.00% |
| Paired | 4.08E+06 | 99.78% | 3.10E+06 | 99.79% | 2.61E+06 | 99.80% |
| Read 1 | 2.04E+06 | 49.89% | 1.55E+06 | 49.90% | 1.30E+06 | 49.90% |
| Read 2 | 2.04E+06 | 49.89% | 1.55E+06 | 49.90% | 1.30E+06 | 49.90% |
| Aligned | 4.06E+06 | 99.41% | 3.08E+06 | 99.24% | 2.60E+06 | 99.37% |
| Properly Paired | 4.00E+06 | 98.58% | 3.04E+06 | 98.61% | 2.57E+06 | 98.83% |
| Singletons | 8.38E+03 | 0.21% | 1.10E+04 | 0.36% | 4.81E+03 | 0.19% |
| Secondary Alignments | 9.09E+03 | 0.22% | 6.46E+03 | 0.21% | 5.28E+03 | 0.20% |
| Duplicates | 2.22E+04 | 0.55% | 1.46E+04 | 0.47% | 1.12E+04 | 0.43% |

Various computational methods discussed above may be performed in conjunction with or using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of skill in the art, such as the Oxford Dictionary of Biochemistry and Molecular Biology (Ed. Anthony Smith, Oxford University Press, Oxford, 2004).

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All references, including patent filings (including patents, patent applications, and patent publications), scientific journals, books, treatises, technical references, and other publications and materials discussed in this application, are incorporated herein by reference in their entirety for all purposes.

Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

While the above provides a full and complete disclosure of exemplary embodiments of the present invention, various modifications, alternate constructions and equivalents may be employed as desired. Consequently, although the embodiments have been described in some detail, by way of example and for clarity of understanding, a variety of modifications, changes, and adaptations will be obvious to those of skill in the art. Accordingly, the above description and illustrations should not be construed as limiting the invention, which can be defined by the appended claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

In the following, further examples are described to facilitate the understanding of the invention:

Example 1. A method of ejecting a droplet from a reservoir containing a non-Newtonian fluid by an acoustic droplet ejector, the method comprising:
  applying focused acoustic energy in a first pattern comprising a first tone burst segment to a fluid surface of the non-Newtonian fluid to generate a leading lobe and a filament from the fluid surface without separating the filament from the leading lobe or the fluid surface; and
  applying focused acoustic energy in a second pattern comprising a second tone burst segment and a third tone burst segment to the leading lobe to eject a droplet by separating the leading lobe from the filament to form the droplet.

Example 2. The method of example 1, wherein:
the first tone burst segment has an amplitude and duration sufficient to raise the leading lobe and filament from the fluid surface; and
the second pattern comprises at least two discrete tone burst segments including a second tone burst segment and a third tone burst segment configured to separate the droplet from the filament.

Example 3. The method of example 2, wherein the first tone burst segment has greater duration than each one of the second and third tone burst segments, and third segment having greater duration than the second segment.

Example 4. The method of any one of examples 1 through 3, wherein the filament comprises at least one bead of fluid, and the second pattern of focused acoustic energy prevents the at least one bead of fluid from breaking into one or more additional droplets.

Example 5. The method of any one of examples 1 through 3, wherein the droplet has a diameter less than 70%, less than 30%, or less than 10% of a length of the fluid filament.

Example 6. The method of any one of examples 1 through 3, wherein the droplet has a droplet volume less than 80%, preferably less than 10%, preferably less than 5% of a total volume of a remainder of the fluid filament.

Example 7. The method of any one of examples 1 through 3, wherein an amplitude of the focused acoustic energy exceeds an alternative amplitude associated with ejecting an alternative droplet from a Newtonian fluid.

Example 8. The method of any one of examples 1 through 3, wherein an amplitude of the tone burst varies between the first and second or second and third tone burst segments.

Example 9. The method of any one of examples 1 through 3, wherein:
- the filament of the non-Newtonian fluid generated from the reservoir by the focused acoustic energy comprises a chain containing 0, 1, 2, or >2 beads of the non-Newtonian fluid; and
- the second pattern of focused acoustic energy induces droplet breakoff from the chain.

Example 10. The method of example 9, wherein the filament comprises 5, 10, or <10 beads of the non-Newtonian fluid.

Example 11. The method of example 9, wherein the beads of non-Newtonian fluid have a thickness exceeding a diameter of the filament by 10%, 20%, 50%, or <50% of the diameter of the filament.

Example 12. The method of example 9, wherein the beads of non-Newtonian fluid have a thickness less than or equal to 50%, 75%, or 90% of a resulting droplet diameter.

Example 13. The method of example 9, wherein the second pattern of focused acoustic energy is configured to effect droplet ejection without producing satellite droplets.

Example 14. The method of example 9, wherein the beads on the chain coalesce with each other or the fluid in the reservoir before or after droplet breakoff.

Example 15. The method of example 9, further comprising optically or electronically monitoring the filament to assess whether the droplet breakoff is successful or unsuccessful.

Example 16. The method of any one of examples 1 through 3, further comprising predicting droplet breakoff based on optical or electrical signals from a fluid mound formed in the reservoir.

Example 17. The method of any one of examples 1 through 3, wherein the non-Newtonian fluid comprises a solution containing genetic material.

Example 18. The method of any one of examples 1 through 3, further comprising:
- applying a series of calibration tone bursts to the fluid surface configured to raise a quantity of fluid from the fluid surface;
- detecting formation of a filament in the quantity of fluid raised from the fluid surface or detecting ejection of a calibration droplet from the fluid surface; and
- setting one of a power, wavelength, or duration of one or more tone bursts of the first pattern of focused acoustic energy or the second pattern of focused acoustic energy based on the detection of the filament or the ejection of the calibration droplet.

Example 19. The method of any one of examples 1 through 3, wherein the second pattern of focused acoustic energy is configured to effect droplet ejection without producing satellite droplets.

Example 20. The method of any one of examples 1 through 3, wherein the second pattern of focused acoustic energy is configured to suppress formation of satellite droplets.

Example 21. A droplet ejection system configured to eject a droplet from a non-Newtonian fluid in a reservoir, the system comprising:
- an acoustic ejector configured to:
  - apply focused acoustic energy in a first pattern to a fluid surface of the non-Newtonian fluid to generate a leading lobe and a filament from the fluid surface without separating the filament from the leading lobe or the fluid surface; and
  - apply focused acoustic energy in a second pattern to the leading lobe to separate the leading lobe from the filament without ejecting satellite droplets such that the filament retreats into the fluid surface; and
- a processor and memory device storing executable instructions that, when executed by the processor, cause the acoustic ejector to apply the focused acoustic energy in the first pattern to a fluid surface of the non-Newtonian fluid and apply focused acoustic energy in the second pattern to the leading lobe.

Example 22. A method of setting parameters of a tone burst pattern for droplet ejection from a non-Newtonian fluid, the method comprising:
- applying a series of calibration tone bursts to the fluid surface configured to raise a quantity of fluid from the fluid surface;
- collecting a series of echo signals corresponding to the series of calibration tone burst; and
- setting one of a power, wavelength, or duration of one or more tone burst segments of a tone burst pattern of focused acoustic energy configured for ejecting a droplet from a reservoir containing the non-Newtonian fluid based on the collected series of echo signals, wherein the tone burst pattern comprises, at least:
- a first discrete tone burst segment;
- a second discrete tone burst segment; and
- a third discrete tone burst segment, the first tone burst segment having greater duration than the second and third segments, and third segment having greater duration than the second segment.

Example 23. The method of example 22, further comprising:
- determining a minimum tone burst power corresponding to droplet ejection based on the collected series of echo signals; and
- setting the one of the power, wavelength, or duration based at least in part on the minimum tone burst power.

Example 24. The method of example 22, further comprising:
- ejecting a droplet from the reservoir by applying focused acoustic energy to the reservoir according to the tone burst pattern.

Example 25. The method of example 24, further comprising:
- sensing ejection of the droplet via an optical sensor.

Example 26. The method of example 24 or example 25, further comprising:
- iteratively changing one of the power, wavelength, or duration of the one or more tone burst segments until droplet ejection is detected; and
- setting the power, wavelength, or duration to one or more values corresponding to the detected droplet ejection.

Example 27. The method of example 24 or example 25, further comprising:
- predicting a droplet volume associated with the ejected droplet by processing the series of echo signals by a convolution neural network trained based on a comparison data set comprising a plurality of reflected acoustic signals corresponding to a respective plurality of non-Newtonian fluids having known properties.

Example 28. The method of example 27, further comprising:
- determining an actual droplet volume associated with the ejected droplet;

comparing the actual droplet volume with the predicted droplet volume; and modifying the convolution neural network based on the comparison.

Example 29. The method of example 24 or example 25, further comprising:

determining a droplet volume associated with the ejected droplet;

comparing the droplet volume to a predicted droplet volume; and adjusting the power, wavelength, or duration based on the comparison.

Example 30. The method of any one of examples 22 through 25, further comprising:

determining a property of the non-Newtonian fluid based on the collected series of echo signals.

Example 31. The method of any one of examples 22 through 25, further comprising:

comparing the series of echo signals to stored echo data comprising a collection of previously received echoes correlated with a known collection of non-Newtonian fluids; and setting the one of the power, wavelength, or duration based at least in part on the comparison.

Example 32. The method of any one of examples 22 through 25, further comprising:

determining a property of the non-Newtonian fluid by processing the one or more echoes by a convolution neural network trained based on a comparison data set comprising a plurality of reflected acoustic signals corresponding to a respective plurality of non-Newtonian fluids having known properties.

Example 33. A method of ejecting a droplet containing a non-Newtonian fluid from a fluid reservoir, the method comprising:

applying a tone burst pattern of focused acoustic energy to a fluid reservoir containing a non-Newtonian fluid, wherein the application of the tone burst pattern to the fluid reservoir ejects a droplet of the non-Newtonian fluid from the fluid reservoir, and wherein the tone burst pattern comprises:

a first discrete tone burst segment;

a second discrete tone burst segment applied subsequent to the first discrete tone burst segment; and a third discrete tone burst segment applied subsequent to the second discrete tone burst segment.

Example 34. The method of example 33, wherein the first tone burst segment has a.

greater duration than the second and third segments, and the third segment has a greater duration than the second segment.

Example 35. The method of example 33 or example 34, wherein:

raising a leading lobe and filament from a fluid surface of the non-Newtonian fluid by the first discrete tone burst; and effecting droplet ejection by separating the leading lobe from the filament by the second and third discrete tone bursts.

Example 36. The method of example 35, wherein the filament comprises at least one bead of fluid, and the tone burst pattern prevents the at least one bead of fluid from breaking into one or more additional droplets.

Example 37. The method of example 35, wherein:

the filament of the non-Newtonian fluid generated from the reservoir by the focused acoustic energy comprises a chain containing one or more beads of the non-Newtonian fluid.

Example 38. The method of example 37, wherein the tone burst pattern induces droplet breakoff from the chain.

Example 39. The method of example 37, wherein the filament comprises 1, 2, or >2 beads of the non-Newtonian fluid.

Example 40. The method of example 37, wherein the filament comprises 5, 10, or >10 beads of the non-Newtonian fluid.

Example 41. The method of example 37, wherein the beads of non-Newtonian fluid have a thickness exceeding a diameter of the filament by 10%, 20%, 50%, or <50% of the diameter of the filament.

Example 42. The method of example 37, wherein the beads of non-Newtonian fluid have a thickness less than or equal to 50%, 75%, or 90% of a resulting droplet diameter.

Example 43. The method of example 37, wherein the beads on the chain coalesce with each other or the fluid in the reservoir before or after droplet breakoff.

Example 44. The method of example 37, wherein a droplet volume of the ejected droplet is less than 80%, less than 10%, or less than 5%, of a remaining volume of the filament during droplet ejection.

Example 45. The method of example 37, wherein ejection of the droplet occurs when the filament has a length of at least 5 droplet diameters, 10 droplet diameters, 20 droplet diameters, 50 droplet diameters, or 100 droplet diameters.

Example 46. The method of example 37, further comprising optically or electronically monitoring the filament to assess whether the droplet breakoff is successful or unsuccessful.

Example 47. The method of example 33 or example 34, wherein the droplet has a diameter less than 70%, less than 30%, or less than 10% of a length of the filament.

Example 48. The method of example 33 or example 34, wherein the droplet has a droplet volume less than 50%, preferably less than 10%, preferably less than 5% of a total volume of a remainder of the fluid filament.

Example 49. The method of example 33 or example 34, wherein an amplitude of the tone burst exceeds an alternative amplitude associated with ejecting an alternative droplet from a Newtonian fluid.

Example 50. The method of example 33 or example 34, wherein an amplitude of the tone burst varies between the first and second or second and third tone burst segments.

Example 51. The method of example 33 or example 34, further comprising predicting droplet breakoff based on optical or electrical signals from a fluid mound formed in the reservoir.

Example 52. The method of example 33 or example 34, wherein the non-Newtonian fluid comprises a solution containing genetic material.

Example 53. The method of example 33 or example 34, further comprising:

applying a series of calibration tone bursts to the fluid surface configured to raise a quantity of fluid from the fluid surface;

detecting formation of a filament in the quantity of fluid raised from the fluid surface; and setting one of a power, wavelength, or duration of one or more tone burst segments of the tone burst pattern based on the detection of the filament.

Example 54. A droplet ejection system configured to eject a droplet from a non-Newtonian fluid in a reservoir, the system comprising:
an acoustic ejector configured to apply a tone burst pattern of focused acoustic energy to the reservoir such that the focused acoustic energy ejects a droplet of the non-Newtonian fluid from the reservoir; and
a processor and memory device storing executable instructions that, when executed by the processor, cause the acoustic ejector to apply the focused acoustic energy in a pattern comprising:
a first discrete tone burst segment;
a second discrete tone burst segment applied subsequent to the first discrete tone burst segment; and
a third discrete tone burst segment applied subsequent to the second discrete tone burst segment.

What is claimed is:

1. A method of ejecting a droplet from a reservoir containing a non-Newtonian fluid by an acoustic droplet ejector, the method comprising:
applying focused acoustic energy in a first pattern comprising a first tone burst segment to a fluid surface of the non-Newtonian fluid to generate a leading lobe and a filament from the fluid surface without separating the filament from the leading lobe or the fluid surface; and
applying focused acoustic energy in a second pattern comprising a second tone burst segment and a third tone burst segment to the leading lobe to eject a droplet by separating the leading lobe from the filament to form the droplet, wherein the filament comprises at least one bead of fluid, and the second pattern of focused acoustic energy prevents the at least one bead of fluid from breaking into one or more additional droplets.

2. The method of claim 1, wherein:
the first tone burst segment has an amplitude and duration sufficient to raise the leading lobe and filament from the fluid surface; and
the second pattern comprises at least two discrete tone burst segments including the second tone burst segment and a third tone burst segment configured to separate the droplet from the filament.

3. The method of claim 2, wherein the first tone burst segment has greater duration than each one of the second and third tone burst segments, and third tone burst segment having greater duration than the second tone burst segment.

4. The method of claim 1, wherein the droplet has a diameter less than 70%, less than 30%, or less than 10% of a length of the filament, or wherein the droplet has a droplet volume less than 80%, less than 10%, or less than 5% of a total volume of a remainder of the filament.

5. The method of claim 1, wherein the second pattern of focused acoustic energy is configured to effect droplet ejection without producing satellite droplets.

6. The method of claim 1, wherein an amplitude of the focused acoustic energy exceeds an alternative amplitude associated with ejecting an alternative droplet from a Newtonian fluid.

7. The method of claim 1, wherein an amplitude of the focused acoustic energy varies between the first and second or second and third tone burst segments.

8. The method of claim 1, wherein:
the filament of the non-Newtonian fluid generated from the reservoir by the focused acoustic energy comprises a chain containing 0, 1, 2, or >2 beads of the non-Newtonian fluid; and
the second pattern of focused acoustic energy induces droplet breakoff from the chain.

9. The method of claim 8, wherein the beads on the chain coalesce with each other or with the non-Newtonian fluid in the reservoir before or after droplet breakoff.

10. The method of claim 8, further comprising optically or electronically monitoring the filament to assess whether the droplet breakoff is successful or unsuccessful.

11. The method of claim 1, further comprising predicting droplet breakoff based on optical or electrical signals from a fluid mound formed in the reservoir.

12. The method of claim 1, wherein the non-Newtonian fluid comprises a solution containing genetic material.

13. The method of claim 1, further comprising:
applying a series of calibration tone bursts to the fluid surface configured to raise a quantity of fluid from the fluid surface;
detecting formation of a filament in the quantity of fluid raised from the fluid surface or detecting ejection of a calibration droplet from the fluid surface; and
setting one of a power, wavelength, or duration of one or more tone bursts of the first pattern of focused acoustic energy or the second pattern of focused acoustic energy based on the detection of the filament or the ejection of the calibration droplet.

14. A droplet ejection system configured to eject a droplet from a non-Newtonian fluid in a reservoir, the system comprising:
an acoustic ejector configured to:
apply focused acoustic energy in a first pattern to a fluid surface of the non-Newtonian fluid to generate a leading lobe and a filament from the fluid surface without separating the filament from the leading lobe or the fluid surface; and
apply focused acoustic energy in a second pattern to the leading lobe to separate the leading lobe from the filament without ejecting satellite droplets such that the filament retreats into the fluid surface, wherein the filament comprises at least one bead of fluid, and the second pattern of focused acoustic energy prevents the at least one bead of fluid from breaking into one or more additional droplets; and
a processor and memory device storing executable instructions that, when executed by the processor, cause the acoustic ejector to apply the focused acoustic energy in the first pattern to a fluid surface of the non-Newtonian fluid and apply focused acoustic energy in the second pattern to the leading lobe.

15. A method of ejecting a droplet containing a non-Newtonian fluid from a fluid reservoir, the method comprising:
applying a tone burst pattern of focused acoustic energy to a fluid reservoir containing a non-Newtonian fluid, wherein the application of the tone burst pattern to the fluid reservoir ejects a droplet of the non-Newtonian fluid from the fluid reservoir, and wherein the tone burst pattern comprises:
a first discrete tone burst segment to raise a leading lobe and filament comprising at least one bead of fluid from a fluid surface of the non-Newtonian fluid;
a second discrete tone burst segment applied subsequent to the first discrete tone burst segment; and
a third discrete tone burst segment applied subsequent to the second discrete tone burst segment, wherein the second and third discrete tone bursts effect droplet ejection by separating the leading lobe from the filament, and the tone burst pattern prevents the at least one bead of fluid from breaking into one or more additional droplets.

16. The method of claim 15, wherein the first tone burst segment has a greater duration than the second and third segments, and the third segment has a greater duration than the second segment.

17. The method of claim 15, further comprising:
applying a series of calibration tone bursts to the fluid surface configured to raise a quantity of fluid from the fluid surface;
detecting formation of a filament in the quantity of fluid raised from the fluid surface; and
setting one of a power, wavelength, or duration of one or more tone burst segments of the tone burst pattern based on the detection of the filament.

* * * * *